United States Patent [19]
McIntosh, III et al.

[11] Patent Number: 5,912,313
[45] Date of Patent: Jun. 15, 1999

[54] ADDITION POLYMERS OF POLYCYCLOOLEFINS CONTAINING SILYL FUNCTIONAL GROUPS

[75] Inventors: Lester H. McIntosh, III, Cuyahoga Falls; Brian L. Goodall, Akron; Robert A. Shick, Strongsville; Saikumar Jayaraman, Cuyahoga Falls, all of Ohio

[73] Assignee: The B. F. Goodrich Company, Akron, Ohio

[21] Appl. No.: 08/562,345

[22] Filed: Nov. 22, 1995

[51] Int. Cl.$^6$ .......................... C08F 232/08; C08F 230/08
[52] U.S. Cl. .......................... 526/279; 526/255; 526/280; 526/281; 526/308; 526/309; 526/282; 526/335; 526/347; 526/348.8
[58] Field of Search ...................................... 526/279, 281, 526/308, 282, 280, 309, 348.8, 255

[56] References Cited

U.S. PATENT DOCUMENTS

| | | |
|---|---|---|
| 3,330,815 | 7/1967 | McKeon et al. . |
| 4,831,172 | 5/1989 | Hahn et al. . |
| 5,011,730 | 4/1991 | Tenney et al. . |
| 5,179,171 | 1/1993 | Minami et al. . |
| 5,190,808 | 3/1993 | Tenney ..................................... 428/224 |
| 5,468,819 | 11/1995 | Goodall ................... 526/171 |

FOREIGN PATENT DOCUMENTS

| | | |
|---|---|---|
| 5214079 | 8/1993 | Japan . |
| 665319 | 3/1994 | Japan . |
| 7104474 | 4/1995 | Japan . |
| 7196736 | 8/1995 | Japan . |

OTHER PUBLICATIONS

Benedikt, G.M.; Goodall, B.L., Marchant, N.S.; and Rhodes, L.F., *Proceedings of the Worldwide Metallocene Conference* (MetCon '94).

*Plastics News*, Feb. 27, 1995, p. 24.

Kaminsky, W.; Bark, A.; Drake, I., *Stud. Surf. Sci. Catal.*, 1990, 56, 425.

Soane, D.; Martynenko,., *Polymers in Microelectronics: Fundamentals and Applications*, Elsevier, Amsterdam (1989) 165–169.

Heistand et al., *The International Journal of Microcircuits and Electronic Packaging*, (1992), vol. 15, No. 4, 183.

Winstein, S.; Trifan, D., Neighboring Carbon and Hydrogen. XI. Solvolysis of exo–Norbornyl ρ–Bromobenzenesulfonate, *Journal of the American Chemical Society*, 74, 1154 (1952).

*Primary Examiner*—Fred Zitomer
*Attorney, Agent, or Firm*—Thoburn T. Dunlap

[57] ABSTRACT

Silyl substituted polymers of polycycloolefins are provided as well as catalyst systems for their preparation. The polymers of the invention include polycyclic repeat units that contain pendant silyl functional groups represented by the following formulae:

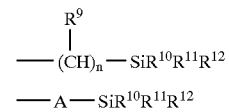

wherein A is a divalent radical selected from the following structures:

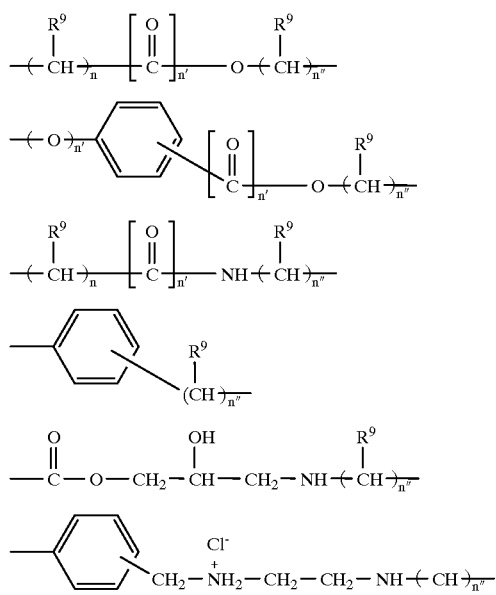

$R^9$ independently represents hydrogen, methyl, or ethyl; $R^{10}$, $R^{11}$, and $R^{12}$ independently represent halogen, linear or branched ($C_1$ to $C_{20}$) alkyl, linear or branched ($C_1$ to $C_{20}$) alkoxy, linear or branched ($C_1$ to $C_{20}$) alkyl carbonyloxy, ($C_1$ to $C_{20}$) alkyl peroxy, and substituted or unsubstituted ($C_6$ to $C_{20}$) aryloxy; $R^{10}$, $R^{11}$, and $R^{12}$ together with the silicon atom to which they are attached form the group:

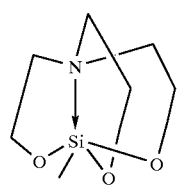

n is a number from 0 to 5; and n' is 0 or 1; and n" is a number from 0 to 10.

74 Claims, 7 Drawing Sheets

ADDITION POLYMERS OF POLYCYCLOOLEFINS CONTAINING SILYL FUNCTIONAL GROUPS

BACKGROUND OF THE INVENTION

1. Technical Field of the Invention

The present invention generally relates to silyl functional polymers, to compositions containing same and to processes for the production thereof. More specifically, this invention relates to silyl substituted polycycloolefins that have been addition polymerized from polycycloolefin monomers containing at least one norbornene moiety. The polymeric compositions of this invention are useful in molded articles, in films, casted as articles, in coatings, as adhesives, and in membranes.

2. Background Art

Inorganic materials such as silicon dioxide and silicon nitride have been traditionally used in the microelectronics industry as insulating and passivating materials in the manufacture of integrated circuits. However, as the demand for smaller, faster, and more powerful devices becomes prevalent new materials will be needed to enhance the performance and the efficient manufacture of these devices.

To meet these enhanced performance and manufacturing criteria considerable interest in high performance polymers characterized by low dielectric constant, low moisture uptake, good substrate adhesion, chemical resistance, high glass transition temperatures (e.g., $T_g > 250°$ C.), toughness, high thermo and thermo-oxidative stabilities, as well as good optical properties is increasingly gaining momentum. Such polymers are useful as dielectric coatings and films in the construction and manufacture of multichip modules (MCMs) and in integrated circuits (IC), in electronic packaging, in flexible film substrates, and in optical applications such as in flat panel displays and the like. Presently, substantial attention is being directed to polyimides and bis-benzocylobutenes (BCBs) for use as dielectric materials in the construction and manufacture of microelectronic devices.

Polyimides have been used as microelectronic dielectric materials because of their thermal and oxidative stability, high glass transition temperatures, and generally good mechanical properties. However, these materials have drawbacks which limit their performance, namely, (1) they often show considerable water uptake resulting in conductor corrosion and increased dielectric constant; (2) the electrical properties can be strongly anisotropic in fully cured and densified films, i.e., in-plane dielectric constant differs substantially (up to 50%) from through-plane dielectric constant; (3) the polyimide precursor, polyamic acid, requires the use of passivation layers to prevent unwanted reactions with copper conductors and substrates; (4) the dielectric constants are higher than desired; and (5) poor adhesion to copper and noble metal (i.e., gold, silver, and platinum) conductors. Moreover, polyimides must be cured at elevated temperatures (around 300° C.) to effect ring closure of the polymer.

Benzocyclobutenes are also commercially employed in microelectronic packaging as insulating polymers. BCB's offer lower moisture absorption and lower dielectric constant values than the polyimides. However, they suffer the same adhesion drawbacks as the polyimides. Interfacial strength is quite low, consequently, films peel off copper and noble metal substrates with minimal effort. BCBs must also be cured at elevated temperatures in order to obtain polymers with useful physical properties. The physical properties of the cured polymer are dependent upon the cure time and temperature, i.e., the cure time and temperature determines the amount of crosslinking. In particular, BCBs gain their $T_g$ properties from crosslinking and hence suffer problems endemic to most thermosets in that vitrification limits the glass transition to approximately 20° C. below the cure temperature due to reactant mobility restrictions. The physical properties of these polymers are therefore very dependent on the cure profile employed, necessitating microelectronic device manufacturers to precisely control and monitor device manufacture to obtain consistent polymer properties.

Polycycloolefins (e.g. polymers derived from polycyclic monomers containing a norbornene moiety) are well known in the art. Because of their high hydrocarbon content, polycycloolefins have low dielectric constants and a low affinity for moisture. Presently, there are several routes to polymerize cyclic olefin monomers such as norbornene or other higher polycyclic monomers containing the norbornene moiety. These include: (1) ring-opening metathesis polymerization (ROMP); (2) ROMP followed by hydrogenation; (3) addition copolymerization (Ziegler type copolymers with ethylene), and (4) addition homopolymerization. Each of the foregoing routes produces polymers with specific structures as shown in the Diagram 1 below:

Diagram 1

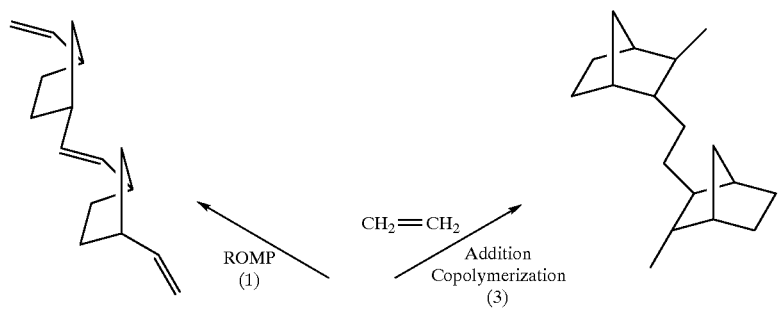

-continued

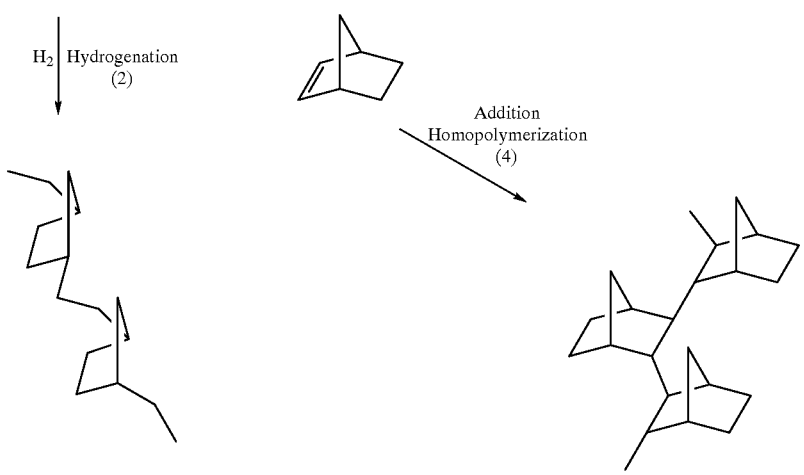

As illustrated in the foregoing diagram a ROMP catalyzed polymer contains a repeat unit with one less cyclic unit than did the starting monomer. The so-called ring-opened repeat units are linked together in an unsaturated backbone characteristic of a ROMP polymer. As can readily be surmised ROMP catalyzed polymers suffer the inherent disadvantage of backbone unsaturation which significantly reduces the thermo-oxidative stability of the polymer. ROMP catalyzed polymers exist as thermoplastics or thermosets ($T_g$<240° C.). ROMP catalyzed thermosets have been utilized to produce circuit board substrates via reaction injection molding (RIM) as disclosed in U.S. Pat. No. 5,011,730 to Tenney et al. However, as discussed above, these polymers inherently suffer from thermo-oxidative instability as well as insufficiently low $T_g$s. Moreover, in the RIM process a finished polymer part is directly polymerized in the mold from a reactive monomer solution containing a molybdate or tungstate catalyst and an organoaluminum halide cocatalyst. No intermediate resin or cement is produced. Consequently, all reactants and reactant by-products including catalyst metal residues and halide compounds remain in the finished part as contaminants. There is no way to remove these contaminants from the finished article without first destroying it. The metal residues deleteriously affect the electrical insulating properties of the polymer and the halide can combine with moisture to form corrosive hydrogen halide.

To overcome the deficiencies of the ROMP catalyzed thermoplastics it has been proposed to hydrogenate the polymer in an attempt to yield a more stable backbone. However, what is gained in stability is lost in thermal properties. Hydrogenation typically reduces the $T_g$ of the ROMP polymer by approximately 50° C. Furthermore, the cost of the two-step process (ROMP, followed by hydrogenation), the inherent brittleness of the polymer, and the reduced thermal performance of the polymer ($T_g$<180° C.) is limiting the commercial impact of all ROMP based thermoplastics.

The alternative to the two-step ROMP/hydrogenation route to cyclic olefin polymers is the Ziegler or addition copolymerization route. Addition copolymers derived from higher polycyclic monomers such as tetracyclododecene and ethylene using homogeneous vanadium catalysts are commercially prepared and are available under the trademark Apel®. However, this catalytic approach can suffer from a number of limitations such as low catalytic activity and significant oligomeric fractions (Benedikt, G. M.; Goodall, B. L.; Marchant, N. S.; Rhodes, L. F. *Proceedings of the Worldwide Metallocene Conference* (MetCon '94), Catalyst Consultants Inc., Houston, Tex., 1994.)

The limitations of the vanadium catalysts led to the development of the higher activity zirconium-based metallocene polymerization catalysts developed by Prof. Walter Kaminsky (University of Hamburg, Germany) to produce higher molecular weight polycyclic addition copolymers with narrow molecular weight distributions (*Plastics News, Feb.* 27, 1995, p. 24.). Due to the reduced activity at high polycyclic (norbornene) concentrations, these addition copolymers typically suffer from inadequate $T_g$s ($T_g$<240° C.) similar to ROMP catalyzed polymers. Even though these polymers exhibit improved stability, they are still brittle and have poor resistance to hydrocarbon and halohydrocarbon solvents.

Addition homopolymers of norbornene have been polymerized utilizing the Kaminsky zirconium-based metallocene catalysts. These polymers, however, are intractable, e.g., are crystalline, are not soluble in common organic solvents, and do not exhibit a transition (glass or melt) before they decompose (Kaminsky, W.; Bark, A.; Drake, I. *Stud. Surf. Sci. Catal.* 1990, 56, 425.)

As with the polyimides and BCBs discussed above, the polycycloolefins do not adhere well to metal or silicon surfaces. In order for a polymer to be considered for microelectronic applications, adhesion at different interfaces is a must. A polymer must exhibit satisfactory adhesion to a variety of different substrates, e.g., inorganic substrates such as silicon, silicon dioxide, silicon nitride, alumina, copper, aluminum, and the noble metals such as gold, silver, and platinum, and tie layer metals such as titanium nickel, tantalum, and chromium, as well as to itself when thick layers of the polymer are desired. Good adhesion is required through repeated cycling at temperature extremes (i.e. at depressed and elevated temperatures), as well as through varying humidity conditions. Good adhesion must also be maintained through device processing and assembly temperatures.

Given the adhesion deficiencies inherent with the polyimides and BCBs, techniques have been developed to promote polymer adhesion to surface modified substrates (i.e., to silicon (oxide) and metal (oxide) substrates). The substrate is typically treated with a difunctional organosilane coupling agent such as γ-amino-propyltriethoxysilane or triethoxyvinylsilane. The polymer or polymer precursor is then cured in contact with the treated substrate. The difunctional organosilane couples the polymer to the substrate. It is believed that the silyl functionality interacts with hydroxyl groups on the substrate surface via hydrolysis to form a covalent linkage as shown below (Soane, D., Martynenko, Z., *Polymers in Microelectronics: Fundamentals and Applications,* Elsevier, Amsterdam, (1989) 165–169):

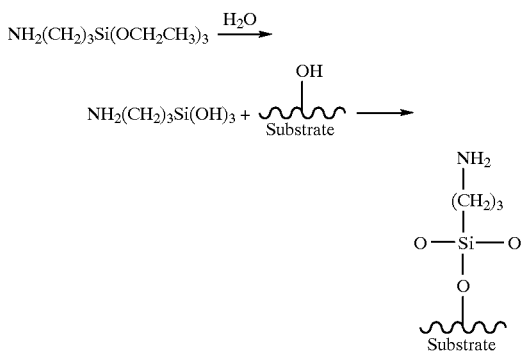

The pendant amino functionality (or any suitable functionality) on the treated substrate is then free to react with functional groups on the polymer or polymer precursor to form a bridge that is covalently bonded to the treated substrate and to the polymer. Organosilane treated substrates are disclosed in U.S. Pat. No. 4,831,172 to Hahn et al. and by Heistand II, R. H.; DeVellis, R.; Manial, T. A.; Kennedy, A. P.; Stokich, T. M.; Townsend, P. H.; Garrou, P. E.; Takahashi, T.; Adema, G. M.; Berry, M. J.; and Turlik, I. *The International Journal of Microcircuits and Electronic Packaging,* 1992, vol. 15, no. 4, 183. See also *Polymers In Electronics,* supra.

Copper, silver, platinum, and gold are increasingly being utilized in the construction of microelectronic devices as substrates and as conductors due to improved conductivity over the traditionally used aluminum. While organosilane coupling agents are somewhat useful in treating substrates that contain oxygen atoms at the surface, they are noted for poor adhesion to copper, silver, platinum, and especially gold (presumably for the lack of oxygen atoms at the surface interface). Consequently, organosilane coupling agents can only be utilized after a tie-layer has been applied to the substrate surface. Suitable tie-layers include titanium, tantalum, chromium, and nickel. Tie-layers serve to protect the underlying metal substrate, e.g., copper, from polyamic acid (in the case of the polyimides) and/or to provide an adhesion layer which can allow the effective use of the organosilane coupling agents to promote the adhesion of the polyimide. BCBs are not aggressive toward copper so effective organosilane agents can be utilized with copper without a tie-layer. The use of silyl moieties has been shown to be ineffective when gold is employed as the substrate in that amino moieties are required to achieve even modest adhesion at best as demonstrated by Heistand II et al., supra. However, even these typically failed upon exposure at 95° C. in the presence of moisture, suggesting certain failure upon exposure to boiling water.

The use of organosilane treated substrates to promote the adhesion of high performance polymers has its drawbacks. The procedure is a multi-step process requiring additional time and effort to prepare the substrate before the polymer can be applied. First a coupling agent must be applied to the substrate, and then a polymer or polymer precursor with an appropriate co-reactive functional group must be cured or reacted in contact with the surface of the treated substrate. When the use of tie-layers or passivation layers is required, the burden of an extra processing step is added.

There exists a need in the microelectronics industry for a thermally stable, noncorrosive, low dielectric constant polymer with good solvent resistance, high glass transition temperatures, good mechanical performance, and good adhesive properties that can be applied directly to an underlying substrate.

With the inherent low moisture affinity and electrical insulating properties of the addition polymerized polycycloolefins, it would be desirous to improve upon the physical properties (e.g., glass transition temperature, toughness, solvent resistance, etc.) as well as the adhesive properties so that these polymers can be utilized in electrical and optical applications.

The incorporation of functional substituents into hydrocarbon polymer backbones has been a useful method for modifying the chemical and physical properties of the polymer. It is known, however, that polymers containing functional substituents are difficult to prepare because of the propensity of the functional group to poison the catalyst. The free electron pairs on the functional substituent (e.g., nitrogen and oxygen atoms in particular) deactivate the catalyst by complexing with the active catalytic sites. Consequently, catalyst activity decreases and the polymerization of monomer is inhibited.

Previous attempts to addition polymerize a functionally substituted polycycloolefinic monomer via transition metal catalysis have resulted in polymers with low molecular weights. In U.S. Pat. No. 3,330,815 (hereinafter '815), for example, attempts to polymerize functionally substituted polycyclic monomers via palladium metal catalysis produced polymers with low molecular weights as evidenced in the Examples disclosed therein. Molecular weights above 10,000 $M_n$ were not obtained by the disclosed catalyst systems of the '815 patent.

To overcome the difficulty of polymerizing monomers with functional groups (due to catalyst system deactivation), it has been proposed to post react the polymer with the desired functional substituent in order to incorporate the moiety into the polymer. Minami el al., U.S. Pat. No. 5,179,171 (hereinafter '171), disclose copolymers containing ethylenic and polycyclic repeating units which have been post modified with a functional substituent. Among the disclosed copolymers are those derived from maleic anhydride, vinyltriethoxy silane, and glycidyl methacrylate grafted to an ethylenic/polycyclic backbone.

The functional substituent or moiety (i.e. a free radically polymerizable functional group containing monomer) is grafted to the ethylene/polycyclic copolymer by reacting the functional moiety with the base polymer in the presence of a free radical initiator. A free radical moiety (formed from the functional group containing monomer) attacks accessible hydrogens on the polymeric backbone as well as on the polycyclic repeat unit (excluding the bridgehead hydrogens) and grafts to carbon atoms at those sites. The drawback with free radical grafting is that there is no control over where the substituent will graft. Moreover, only small amounts of the free radical moiety (typically less than 2 mole %) grafts to the polymer. Excess amounts of free radical moieties in the reaction medium can cause chain scission, leading to polymer chains of lower molecular weight. There is also a tendency for the grafting moiety to homopolymerize instead of grafting to the base polymer. In addition, grafting monomers have been known to form branched oligomers at the grafting site thereby reducing the efficacy of the desired functionality.

The '171 disclosure purports that the post modification of the disclosed ethylene/polycycloolefin copolymers leads to high $T_g$ polymers (20 to 250° C.). However, the data reported in the Examples appears to suggest otherwise. The maleic anhydride, vinyltriethoxy silane, and glycidyl methacrylate graft copolymers of Examples 33 to 39 on average exhibit a 2° C. increase in $T_g$ over their non-grafted counterparts. When taking experimental error into account, the slight overall increase in the reported $T_g$ values are nil or insignificant at best. Contrary to the disclosure of the '171 patent, high $T_g$ polymers are not attained. In fact, the highest $T_g$ reported in any of the Examples is only 160° C. There is no disclosure in the '171 patent to suggest that addition polymerized silyl substituted polycyclic monomers provide polymers with superior physical and adhesive properties, especially adhesion to copper and noble metal substrates. The data reported in the Examples also indicates the highest incorporation through grafting of the vinyl triethoxy silane moiety to be less than 0.1 mole %.

SUMMARY OF THE INVENTION

Accordingly, it is a general object of this invention to provide polymer compositions that possess low dielectric constants, low moisture absorption, high glass transition temperatures, high thermo-oxidative stabilities, resistance against chemical attack, toughness, and good adhesive properties.

It is another object of the present invention to provide polymer compositions with good optical properties.

It is another object of this invention to provide polymer compositions that are useful as dielectric coatings and films in the construction of microelectronic devices such as integrated circuits, multichip modules.

It is another object of this invention to provide polymer compositions that adhere to microelectronic substrates without the need for coupling agents.

It is a further object of this invention to provide polymer compositions that adhere well to copper, silver, and gold substrates.

It is yet another object of this invention to provide a polycycloolefin addition polymer containing silyl functional substituents.

It is another object of this invention to provide a polycycloolefin addition polymer with specific microstructural arrangements.

It is a still further object of this invention to provide catalytic reaction mixtures that are resistant to functional group deactivation.

It is still another object of this invention to provide post modified silyl functional polymers.

It is a specific object of this invention to provide catalyst systems that control polymer microstructure.

These and other objects of the invention are accomplished by polymerizing a reaction mixture comprising at least one silyl functionalized polycycloolefinic monomer, a solvent, a single or multicomponent catalyst system each comprising a Group VIII metal ion source, in combination with one or both of an organometal cocatalyst and a third component, and an optional chain transfer agent (CTA) selected from a compound having a terminal olefinic double bond between adjacent carbon atoms, wherein at least one of said adjacent carbon atoms having two hydrogen atoms attached thereto. The CTA is selected from unsaturated compounds that are typically cationically non polymerizable and hence exclude styrenes, vinyl ethers, and conjugated dienes.

The polymers obtained in accordance with the method of the present invention are addition polymers comprising silyl functionalized polycyclic repeat units. Therefore polymer backbone is free of internal unsaturation, independent of pendant groups.

BRIEF DESCRIPTION OF THE DRAWINGS

The foregoing and additional objects and advantages of the invention will best be understood by reference to the following detailed description, appended claims, and accompanying drawings, wherein:

DETAILED DESCRIPTION OF THE INVENTION

Figure 1:
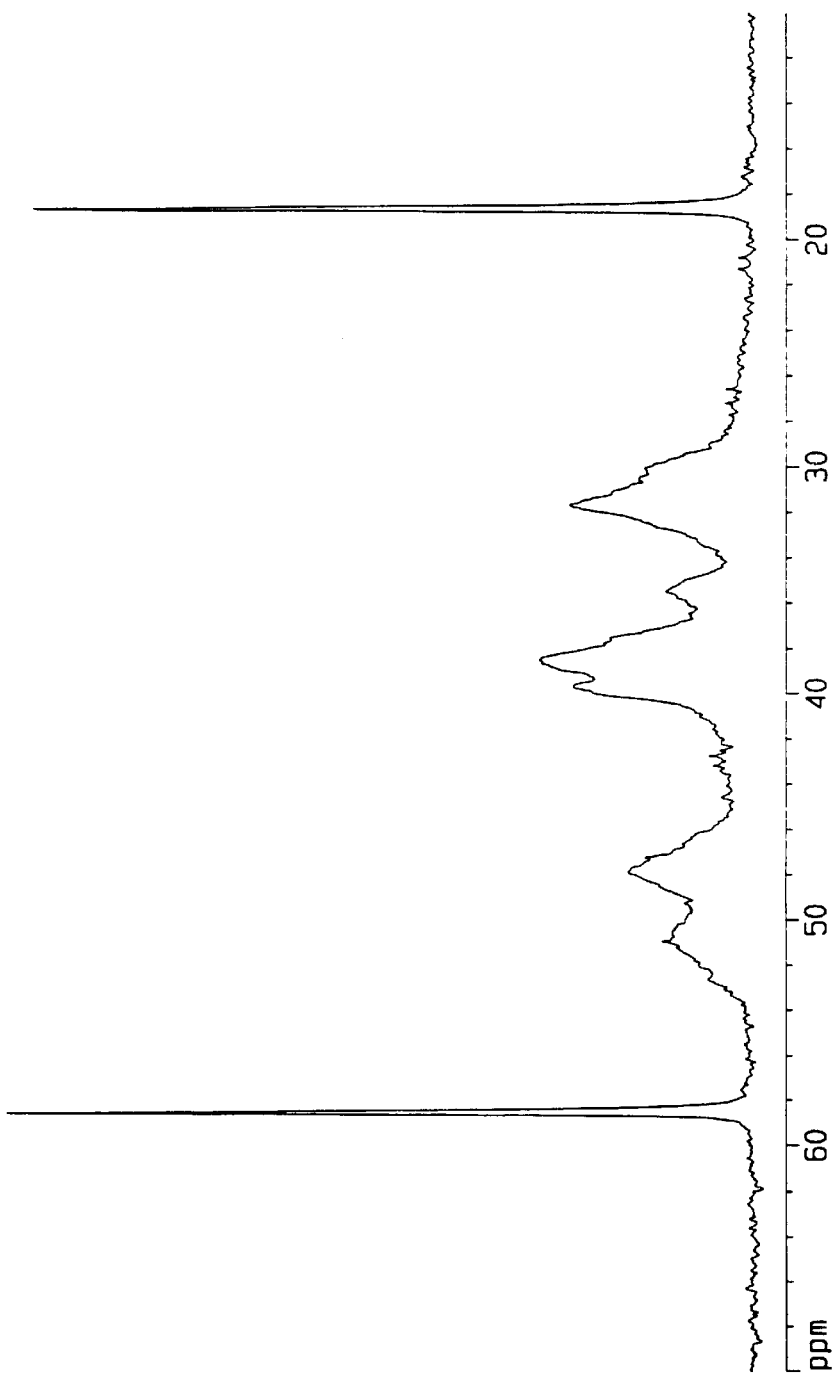
FIG. 1 is a 125 MHz $^{13}$C-NMR spectrum in o-dichlorobenzene-$D_4$ at 323° K of a silyl functional polycyclic polymer of the invention that was catalyzed by a nickel Type I catalyst.

The polymers of the present invention comprise polycyclic repeating units, a portion of which are substituted with silyl functional groups. The instant polymers are prepared by polymerizing the polycyclic monomers of this invention alone or in optional combination with certain acyclic monomers described hereinbelow. By the term "polycyclic" (norbornene-type, norbornene functional) is meant that the monomer contains at least one norbornene moiety as shown below:

The simplest polycyclic monomer of the invention is the bicyclic monomer, bicyclo[2.2.1]hept-2-ene, commonly referred to as norbornene. The silyl functionality is introduced into the polymer chain by polymerizing a reaction medium comprising one or more silyl substituted polycyclic monomers set forth under Formula I (defined hereinbelow) in the presence of the Group VIII metal catalyst systems of the present invention. Optionally, the silyl substituted polycyclic monomers of the invention can be polymerized in combination with one or more of the hydrocarbyl substituted polycyclic monomers set forth under Formula II (defined hereinbelow) and/or selected acyclic monomers.

Monomers

The silyl functional polycyclic monomers useful in the practice of the present invention are selected from a monomer represented by the formula below:

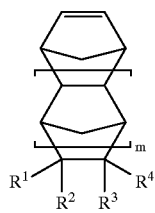
I wherein $R^1$ and $R^4$ independently represent hydrogen; linear or branched ($C_1$ to $C_{20}$) alkyl; $R^1$ and $R^4$ taken together with the two ring carbon atoms to which they are attached represent a saturated cyclic group of 4 to 8 carbon atoms. The cyclic group formed by $R^1$ and $R^4$ is substituted by at least one of $R^2$ and $R^3$, the definition of which is set forth below. Substituents $R^1$ and $R^4$ when taken together with the two ring carbon atoms to which they are attached can also represent the group:

wherein $R^{10}$ is defined below; $R^2$ and $R^3$ independently represent hydrogen, linear or branched ($C_1$ to $C_{20}$) alkyl or the group:

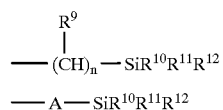
Ia
Ib wherein A is a divalent radical selected from the following:

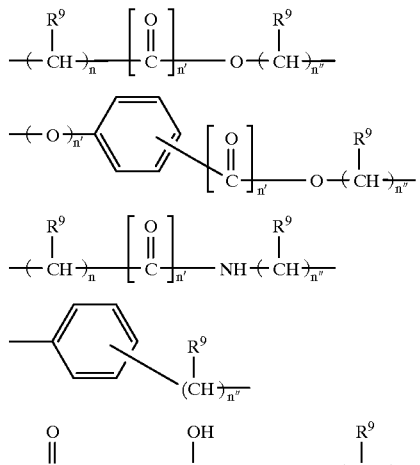

-continued

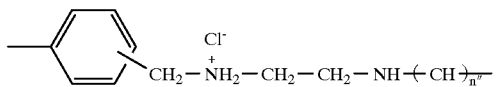

in the divalent formulae set forth above, the silyl substituent is located on the n" terminus portion of the radical; $R^9$ independently is hydrogen, methyl, or ethyl; $R^{10}$, $R^{11}$, and $R^{12}$ independently represent halogen selected from bromine, chlorine, fluorine, and iodine, linear or branched ($C_1$ to $C_{20}$) alkyl, linear or branched ($C_1$ to $C_{20}$) alkoxy, linear or branched ($C_1$ to $C_{20}$) alkyl carbonyloxy, e.g., acetoxy, linear or branched ($C_1$ to $C_{20}$) alkyl peroxy, e.g., t-butyl peroxy, substituted or unsubstituted ($C_6$ to $C_{20}$) aryloxy, and $R^{10}$ to $R^{12}$ can be taken together with the silicon atom to which they are attached to form a silatrane group represented by the formula:

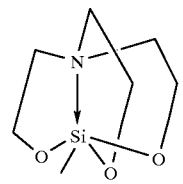

In the formulae above, m is a number from 0 to 4; n is a number from 0 to 5; n' is 0 or 1; and n" is a number from 0 to 10 (1 to 10 being preferred). Substituents $R^2$ and $R^3$ are subject to the proviso that at least one of $R^2$ and $R^3$ is a substituent selected from the group represented by Ia or Ib defined above, preferably at least one of $R^{10}$ to $R^{12}$ contains a silicon-halogen bond or a silicon-oxygen bond, and with the additional proviso that when $R^1$ and $R^4$ are taken together to form a saturated cyclic group, only one of $R^2$ or $R^3$ (which are substituents on the cyclic ring) can represent a silyl group.

More preferably, at least one of $R^{10}$, $R^{11}$, or $R^{12}$ is selected from a linear or branched ($C_1$ to $C_{10}$) alkoxy group or a halogen group. Still more preferably, each of $R^{10}$, $R^{11}$, and $R^{12}$ are the same and are selected from methoxy, ethoxy, propoxy, butoxy, pentoxy, and chlorine groups. More preferably, is Structure Ia wherein n is 0, and $R^{10}$, $R^{11}$, and $R^{12}$ are ethoxy, e.g., $R^2$ and/or $R^3$ is a triethoxysilyl substituent.

In Formula Ia it is evident that when n is 0 the silyl functionality is connected directly to the polycyclic monomer (or repeat unit) through a silicon-carbon bond wherein the carbon atom of said silicon-carbon bond is supplied by a carbon atom on the polycyclic ring (i.e. a ring carbon atom). When n and n" are positive numbers other than 0 in Formulae Ia and Ib, respectively, it is evident that the silyl functionality is connected to the polycyclic ring (or repeat unit) through a moiety that contains a carbon-silicon bond. Less preferred of the silyl functionalities are those that are connected to the polycyclic ring by a moiety that contains a carbon-oxygen-silicon bond, e.g.,

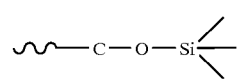

In Formula I above, m is preferably 0 or 1 as represented by structures Ic and Id, respectively, below:

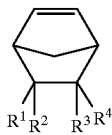

Ic

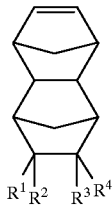

Id wherein $R^1$ to $R^4$ are as previously defined above. Monomers where m is 0, i.e., monomers of structure Ic, are especially preferred.

As discussed above substituents $R^1$ and $R^4$ together with the two ring carbon atoms to which they are attached can form a saturated cyclic group of 4 to 8 carbon atoms. Generically such monomers are represented by the following structure:

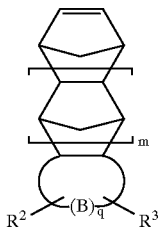

wherein B is a —$CH_2$— group and q is a number from 2 to 6. It should be apparent that when the carbon atom in the —$CH_2$— group represented by B is substituted by $R^2$ or $R^3$ (i.e., $R^2$ and $R^3$ are other than hydrogen), the —$CH_2$— group will have one less hydrogen atom attached thereto.

Representative structures are shown below:

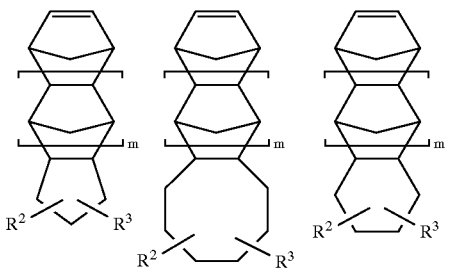

Substituents $R^1$ and $R^4$ can also be taken together with the two ring carbon atoms to which they are attached to form monomers represented by the following structure:

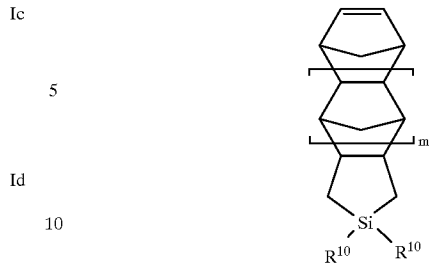

wherein $R^2$, $R^3$, $R^{10}$, and m above are as previously defined.

As used throughout the specification, the term "substituted" is meant to include linear and branched hydrocarbyl substituents such as ($C_1$ to $C_{10}$) alkyl, ($C_2$ to $C_{10}$) alkenyl, ($C_3$ to $C_{10}$) alkynyl; halogen substituents such as chlorine, fluorine, bromine, and iodine, hydroxy and linear and branched hydroxyalkyl, amino, and linear and branched aminoalkyl.

Illustrative examples of monomers of formula I include 5-triethoxysilyl-norbornene, 5-trichlorosilyl-norbornene, 5-trimethylsilyl norbornene, 5-chlorodimethylsilyl norbornene, 5-trimethoxysilyl norbornene, 5-methyldimethoxysilyl norbornene, 5-dimethylmethoxy norbornene.

The hydrocarbyl substituted polycyclic monomers useful in the practice of the present invention are selected from a monomer represented by the formula below:

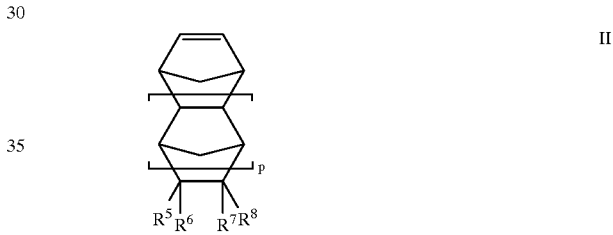

II wherein $R^5$, $R^6$, $R^7$, and $R^8$ independently represent hydrogen, linear and branched ($C_1$ to $C_{20}$) alkyl, hydrocarbyl substituted and unsubstituted ($C_5$ to $C_{12}$) cycloalkyl, hydrocarbyl substituted and unsubstituted ($C_6$ to $C_{40}$) aryl, hydrocarbyl substituted and unsubstituted ($C_7$ to $C_{15}$) aralkyl, ($C_3$ to $C_{20}$) alkynyl, linear and branched ($C_3$ to $C_{20}$) alkenyl (with the proviso that the alkenyl radical does not contain a terminal double bond that is the double bond in the radical must be an internal olefinic bond), or vinyl; any of $R^5$ and $R^6$ or $R^7$ and $R^8$ can be taken together to form a ($C_1$ to $C_{10}$) alkylidenyl group, $R^5$ and $R^8$ when taken with the two ring carbon atoms to which they are attached can represent saturated and unsaturated cyclic groups containing 4 to 12 carbon atoms or an aromatic ring containing 6 to 17 carbon atoms; and p is 0, 1, 2, 3, or 4. By "hydrocarbyl" is meant that the substituent is hydrogen or is composed solely of carbon and hydrogen atoms.

Illustrative examples of hydrocarbyl substituted monomers include 2-norbornene, 5-methyl-2-norbornene, 5-hexyl-2-norbornene, 5-decyl-2-norbornene, 5-phenyl-2-norbornene, 5-naphthyl-2-norbornene 5-ethylidene-2-norbornene, vinylnorbornene, dicyclopentadiene, dihydrodicyclopentadiene, tetracyclododecene, methyltetracyclododecene, tetracyclododecadiene, dimethyltetracyclododecene, ethyltetracyclododecene, ethylidenyl tetracyclododecene, phenyltetracyclododecene, trimers of cyclopentadiene (e.g., symmetrical and asymmetrical trimers).

Illustrative acyclic monomers suitable for use in the present invention include vinyl ethers such as methylvinylether, ethyl vinyl ether, isobutylene, styrene, vinyl triethoxy silane, 1,3-butadiene, 1,2-butadiene, diisobutylene, triisobutylene, α-methylstyrene, isoprene, tetrafluoroethylene and vinylcyclohexene epoxide. For brevity, cyclopentene and cyclooctene will be included herein as acyclic monomers.

An economical route for the preparation of the silyl functional (Formula I) or hydrocarbyl substituted (Formula II) polycyclic monomers of the invention relies on the Diels-Alder reaction in which cyclopentadiene (CPD) or substituted CPD is reacted with a suitably substituted dienophile at elevated temperatures to form a substituted polycyclic adduct generally shown by the following reaction scheme:

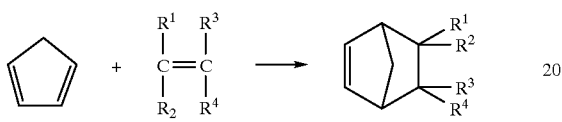

Other polycyclic adducts can be prepared by the thermal pyrolysis of dicyclopentadiene (DCPD) in the presence of a suitable dienophile. The reaction proceeds by the initial pyrolysis of DCPD to CPD followed by the Diels-Alder addition of CPD and the dienophile to give the adducts as shown below:

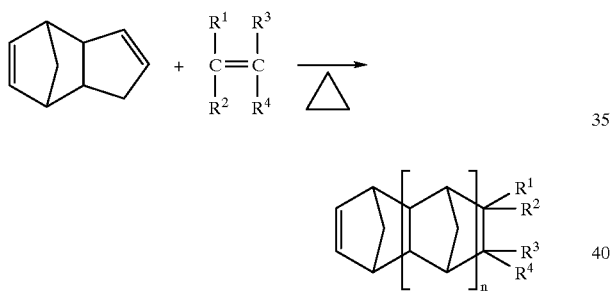

wherein $R^1$ to $R^4$ independently represents a silyl or hydrocarbyl group as defined under Formulae I and II above.

Polymers

One or more of the silyl substituted polycyclic monomers described under Formula I can be polymerized alone or in combination with one or more of the hydrocarbyl substituted polycyclic monomers described under Formula II and/or with one or more of the acylic monomers described above. Accordingly the present invention contemplates homopolymers and copolymers containing random repeating units derived from a monomer or monomers represented by Formula I, copolymers containing random repeating units derived from a monomer(s) represented by Formulae I and II, addition copolymers containing random repeating units derived from a monomer(s) represented by Formula I and an acyclic monomer(s) selected from the group described above, and copolymers containing random repeating units derived from a monomer(s) selected from Formulae I, II, and the acyclics described above. In addition, homopolymers and copolymers formed from the hydrocarbyl substituted polycyclic monomers of Formula II alone or in combination with the acyclic monomers described above can be polymerized in accordance with the process of this invention. Structurally, the foregoing polymers can be represented as follows:

III

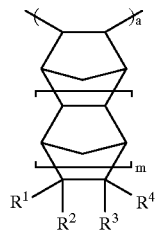

IV

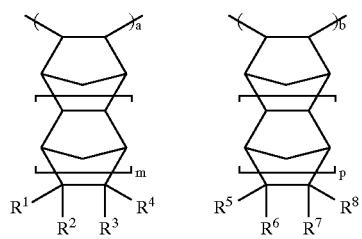

V

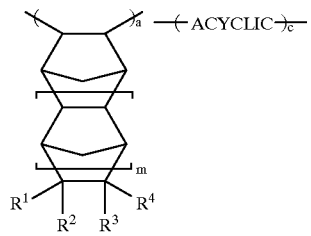

VI

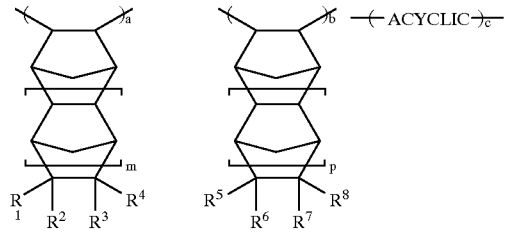

wherein $R^1$ to $R^8$, m, and p are the same as defined above, a, b, and c represent the number of repeating units in the polymer chain, and the term ACYCLIC represents acyclic repeating units derived from the acyclic monomers defined above.

Optionally, the polymers set forth under Formulae III to VI can be terminated with an olefinic end group. When the polycyclic monomers under Formula I in optional combination with the monomers described under Formula II are polymerized in the presence of the CTA's of this invention, polymers with olefinic end groups attached exclusively to the terminus thereof can be obtained. For example, when ethylene is employed as the CTA polymers of Formulae IIIa and IVa are obtained.

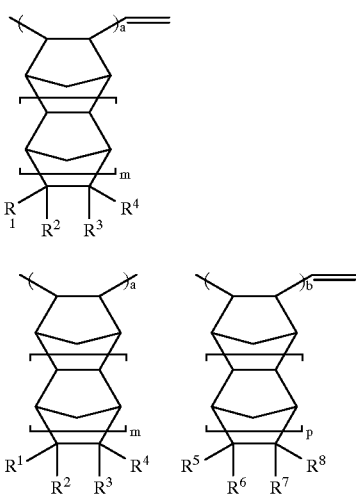

IIIa

IVa

When the ACYCLIC monomers of the present invention are polymerized with the polycyclic monomers of Formula I and/or Formula II in combination with the present CTA's (e.g. ethylene), olefinic terminated polymers are obtained only if a polycyclic repeat unit inserts at the terminal end of the polymer chain as represented by the structures below:

Va

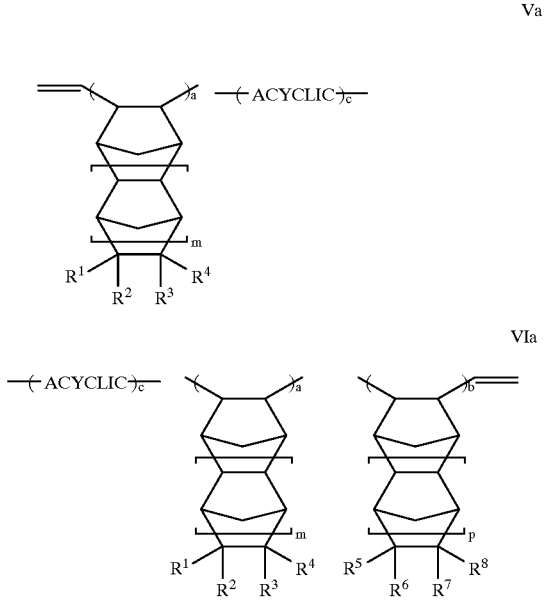

VIa

In Formulae IIIa to VIa, $R^1$ to $R^8$, m, p, a, b, c, and the term ACYCLIC are as defined above. As is apparent from the discussion above the foregoing polymers (other than homopolymers of structure I and Ia) are copolymers comprising statistically determined repeating units, therefore, the repeat units can be in any random order along the polymer chain or in a specific order allowing for block copolymer arrangements. Moreover, it should also be apparent that in Structures IIIa to VIa the olefinic end group will be attached to a silyl substituted polycyclic repeat unit or a hydrocarbyl substituted polycyclic repeat unit depending upon which polycyclic repeat unit is at the terminal end of the polymer chain.

By the term "derived" is meant that the polymeric repeating units are polymerized (formed) from at least one of the polycyclic monomers selected from Formula I, in optional combination with at least one polycyclic monomer of Formula II and/or an acyclic monomer(s) described above. The polymers can be addition polymerized in the presence of the catalyst systems of the invention.

The polymers of this invention can be classified by their solubility characteristics. In general, the nickel catalyzed polymers are readily soluble in hydrocarbons such as cyclohexane or toluene at room temperature. The palladium catalyzed polymers are markedly less soluble. In general, these polymers must be heated in chlorinated aromatic solvents such as o-dichlorobenzene before any significant solubility is noted. While not intending to be bound by any specific theory, we believe that the difference in solubility between the nickel catalyzed polymers and the palladium catalyzed polymers are due in all probability to differences in polymer microstructure.

The polymers of the present invention comprise polycyclic repeating units that are connected to one another via 2,3-linkages that are formed across the double bond contained in the norbornene moiety of the polycyclic monomer.

While not wanting to be bound to a specific microstructural arrangement or by a specific theory of invention, we believe that the difference in microstructure as confirmed by NMR spectra (as discussed hereinbelow) is attributable to differing tacticity (e.g., diisotactic vs. diheterotactic vs. disyndiotactic) and/or repeating unit enchainment in the polymer backbone. The palladium catalyzed polymers of this invention comprise repeating units that are connected via 2,3-linkages. The nickel catalyzed polymers of this invention show a variety repeating unit linkages. These polymers contain 2,7-repeating unit enchainment in addition to the typical 2,3-repeating unit enchainment.

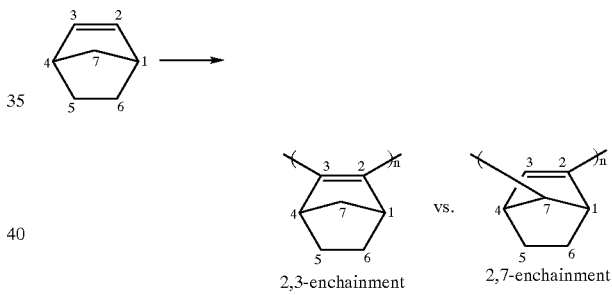

2,3-enchainment    2,7-enchainment

Other repeating unit linkages are also possible with the nickel catalyzed polymers. Again, without wishing to be bound by a theory of invention it is believed that the inserting repeating unit(s) on the growing polymer chain can undergo a Wagner-Meerwein type rearrangement to give microstructures with varying repeating unit linkages. The Wagner-Merwein rearrangement of norbornene nuclei is well documented in the literature, see for example, S. Winstein and D. Trifan, *Journal of the American Society*, 74, 154 (1952).

Accordingly, the polymers of the present invention comprise repeating unit linkages that are exclusively 2,3-enchained, 2,5-enchained, 2,6-enchained or, 2,7-enchained, as well as mixtures of the foregoing polymer chains. Also within the scope of this invention are polymers that have varying enchainment linkages on the same polymer backbone and any other rearranged microstructural embodiments thereof. It will be recognized that the numbering system is based on the simplest of the polycyclic repeat units. Actual numbering assignments can change depending on the structural complexity of the repeat units such as the numbering hierarchy for various substituents, relative position of unsaturation in the ring, and number of cyclic structures in the unit. What is important is the relative position of each linkage to one another.

As will be discussed below, the differing repeating unit enchainment schemes can be controlled by the catalyst employed (e.g., Group VIII metal, the ligand field around the Group VIII metal, the solvent, and the counteranion employed).

The polymers of the present invention contain from about 0.1 to 100 mole percent of silyl functional polycyclic repeating units, preferably from about 1 to 50 mole percent, more preferably from about 3 to 25 mole percent, and most preferably from about 5 to 20 mole percent.

The present polymers have excellent physical properties, e.g., low moisture absorption (<0.1 weight percent), low dielectric constant (<2.6), low dielectric loss (0.001), excellent toughness (up to 10 percent or higher strain at break as measured on a B F Goodrich Portable Universal Tester™), and excellent adhesive properties on alumina, silica, and especially on copper, silver, and gold.

The present polymers exhibit a broad range of $T_g$s from about 100° C. to about 400° C. The $T_g$s generally range from about 250° C. (i.e. 251) to 390° C. Preferably from at least 275° C., more preferably from at least 300° C., and most preferably from at least 340° C.

Surprisingly, we have found that the silyl functional addition polymers of this invention adhere tenaciously to copper and the noble metals such as silver, platinum, and gold. Moreover, we have also discovered that the present polymers get tougher with increasing levels of silyl functionality which functionality, we believe, acts as a crosslinker upon cure. Both of these phenomena are contrary to the teachings of the art. It is known that silyl functionalities bond very poorly if at all to copper and the noble metals such as gold. Additionally, it is also a well known fact that increased crosslink density increases the brittleness of a polymer.

Without wishing to be bound by theory of invention we believe that the polycyclic nature of the polymer backbone in combination with the silyl functionality that is pendant from the polycyclic repeating units produces a synergistic toughening effect and enables the polymer to adhere tenaciously to a variety of metal and inorganic substrates. In particular, we believe that it is regio- and stereo-chemistry of the polymer backbone which determines the distribution and orientation of the silyl functionalities which in turn governs the polymer's adhesive properties.

The silyl functional polycyclic addition polymers of the present invention can be post reacted in the presence of nucleophilic agents to selectively modify the silyl substituent. In this way various moieties can be specifically grafted onto the silyl functionality that is pendant from the present polymers. The polymers of the invention that are suitable for grafting must contain a reactive silyl functionality constituting at least one silicon-halogen bond or at least one silicon-oxygen bond as shown below:

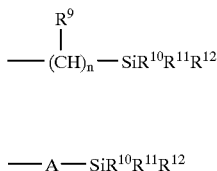

wherein $R^9$ to $R^{12}$, A, and n are as previously defined with the proviso that a least one of $R^{10}$ to $R^{12}$ is a halogen atom selected from the group consisting of chlorine, bromine, fluorine, iodine, and mixtures thereof or ($C_1$ to $C_5$) alkoxy group. The preferred halogen is chlorine and the preferred alkoxy group is ethoxy.

Suitable nucleophilic agents include organometal compounds of Group IA and IIA, Grignard reagents; anionically polymerized oligomers and polymers; and hydroxy containing compositions. The Group IA and IIA organometal compounds are represented by the formula R'G wherein G is a metal selected from Group IA and IIA of the Periodic Table of the Elements such as, for example, lithium, sodium, and magnesium. R' is an organo group selected from linear and branched ($C_1$ to $C_5$) alkyl, linear and branched ($C_1$ to $C_5$) alkoxy, substituted and unsubstituted ($C_6$ to $C_{20}$) aryl, substituted and unsubstituted ($C_5$ to $C_{10}$) cycloalkyl, and substituted and unsubstituted ($C_5$ to $C_{10}$) cycloalkenyl. Representative compounds are methyllithium, butyllithium, sec-butyllithium, tert-butyllithium, hexyllithium, lithium methoxide, lithium ethoxide, lithium isopropoxide, phenyllithium, lithium phenoxide, lithium phenylacetylide, and lithium cyclopentadienylide. Although lithium compounds are specifically set forth above the sodium and magnesium counterparts thereof are also contemplated within the scope of this invention.

Exemplary of the Grignard reagents are allylmagnesium bromide, allylmagnesium chloride, benzylmagnesium chloride, butylmagnesium chloride, sec-butylmagnesium chloride, tert-butylmagnesium chloride, 4-tert-butylphenylmagnesium bromide, cyclohexylmagnesium chloride, dodecylmagnesium bromide, ethylmagnesium bromide, hexylmagnesium bromide, and 4-fluorophenylmagnesium bromide.

Suitable anionically polymerized oligomers and polymers are those polymerized from monomers selected from dienes such as isoprene and butadiene; styrenics such as styrene, α-methyl styrene and p-methyl styrene and para-t-butyl styrene; acrylonitrile; α-methyl-α-cyanoacrylate; acrylates such as methyl methacrylate, butyl methacrylate, butyl acrylate, ethyl acrylate, 2-ethyl hexylacrylate, vinyl ketones such as methyl vinyl ketone; vinyl pyridines; epoxides such as ethylene oxide, propylene oxide; cyclic esters such as lactones; and cyclic siloxanes such as hexamethylcyclotrisiloxane (D3).

The anionic oligomers and polymers are formed in the presence of a suitable anionic polymerization initiator in an appropriate solvent. The reaction conditions, initiators, and solvents that are employed will depend on the specific monomer that is to be polymerized. Such conditions, initiators and solvent systems are well known in the art and need not be discussed in detail here. Generally, lithium alkyls, alkali metal alkoxides or lithium or sodium amides are employed as initiators. Suitable solvents include hydrocarbon and ether solvents such as cyclohexane, toluene, and THF.

Using styrene as an example, reactive polystyryl moiety can be prepared by anionically polymerizing styrene monomer in the presence of sec-butyl lithium in cyclohexane or THF to obtain an oligomeric or polymeric living polystyryl anion. Direct addition of these reactive anions into a solution of the silyl functionalized polymers of the invention at room temperature results in the reaction of the polystyryl anion with the halogen atom(s) on the silicon atom of the silyl functionality. The styryl moiety will graft at each halogen atom.

The grafted polymer embodiment of the present invention can be prepared by reacting the halogen or alkoxy containing silyl functional polycyclic addition polymers of this invention (e.g., containing the halogen containing silyl functional groups described under Ie and If above) with a molar excess of the nucleophilic agents described above in a suitable solvent such as tetrahydrofuran (THF) under an inert gas atmosphere. The reaction is conducted at room temperature (approximately 25° C.). The nucleophilic agent reacts with the halogen atom on the silyl functionality enabling the organic moiety of the nucleophilic reactant to graft to the silicon atom of the silyl functionality. The organic moiety will graft at each halogen atom. For example, if the silicon atom of the silyl functionality is monosubstituted with halogen then only one organic moiety will graft to the silicon atom. If the silicon atom is trisubstituted with halogen then three organic moieties will graft to the silicon atom. The following reaction diagram is illustrative of the grafting reaction:

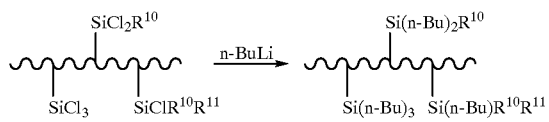

The halogen containing silyl functional polycyclic addition polymers of the invention can also be reacted with any hydroxy compound. Examples of hydroxy containing co-reactants include aliphatics and aromatics such as ($C_1$ to $C_{30}$) aliphatic alcohols and above, ($C_6$ to $C_{24}$) aromatic alcohols, hydroxy containing oligomers and polymers, and the like. Hydroxy terminated azo compounds, stilbenes, diphenylacetylenes, and hydroxy containing heterocyclics are also contemplated.

The hydroxy containing compounds are co-reacted with the halogen containing silyl functional polycyclic addition polymers of this invention to give graft copolymers that graft through the halogen substituent on the silicon atom of the silyl functionality. The desired hydroxy containing oligomer polymer or compound is dissolved in an appropriate solvent followed by the addition of this solution at room temperature in a solution containing the silyl functional polymer of the invention. A base such as pyridine or trialkyl amine is then added as an acid acceptor. As with the nucleophilic reactants, the hydroxy group will graft at each halogen atom. Hydrogen halide is eliminated and the reactant grafts through an oxygen atom to the silicon.

After the post reaction of the silyl functional polycycloolefins of this invention with the foregoing co-reactive moieties, $R^{10}$, $R^{11}$, and $R^{12}$ further represents substituted and unsubstituted ($C_5$ to $C_{10}$) cycloalkyl, substituted and unsubstituted ($C_5$ to $C_{10}$) cycloalkenyl, polyisoprenyl, polystyryl, polyacryloyl, grafted polyvinyl ketones, grafted polyvinyl pyridine, grafted polyethylene oxide, grafted polypropylene oxide, and grafted polysiloxane.

The polymers of the present invention can also be post functionalized via a hydrosilation reaction. A hydrosilation reaction involves the addition reaction of a silicon hydride functionality across any unsaturated carbon-carbon functionality. An illustrative example of the reaction is shown below:

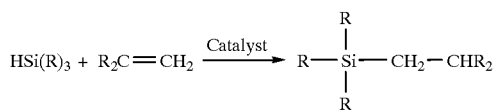

The hydrosilation reaction can be initiated by heat, light, radiation, and peroxides, but such initiators are less preferred. In the present invention hydrosilation reactions catalyzed by Group VIII precious metal complexes (platinum, rhodium, and ruthenium) are preferred. Platinum catalysts such as platinum-divinyltetramethyldisiloxane complex or hydroplatinic acid are most preferred. These catalysts are used with the polymer embodiments of the invention that contain carbon-carbon unsaturation, followed by the addition of a silicon compound containing a silyl hydride functionality. The reaction is conducted in an appropriate solvent such as toluene or chlorobenezene. Based on the catalyst used, the reaction can be carried out either at room temperature or at elevated temperatures.

Illustrative of the polymers of the present invention that contain carbon-carbon unsaturation are those that contain repeat units formed from the monomers of Formula II wherein $R^5$ and $R^8$ are taken with the two ring carbon atoms to which they are attached to form an unsaturated cyclic group of 4 to 8 carbon atoms (pendant unsaturation). An illustrated example of the reaction is shown below:

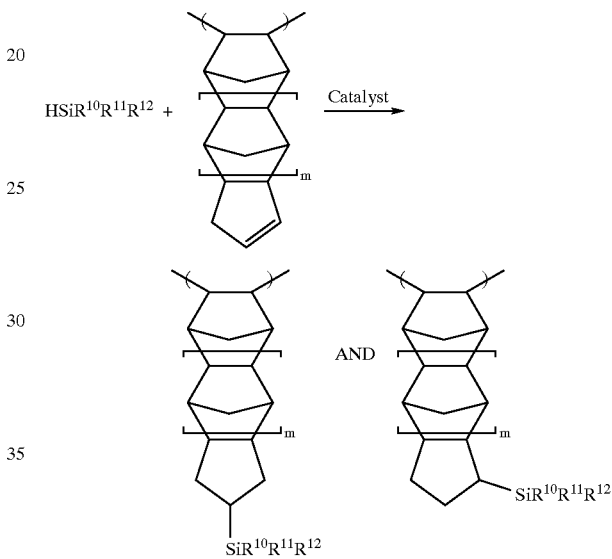

wherein $R^{10}$ to $R^{12}$ are as previously defined under Ia and Ib above.

If the carbon-carbon unsaturated functionality is present at the terminal end of the polymer as exemplified in structures IIIa to VIa, a silyl functionality will add across the double bond to the terminal end of the polymer chain. In still another embodiment if both pendant and terminal unsaturation are present, a silyl group will bond at both locations in the polymer chain.

Unlike free radical grafting where there is no control over the grafting site, the foregoing processes offer selective grafting of moieties to specific sites on the polymer in specific amounts.

Post reaction grafts can be utilized to modify the properties and/or aid in the processing of the instant polymers. Physical property modifiers, processing aids, and the like can be covalently incorporated into the polymer backbone by the methods discussed above. In this way the property enhancer or processing aid remains permanently bound in the polymer and cannot be extracted during subsequent processing and/or use.

Although polymers such as polyimides/polynorbornenes meet most of the material requirements for microelectronics applications, advancing technologies have placed more stringent demands on the material, which makes it highly desirable to improve the electrical performance of these materials by reducing the dielectric constant by either chemical or physical means. Incorporation of fluorine in polyimides has been used in the past to lower the dielectric constant chemically, and the same approach is expected to work with the present polymers.

A physical approach to reduce the dielectric constant substantially, while maintaining the desired thermal and mechanical properties of the instant polymers would be to generate a foamed morphology. The reduction in the dielectric constant can be achieved by replacing the polymer matrix with air pockets. Air has a dielectric constant of 1. Although the concept of polymeric foams has existed for quite some time, current aerospace and transportation industries utilize either foaming agents, or inclusion of microspheres, or partial degradation of the polymer to generate a foam. However, most of these high temperature polymeric foams have characteristic void or cell sizes which are large (generally in the tens of microns), which is highly impractical in the area of thin film dielectric applications (generally less than 25 microns). The above foaming technique also does not have any control over the morphology of the pores developed, i.e., both open and closed cell pores are produced. Foamed polymers having a pore size in the nanometer range have been recently developed by using the concept of microphase separated polyimide block or graft copolymers, wherein the copolymer is comprised of a thermally stable polyimide block with a thermal/radiation labile block or graft as the dispersed phase. Upon a thermal/radiation treatment, the thermally labile dispersed phase undergoes thermolysis or chain cleavage, leaving micropores where the size and shape of the pores are dictated by the initial copolymer morphology (domains typically less than 50 nm).

To generate such a graft copolymer, a reactive oligomer with appropriate functionality at one end of the chain would be required. The reactive oligomer is simply incorporated into the polymer backbone by copolymerization with the appropriate monomers or via post modification of the polymer backbone. Thermally labile blocks that can be grafted to the backbone are polymethyl methacrylate, polyethylene oxide, polypropylene oxide, aliphatic polyesters, aliphatic polycarbonates, and the like. The labile blocks can be attached to the polycyclic backbone via free radical grafting or through the hydrosilation reaction of a vinyl terminated labile block with the polycyclic backbone containing silyl hydride groups. Once generated, the graft copolymers can be spin coated on to a silicon wafer and later foamed via thermal or UV induced degradation.

The polymers of this invention may be used directly or may be modified to impart other desirable characteristics. For instance, they can be filled with high dielectric constant ceramics (e.g., barium titanate, lead zirconate titanate (PZT), lead lanthanum zirconate titanate (PLZT), or any other high dielectric constant metal/ceramic alloy). The PZT's and PLZT's have dielectric constants ranging from 800 to 1000. However, these materials require processing in excess of 500° C. and highly filled polymers offer a low temperature route to attain reasonably high dielectric constants. Very high filler contents are necessary to overcome the series additivity of capacitance, where the total capacitance is dominated by the low dielectric material due to the inverse additivety of the components. Therefore high filler content is required which allows parallel additivity so that high capacitance can be achieved. For example, the polymer of Example 95 with approximately 75 vol % BaTiO$_3$ (surface treated with hexamethyldisilazane) has a dielectric constant of 21 at 10 kilohertz. The silyl functionality providing the adhesion to substrate surfaces also provides adhesion to the ceramic filler and allows higher filler content. This can be utilized in other filled composites as well, for instance with SiO$_2$ filler, TiO$_2$, and other oxide fillers and pigments.

Other fillers which are of importance are those with high thermal conductivity, in direct analogy to the capacitance discussion it is important to have high filler content to allow the thermal conductivity to add in parallel rather than in series. Here filler comprised of particles or fibers of aluminum nitride, boron nitride, pitch or polyacrylonitrile (PAN) based carbon fibers and silicon carbide whiskers are of particular interest. Other materials with high thermal conductivity can also be utilized. Materials with high thermal conductivity but electrically insulative are particularly preferred.

The present polymers can be co-reacted with sol-gel materials to form ceramic hybrids. For instance, tetraethoxysilane (TEOS) may be co-reacted with the triethoxy silane moiety on the instant polymer to form very small domain size structures and co-continuous networks. Other sol-gel co-reactants contemplated for use in this invention are tetraethoxygermane, tetraethoxytin, and tetraethoxylead, ethoxyzirconium, tetraethoxytitanium, triethoxyaluminum, and tetraethoxyplatinum.

The polymers of the present invention can also be filled with small droplets of liquid crystalline eutectic mixtures enabling polymer dispersed liquid crystal displays to be produced. When the liquid crystal filled polymer film is sandwiches between two transparent electrodes of indium tin oxide (ITO), it is anticipated that the low dielectric constant of the polymer will enable shutters and displays which exhibit very low hystersis. In the absence of an external bias the liquid crystal domains scatter light but with an appropriate voltage bias the liquid crystal domains align and the film becomes transparent.

Catalyst Systems

The foregoing polymer systems are polymerized from reaction mixtures comprising at least one silyl functional polycyclic monomer, a solvent, and a catalyst system containing a Group VIII ion source, and optionally a chain transfer agent. The catalyst system can be a preformed single component Group VIII metal based catalyst or a multicomponent Group VIII catalyst.

Single Component Systems

The single component catalyst system of this invention comprises a Group VIII metal cation complex and a weakly coordinating counteranion as represented by the following formula:

cation complex    counteranion wherein L represents a ligand containing 1, 2, or 3 π-bonds; M represents a Group VIII transition metal; X represents a ligand containing 1 σ-bond and between 0 to 3 π-bonds; y is 0, 1, or 2 and z is 0 or 1 and wherein y and z cannot both be 0 at the same time, and when y is 0, a is 2 and when y is 1, a is 1; and CA is a weakly coordinating counteranion.

The phrase "weakly coordinating counteranion" refers to an anion which is only weakly coordinated to the cation, thereby remaining sufficiently labile to be displaced by a neutral Lewis base. More specifically the phrase refers to an anion which when functioning as a stabilizing anion in the catalyst system of this invention does not transfer an anionic substituent or fragment thereof to the cation, thereby forming a neutral product. The counteranion is non-oxidative, non-reducing, non-nucleophilic, and relatively inert.

L is a neutral ligand that is weakly coordinated to the Group VIII metal cation complex. In other words, the ligand is relatively inert and is readily displaced from the metal cation complex by the inserting monomer in the growing polymer chain. Suitable π-bond containing ligands include ($C_2$ to $C_{12}$) monoolefinic (e.g., 2,3-dimethyl-2-butene), diolefinic ($C_4$ to $C_{12}$) (e.g., norbornadiene) and ($C_6$ to $C_{20}$) aromatic moieties. Preferably ligand L is a chelating bidentate cyclo($C_6$ to $C_{12}$) diolefin, for example cyclooctadiene (COD) or dibenzo COD, or an aromatic compound such as benzene, toluene, or mesitylene.

Group VIII metal M is selected from Group VIII metals of the Periodic Table of the Elements. Preferably M is selected from the group consisting of nickel, palladium, cobalt, platinum, iron, and ruthenium. The most preferred metals are nickel and palladium.

Ligand X is selected from (i) a moiety that provides a single metal-carbon σ-bond (no π bonds) to the metal in the cation complex or (ii) a moiety that provides a single metal carbon σ-bond and 1 to 3 π-bonds to the metal in the cation complex. Under embodiment (i) the moiety is bound to the Group VIII metal by a single metal-carbon σ-bond and no π-bonds. Representative ligands defined under this embodiment include ($C_1$ to $C_{10}$) alkyl moieties selected from methyl, ethyl, linear and branched moieties such as propyl, butyl, pentyl, neopentyl, hexyl, heptyl, octyl, nonyl and decyl and ($C_7$ to $C_{15}$) aralkyl such as benzyl. Under embodiment (ii) generally defined above, the cation has a hydrocarbyl group directly bound to the metal by a single metal-carbon σ-bond, and also by at least one, but no more than three π-bonds. By hydrocarbyl is meant a group that is capable of stabilizing the Group VIII metal cation complex by providing a carbon-metal σ-bond and one to three olefinic π-bonds that may be conjugated or non-conjugated. Representative hydrocarbyl groups are ($C_3$ to $C_{20}$) alkenyl which may be non-cyclic, monocyclic, or polycyclic and can be substituted with linear and branched ($C_1$ to $C_{20}$) alkoxy, ($C_6$ to $C_{15}$) aryloxy or halo groups (e.g., Cl and F).

Preferably X is a single allyl ligand, or, a canonical form thereof, which provides a σ-bond and a π-bond; or a compound providing at least one olefinic π-bond to the metal, and a σ-bond to the metal from a distal carbon atom, spaced apart from either olefinic carbon atom by at least two carbon-carbon single bonds (embodiment iii).

It should be readily apparent to those skilled in the art that when ligand L or X is absent (i.e., y or z is zero), the metal cation complex will be weakly ligated by the solvent in which the reaction was carried out. Representative solvents include but are not limited to halogenated hydrocarbons such as carbon tetrachloride, chloroform, dichloromethane, 1,2-dichloroethane and aromatic solvents such as benzene, toluene, mesitylene, chlorobenzene, and nitrobenzene, and the like. A more detailed discussion on appropriate solvents will follow.

Selected embodiments of the Group VIII metal cation complexes of the single component catalyst systems of this invention are shown below.

Structure VII illustrates embodiment (i) wherein ligand X is a methyl group that is bound to the metal via a single metal-carbon σ-bond, and ligand L is COD that is weakly coordinated to the palladium metal via two olefinic π-bonds. In the structure below M preferably represents palladium or nickel.

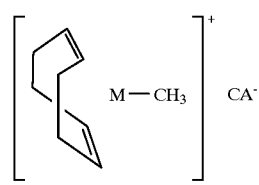

Structures VIII, IX, and X illustrate various examples of embodiment (ii) wherein X is an allyl group that is bound to the metal (palladium is shown for illustrative purposes only) via a single metal-carbon σ-bond and at least one but no more than three π-bonds.

In Structure VIII, L is not present but an aromatic group providing three π-bonds is weakly coordinated to the palladium metal; X is an allyl group providing a single metal-carbon σa-bond and an olefinic π-bond to the palladium.

In Structure IX, L is COD and X is an allyl group providing a metal-carbon σ-bond and an olefinic π-bond to the palladium.

Structure X illustrates an embodiment wherein ligand X is an unsaturated hydrocarbon group that provides a metal-carbon σ-bond, a conjugated π-bond and two additional π-bonds to the palladium; L is absent.

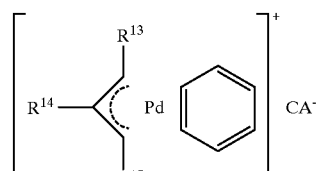

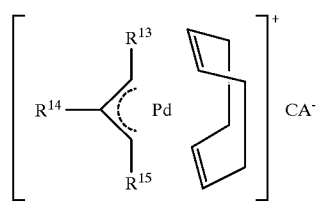

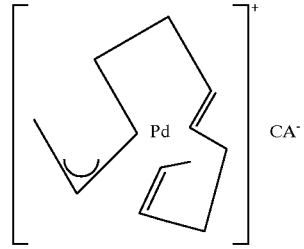

Substituents $R^{13}$, $R^{14}$, $R^{15}$ will be described in detail below.

Structures XI and XII illustrate examples of embodiment (iii) wherein L is COD and X is a ligand that provides at least one olefinic π-bond to the Group VIII metal and a σ-bond to the metal from a distal carbon atom, spaced apart from either olefinic carbon atom by at least two carbon-carbon single bonds.

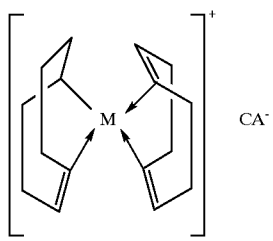

(XI)

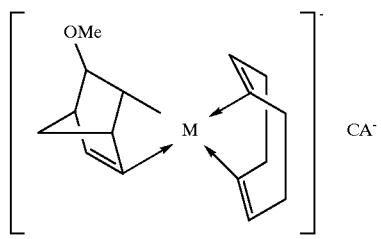

(XII)

The above-described Group VIII cation complexes are associated with a weakly coordinating or non-coordinating counteranion, CA⁻, which is relatively inert, a poor nucleophile and provides the cation complex with essential solubility in the reaction solvent. The key to proper anion design requires that it be labile, and stable and inert toward reactions with the cationic Group VIII metal complex in the final catalyst species and that it renders the single component catalyst soluble in the solvents of this invention. The anions which are stable toward reactions with water or Brønsted acids, and which do not have acidic protons located on the exterior of the anion (i.e., anionic complexes which do not react with strong acids or bases) possess the stability necessary to qualify as a stable anion for the catalyst system. The properties of the anion which are important for maximum lability include overall size, and shape (i.e., large radius of curvature), and nucleophilicity.

In general, a suitable anion may be any stable anion which allows the catalyst to be dissolved in a solvent of choice, and has the following attributes: (1) the anion should form stable salts with the aforementioned Lewis acid, Brønsted acids, reducible Lewis Acids, protonated Lewis bases, thallium and silver cations; (2) the negative charge on the anion should be delocalized over the framework of the anion or be localized within the core of the anion; (3) the anion should be a relatively poor nucleophile; and (4) the anion should not be a powerful reducing or oxidizing agent.

Anions that meet the foregoing criteria can be selected from the group consisting of a tetrafluoride of Ga, Al, or B; a hexafluoride of P, Sb, or As; perfluoro-acetates, propionates and butyrates, hydrated perchlorate; toluene sulfonates, and trifluoromethyl sulfonate; and substituted tetraphenyl borate wherein the phenyl ring is substituted with fluorine or trifluoromethyl moieties. Selected examples of counteranions include $BF_4^-$, $PF_6^-$, $AlF_3O_3SCF_3^-$, $SbF_6^-$, $SbF_5SO_3F^-$, $AsF_6^-$, trifluoroacetate ($CF_3CO_2^-$), pentafluoropropionate ($C_2F_5CO_2^-$), heptafluorobutyrate ($CF_3CF_2CF_2CO_2^-$), perchlorate ($ClO_4^- \cdot H_2O$), p-toluenesulfonate (p-$CH_3C_6H_4SO_3^-$) and tetraphenyl borates represented by the formula:

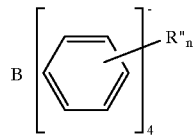

wherein R" independently represents hydrogen, fluorine and trifluoromethyl and n is 1 to 5.

Preferred single component catalysts of the present invention are represented by the formula:

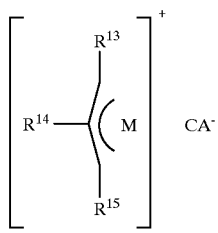

(XIII)

The catalyst comprises a π-allyl Group VIII metal complex with a weakly coordinating counteranion. The allyl group of the metal cation complex is provided by a compound containing allylic functionality which functionality is bound to the M by a single carbon-metal σ-bond and an olefinic π-bond. The Group VIII metal M is preferably selected from nickel and palladium with palladium being the most preferred metal. Surprisingly, it has been found that these single component catalysts wherein M is palladium and the cation complex is devoid of ligands other than the allyl functionality (i.e., $L_y=0$), exhibit excellent activity for the polymerization of functional polycyclic monomers such as the silyl containing monomers of this invention. As discussed above, it will be understood that the catalysts are solvated by the reaction diluent which diluent can be considered very weak ligands to the Group VIII metal in the cation complex.

Substituents $R^{13}$, $R^{14}$, and $R^{15}$ on the allyl group set forth above in Structures VIII, IX and XIII are each independently hydrogen, branched or unbranched ($C_1$ to $C_5$) alkyl such as methyl, ethyl, n-propyl, isopropyl, and t-butyl, ($C_6$ to $C_{14}$) aryl, such as phenyl and naphthyl, ($C_7$ to $C_{10}$) aralkyl such as benzyl, —COOR¹⁶, —(CH₂)ₙOR¹⁶, Cl and ($C_5$ to $C_6$) cycloaliphatic, wherein $R^{16}$ is ($C_1$ to $C_5$) alkyl, such as methyl, ethyl, n-propyl, isopropyl, n-butyl and i-butyl, and n is 1 to 5.

Optionally, any two of $R^{13}$, $R^{14}$, and $R^{15}$ may be linked together to form a cyclic- or multi-cyclic ring structure. The cyclic ring structure can be carbocyclic or heterocyclic. Preferably any two of $R^{13}$, $R^{14}$, and $R^{15}$ taken together with the carbon atoms to which they are attached form rings of 5 to 20 atoms. Representative heteroatoms include nitrogen, sulfur and carbonyl. Illustrative of the cyclic groups with allylic functionality are the following structures:

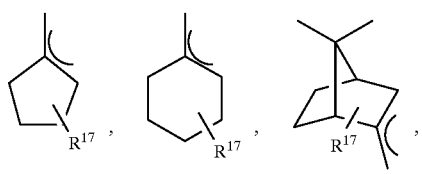

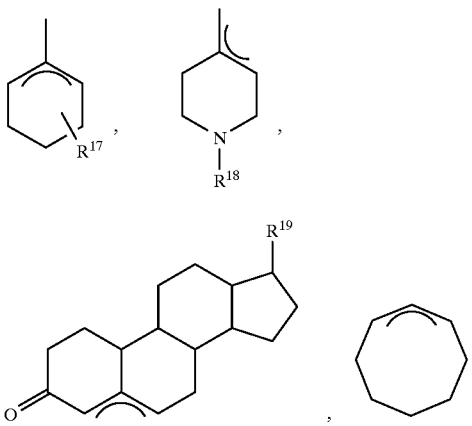

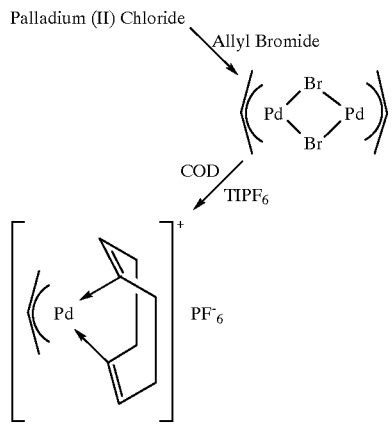

wherein $R^{17}$ is hydrogen, linear or branched ($C_1$ to $C_5$) alkyl such as methyl, ethyl, n-propyl, isopropyl, n-butyl, isobutyl, and pentyl, $R^{18}$ is methylcarbonyl, and $R^{19}$ is linear or branched ($C_1$ to $C_{20}$) alkyl. Counteranion $CA^-$ is defined as above.

Additional examples of π-allyl metal complexes are found in R. G. Guy and B. L. Shaw, *Advances in Inorganic Chemistry and Radiochemistry*, Vol. 4, Academic Press Inc., New York, 1962; J. Birmingham, E. de Boer, M. L. H. Green, R. B. King, R. Köster, P. L. I. Nagy, G. N. Schrauzer, *Advances in Organometallic Chemistry*, Vol. 2, Academic Press Inc., New York, 1964; W. T. Dent, R. Long and A. J. Wilkinson, J. *Chem. Soc.,* (1964) 1585; and H. C. Volger, Rec. Trav. Chim. Pay Bas, 88 (1969) 225; which are all hereby incorporated by reference.

The single component catalyst of this invention can be prepared by combining a ligated Group VIII metal halide component with a salt that provides the counteranion for the subsequently formed metal cation complex. The ligated Group VIII metal halide component, counteranion providing salt, and optional π-bond containing component, e.g., COD, are combined in a solvent capable of solvating the formed single component catalyst. The solvent utilized is preferably the same solvent chosen for the reaction medium. The catalyst can be preformed in solvent or can be formed in situ in the reaction medium.

Suitable counteranion providing salts are any salts capable of providing the counteranions discussed above. For example, salts of sodium, lithium, potassium, silver, thallium, and ammonia, wherein the anion is selected from the counteranions ($CA^-$) defined previously. Illustrative counteranion providing salts include $TlPF_6$, $AgPF_6$, $AgSbF_6$, $LiBF_4$, $NH_4PF_6$, $KAsF_6$, $AgC_2F_5CO_2$, $AgBF_4$ $AgCF_3CO_2$, $AgClO_4 \cdot H_2O$, $AgAsF_6$, $AgCF_3CF_2CF_2CO_2$, $AgC_2F_5CO_2$, $(C_4H_9)_4NB(C_6F_5)_4$, and

The specific catalyst: $[allyl-Pd-COD]^+PF_6^-$ is preformed by forming a ligated palladium halide component, i.e., bis(allyl Pd bromide), which is then subjected to scission with a halide abstracting agent in the form of a counteranion providing salt, i.e., $TlPF_6$ in the presence of COD. The reaction sequence is written as follows:

When partitioned, only one COD ligand remains, which is bonded by two π-bonds to the palladium. The allyl functionality is bonded by one metal-carbon σ-bond and one π-bond to the palladium.

For the preparation of the preferred π-allyl Group VIII metal/counteranion single component catalysts represented in Structure XIII above, i.e., when M is palladium, allylpalladium chloride is combined with the desired counteranion providing salt, preferably silver salts of the counteranion, in an appropriate solvent. The chloride ligand comes off the allyl palladium complex as a precipitate of silver chloride (AgCl) which can be filtered out of the solution. The allylpalladium cation complex/counteranion single component catalyst remains in solution. The palladium metal is devoid of any ligands apart from the allylic functionality.

Multicomponent Systems

The multicomponent catalyst system embodiment of the present invention comprises a Group VIII metal ion source, in combination with one or both of an organometal cocatalyst and a third component. The cocatalyst is selected from organoaluminum compounds, dialkylaluminum hydrides, dialkyl zinc compounds, dialkyl magnesium compounds, and alkyllithium compounds.

The Group VIII metal ion source is preferably selected from a compound containing nickel, palladium, cobalt, iron, and ruthenium with nickel and palladium being most preferred. There are no restrictions on the Group VIII metal compound so long as it provides a source of catalytically active Group VIII metal ions. Preferably, the Group VIII metal compound is soluble or can be made to be soluble in the reaction medium.

The Group VIII metal compound comprises ionic and/or neutral ligand(s) bound to the Group VIII metal. The ionic and neutral ligands can be selected from a variety of monodentate, bidentate, or multidentate moieties and combinations thereof.

Representative of the ionic ligands that can be bonded to the metal to form the Group VIII compound are anionic ligands selected from the halides such as chloride, bromide, iodide or fluoride ions; pseudohalides such as cyanide, cyanate, thiocyanate, hydride; carbanions such as branched and unbranched ($C_1$ to $C_{40}$) alkylanions, phenyl anions; cyclopentadienylide anions; π-allyl groupings; enolates of β-dicarbonyl compounds such as acetylacetonate (4-pentanedionate), 2,2,6,6-tetrametyl-3,5-heptanedionate, and halogenated acetylacetonoates such as 1,1,1,5,5,5- hexafluoro-2,4-pentanedionate, 1,1,1-trifluoro-2,4, pentanedionate; anions of acidic oxides of carbon such as carboxylates and halogenated carboxylates (e.g., acetates, 2-ethylhexanoate, neodecanoate, trifluoroacetate, etc.) and oxides of nitrogen (e.g., nitrates, nitrites, etc.) of bismuth (e.g., bismuthate, etc.), of aluminum (e.g., aluminates, etc.), of silicon (e.g., silicate, etc.), of phosphorous (e.g., phosphates, phosphites, phosphines, etc.) of sulfur (e.g., sulfates such as triflate, p-toluene sulfonate, sulfites, etc.); ylides; amides; imides; oxides; phosphides; sulfides; ($C_6$ to $C_{24}$) aryloxides, ($C_1$ to $C_{20}$) alkoxides, hydroxide, hydroxy ($C_1$ to $C_{20}$) alkyl; catechols; oxalate; chelating alkoxides and aryloxides. Palladium compounds can also contain complex anions such as $PF^-_6$, $AlF_3O_3SCF^-_3$, $SbF^-_6$ and compounds represented by the formulae:

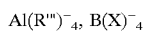

wherein R''' and X independently represent a halogen atom selected from Cl, F, I, and Br, or a substituted or unsubstituted hydrocarbyl group. Representative of hydrocarbyl are ($C_1$ to $C_{25}$) alkyl such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonodecyl, eicosyl, heneicosyl, docosyl, tricosyl, tetracosyl, pentacosyl, and isomeric forms thereof, ($C_2$ to $C_{25}$) alkenyl such as vinyl, allyl, crotyl, butenyl, pentenyl, hexenyl, octenyl, nonenyl, decenyl, undecenyl, dodecenyl, tridecenyl, tetradecenyl pentadecenyl, hexadecenyl, heptadecenyl, octadecenyl, nonadecenyl, pentacosenyl, and isomeric forms thereof. ($C_6$ to $C_{25}$) aryl such as phenyl, tolyl, xylyl, naphthyl, and the like; ($C_7$ to $C_{25}$) aralkyl such as benzyl, phenethyl, phenpropyl, phenbutyl, phenhexyl, napthoctyl, and the like; ($C_3$ to $C_8$) cycloalkyl such as cyclopropyl, cyclobutyl, cyclopentyl, cyclohexyl, cycloheptyl, cyclooctyl, 2-norbornyl, 2-norbonenyl, and the like. In addition to the above definitions X represents the radical:

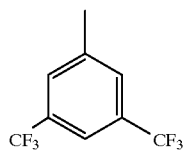

The term "substituted hydrocarbyl" means the hydrocarbyl group as previously defined wherein one or more hydrogen atoms have been replaced with a halogen atom such as Cl, F, Br, and I (e.g., as in the perfluorophenyl radical); hydroxyl; amino; alkyl; nitro; mercapto, and the like.

The Group VIII metal compounds can also contain cations such as, for example, organoammonium, organoarsonium, organophosphonium, and pyridinium compounds represented by the formulae:

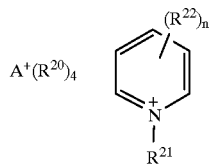

wherein A represents nitrogen, arsenic, and phosphorous and the $R^{20}$ radical can be independently selected from hydrogen, branched or unbranched ($C_1$ to $C_{20}$) alkyl, branched or unbranched ($C_2$ to $C_{20}$) alkenyl, and ($C_1$ to $C_{16}$) cycloalkyl, e.g., cyclopentyl, cyclohexyl, cycloheptyl, cyclooctyl, and the like. $R^{21}$ and $R^{22}$ are independently selected from hydrogen, branched and unbranched ($C_1$ to $C_{50}$) alkyl, linear and branched ($C_2$ to $C_{50}$) alkenyl and ($C_5$ to $C_{16}$) cycloalkyl groups as defined above; and n is 1 to 5, preferably n is 1, 2, or 3, most preferably n is 1. The $R^{22}$ radicals preferably are attached to positions 3, 4, and 5 on the pyridine ring.

It should be noted that increasing the sum of the carbon atoms contained in the $R^{20}$ radicals confers better solubility of the transition metal compound in organic media such as organic solvents and polycyclic the monomer. Preferably, the $R^{20}$ radicals are selected from ($C_1$ to $C_{18}$) alkyl groups wherein the sum of carbon atoms for all $R^{20}$ radicals is 15 to 72, preferably 25 to 48, more preferably 21 to 42. The $R^{21}$ radical is preferably selected from linear and branched ($C_1$ to $C_{50}$) alkyl, more preferably ($C_{10}$ to $C_{40}$) alkyl. $R^{22}$ is preferably selected from linear and branched ($C_1$ to $C_{40}$) alkyl, more preferably ($C_2$ to $C_{30}$) alkyl.

Specific examples of organoammonium cations include tridodecylammonium, methyltricaprylammonium, tris(tridecyl)ammonium and trioctylammonium. Specific examples of organoarsonium and organophosphonium cations include tridodecylarsonium and phosphonium, methyltricaprylarsonium and phosphonium, tris(tridecyl)arsonium and phosphonium, and trioctylarsonium and phosphonium. Specific pyridinium cations include eicosyl-4-(1-butylpentyl)pyridinium, docosyl-4-(13-pentacosyl) pyridinium, and eicosyl-4-(1-butylpentyl)pyridinium.

Suitable neutral ligands which can be bonded to the palladium transition metal are the olefins; the acetylenes; carbon monoxide; nitric oxide, nitrogen compounds such as ammonia, alkylisocyanide, alkylisocyanate, alkylisothiocyanate; pyridines and pyridine derivatives (e.g., 1,10-phenanthroline, 2,2'-dipyridyl), 1,4-dialkyl-1,3-diazabutadienes, 1,4-diaryl-1,3-diazabutadienes and amines such as represented by the formulae:

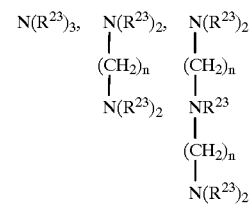

wherein $R^{23}$ is independently hydrocarbyl or substituted hydrocarbyl as previously defined and n is 2 to 10. Ureas; nitrites such as acetonitrile, benzonitrile and halogenated derivatives thereof; organic ethers such as dimethyl ether of diethylene glycol, dioxane, tetrahydrofuran, furan diallyl ether, diethyl ether, cyclic ethers such as diethylene glycol cyclic oligomers; organic sulfides such as thioethers (diethyl sulfide); arsines; stibines; phosphines such as triarylphosphines (e.g., triphenylphosphine), trialkylphosphines (e.g., trimethyl, triethyl, tripropyl, tripentacosyl, and halogenated derivatives thereof), bis(diphenylphosphino)ethane, bis(diphenylphosphino)propane, bis(dimethylphosphino) propane, bis(diphenylphosphino)butane, (S)-(−)2,2'-bis(diphenylphosphino)-1,1'-binaphthyl, (R)-(+)-2,2'-bis(diphenylphosphino)-1,1'-binaphthyl, and bis(2-diphenylphosphinoethyl)phenylphosphine; phosphine oxides, phosphorus halides; phosphites represented by the formula:

wherein $R^{23}$ independently represents a hydrocarbyl or substituted hydrocarbyl as previously defined; phosphorus oxyhalides; phosphonates; phosphonites, phosphinites, ketones; sulfoxides such as ($C_1$ to $C_{20}$) alkylsulfoxides; ($C_6$ to $C_{20}$) arylsulfoxides, ($C_7$ to $C_{40}$) alkarylsulfoxides, and the like. It should be recognized that the foregoing neutral ligands can be utilized as optional third components as will be described hereinbelow.

Examples of Group VIII transition metal compounds suitable as the Group VIII metal ion source include: palladium ethylhexanoate, trans-Pd $Cl_2(PPh_3)_2$, palladium (II) bis(trifluoroacetate), palladium (II) bis(acetylacetonate), palladium (II) 2-ethylhexanoate, $Pd(acetate)_2(PPh_3)_2$, palladium (II) bromide, palladium (II) chloride, palladium (II) iodide, palladium (II) oxide, monoacetonitriyletris (triphenylphosphine) palladium (II) tetrafluoroborate, tetrakis(acetonitrile) palladium (II) tetrafluoroborate, dichlorobis(acetonitrile) palladium (II), dichlorobis (triphenylphosphine) palladium (II), dichlorobis (benzonitrile) palladium (II), palladium acetylacetonate, palladium bis(acetonitrile) dichloride, palladium bis(dimethylsulfoxide) dichloride, nickel acetylacetonates, nickel carboxylates, nickel dimethylglyoxime, nickel ethylhexanoate, $NiCl_2(PPh_3)_2$, $NiCl_2(PPh_2CH_2)_2$, $(P(cyclohexyl)_3)H$ $Ni(Ph_2P(C_6H_4)CO_2(PPh_3)(C_6H_5)Ni(Ph_2$ $PCH=C(O)Ph)$, bis(2,2,6,6-tetramethyl-3,5-heptanedionate) nickel (II), nickel (II) hexafluoroacetylacetonate tetrahydrate, nickel (II) trifluoroacetylacetonate dihydrate, nickel (II) acetylacetonate tetrahydrate, nickelocene, nickel (II) acetate, nickel bromide, nickel chloride, dichlorohexyl nickel acetate, nickel lactate, nickel oxide, nickel tetrafluoroborate, bis(allyl)nickel, bis(cyclopentadienyl)nickel, cobalt neodecanoate, cobalt (II) acetate, cobalt (II) acetylacetonate, cobalt (III) acetylacetonate, cobalt (II) benzoate, cobalt chloride, cobalt bromide, dichlorohexyl cobalt acetates, cobalt (II) stearate, cobalt (II) tetrafluoroborate, iron napthenate, iron (II) chloride, iron (III) chloride, iron (II) bromide, iron (III) bromide, iron (II) acetate, iron (III) acetylacetonate, ferrocene, ruthenium tris(triphenylphosphine) dichloride, ruthenium tris(triphenylphosphine) hydrido chloride, ruthenium trichloride, ruthenium tetrakis(acetonitrile) dichloride, ruthenium tetrakis(dimethylsulfoxide) dichloride, rhodium chloride, rhodium tris(triphenylphosphine) trichloride.

The organoaluminum component of the multicomponent catalyst system of the present invention is represented by the formula:

wherein $R^{24}$ independently represents linear and branched ($C_1$ to $C_{20}$) alkyl, ($C_6$ to $C_{24}$) aryl, ($C_7$ to $C_{20}$) aralkyl, ($C_3$ to $C_{10}$) cycloalkyl; Q is a halide or pseudohalide selected from chlorine, fluorine, bromine, iodine, linear and branched ($C_1$ to $C_{20}$) alkoxy, ($C_6$ to $C_{24}$) aryloxy; and x is 0 to 2.5, preferably 0 to 2.

Representative organoaluminum compounds include trialkylaluminums such as trimethylaluminum, triethylaluminum, tripropylaluminum, triisopropylaluminum, triisobutylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum, trioctylaluminum, tris-2-norbornylaluminum, and the like; dialkylaluminum halides such as dimethylaluminum chloride, diethylaluminum chloride, diisopropylaluminum chloride, diisobutylaluminum chloride, and the like;

monoalkylaluminum dihalides such as methylaluminum dichloride, ethylaluminum dichloride, ethylaluminum diiodide, propylaluminum dichloride, isopropylaluminum dichloride, butylaluminum dichloride, isobutylaluminum dichloride, and the like; and alkylaluminum sesquihalides such as methylaluminum sesquichloride, ethylaluminum sesquichloride, propylaluminum sesquichloride, isobutylaluminum sesquichloride, and the like.

The dialkylaluminum hydride is selected from linear and branched ($C_1$ to $C_{10}$) dialkylaluminum hydride, with diisobutylaluminum hydride being a preferred dialkylaluminum hydride compound.

The dialkyl zinc compounds are selected from linear and branched ($C_1$ to $C_{10}$) dialkyl zinc compounds with diethyl zinc being preferred. The dialkyl magnesium compounds are selected from linear and branched ($C_1$ to $C_{10}$) dialkyl magnesium with dibutyl magnesium being the most preferred. The alkyl lithiums are selected from linear and branched ($C_1$ to $C_{10}$) alkyl lithium compounds. Butyllithium is the preferred alkyl lithium.

In the practice of the present invention, the catalytic system obtained from the Group VIII metal ion source is utilized with one or both of a component selected from the group of cocatalyst compounds, and third component compounds.

Examples of third components are Lewis acids such as the $BF_3$.etherate, $TiCl_4$, $SbF_5$, tris(perfluorophenyl)boron, $BCl_3$, $B(OCH_2CH_3)_3$; strong Brønsted acids such as hexafluoroantimonic acid ($HSbF_6$), $HPF_6$ hydrate, trifluoroacetic acid ($CF_3CO_2H$), and $FSO_3H.SbF_5$, $H_2C(SO_2CF_3)_2CF_3SO_3H$, and paratoluenesulfonic acid; halogenated compounds such as hexachloroacetone, hexafluoroacetone, 3-butenoic acid-2,2,3,4,4-pentachlorobutylester, hexafluoroglutaric acid, hexafluoroisopropanol, and chloranil, i.e.,

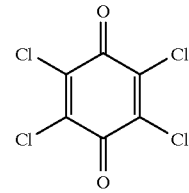

electron donors such as phosphines and phosphites and olefinic electron donors selected from ($C_4$ to $C_{12}$) aliphatic and ($C_6$ to $C_{12}$) cycloaliphatic diolefins, such as butadiene, cyclooctadiene, and norbornadiene.

Acidity of strong Brønsted acids can be gauged by determining their Hammet acidity function $H_0$. A definition of the Hammet acidity function is found in *Advanced Inorganic Chemistry* by F. A. Cotton and G. Wilkinson, Wiley-Interscience, 1988, p. 107.

As set forth above the neutral ligands can be employed as optional third components with electron donating properties.

In one embodiment of the invention, the multicomponent catalyst system can be prepared by a process which comprises mixing the catalyst components, i.e., the Group VIII metal compound, the cocatalyst compound, and third component (if employed), together in a hydrocarbon or halohydrocarbon solvent and then mixing the premixed catalyst system in the reaction medium comprising at least one silyl functional polycyclic monomer. Alternatively, (assuming the optional third component is utilized), any two of the catalyst system components can be premixed in a hydrocarbon or halohydrocarbon solvent and then introduced into the reaction medium. The remaining catalyst component can be added to the reaction medium before or after the addition of the premixed components.

In another embodiment, the multicomponent catalyst system can be prepared in situ by mixing together all of the catalyst components in the reaction medium. The order of addition is not important.

In one embodiment of the multicomponent catalyst system of the present invention, a typical catalyst system comprises a Group VIII transition metal salt, e.g., nickel ethylhexanoate, an organoaluminum compound, e.g., triethylaluminum, and a mixture of third components, e.g., $BF_3$.etherate and hexafluoroantimonic acid ($HSbF_6$), in a preferred molar ratio of Al/$BF_3$.etherate/Ni/acid of 10/9/1/0.5-2. The reaction scheme is written as follows:

1. nickel ethylhexanoate+$HSbF_6$+9$BF_3$.etherate+10 triethylaluminum→Active Catalyst In another embodiment of the multicomponent catalyst system of the invention, the catalyst system comprises a nickel salt, e.g., nickel ethylhexanoate, an organoaluminum compound, e.g., triethylaluminum, and a third component Lewis acid, e.g., tris(perfluorophenyl)boron as shown in the following scheme:

2. nickel ethylhexanoate+tris(perfluorophenyl)boron+triethylaluminum→Active Catalyst In another embodiment of the multicomponent catalyst system of the invention the third component is a halogenated compound selected from various halogenated activators. A typical catalyst system comprises a Group VIII transition metal salt, an organoaluminum, and a third component halogenated compound as shown below:

3. nickel ethylhexanoate+triethylaluminum+chloranil→Active Catalyst

In still another embodiment of the multicomponent catalyst system of this invention no cocatalyst is present. The catalyst system comprises a Group VIII metal salt (e.g. 3-allylnickelbromide dimer and a Lewis acid (e.g. tris(perfluorophenyl)boron as shown below:

4. $\eta^3$-allylnickel chloride+tris(perfluorophenyl)boron→Active Catalyst

We have found that the choice of Group VIII metal in the metal cation complex of both the single and multicomponent catalyst systems of this invention influences the physical properties of the polymers obtained. As discussed previously, we have found that the palladium catalyzed polymers of this invention are markedly less soluble in common organic solvents than the nickel catalyzed polymers. In general, the palladium catalyzed polymers must be heated in chlorinated solvents such as o-dichlorobenzene or trichlorobezene before any significant solubility is achieved. In sharp contrast, the nickel catalyzed polymers of this invention are generally soluble in common hydrocarbon solvents such as cyclohexane at room temperature (i.e., 25° C.). We believe that the differences in solubility are due in all probability to differences in microstructure between the two types of polymers. This is confirmed by carbon-13 NMR spectroscopy ($^{13}$C-NMR).

Surprisingly, we have found that multicomponent catalyst systems of the type shown in embodiment two above (hereinafter Type II catalysts) when utilized to polymerize a monomer mixture comprising at least 1 mole percent of a trialkoxysilyl functional polycyclic monomer of this invention (e.g., 5-triethoxysilylnorbornene) afford polymers with a specific microstructure. Without wishing to be bound by theory of invention, we believe that the trialkoxysilyl functional monomer in combination with the tris(perfluorophenyl)boron as a third component interacts with the nickel metal to dictate polymer microstructure. The polymers catalyzed by the Type II catalyst systems contain what we believe to be exclusive 2,7-enchained repeating units. NMR spectra of such polymers are shown in FIGS. 3 and 4.

Figure 3:
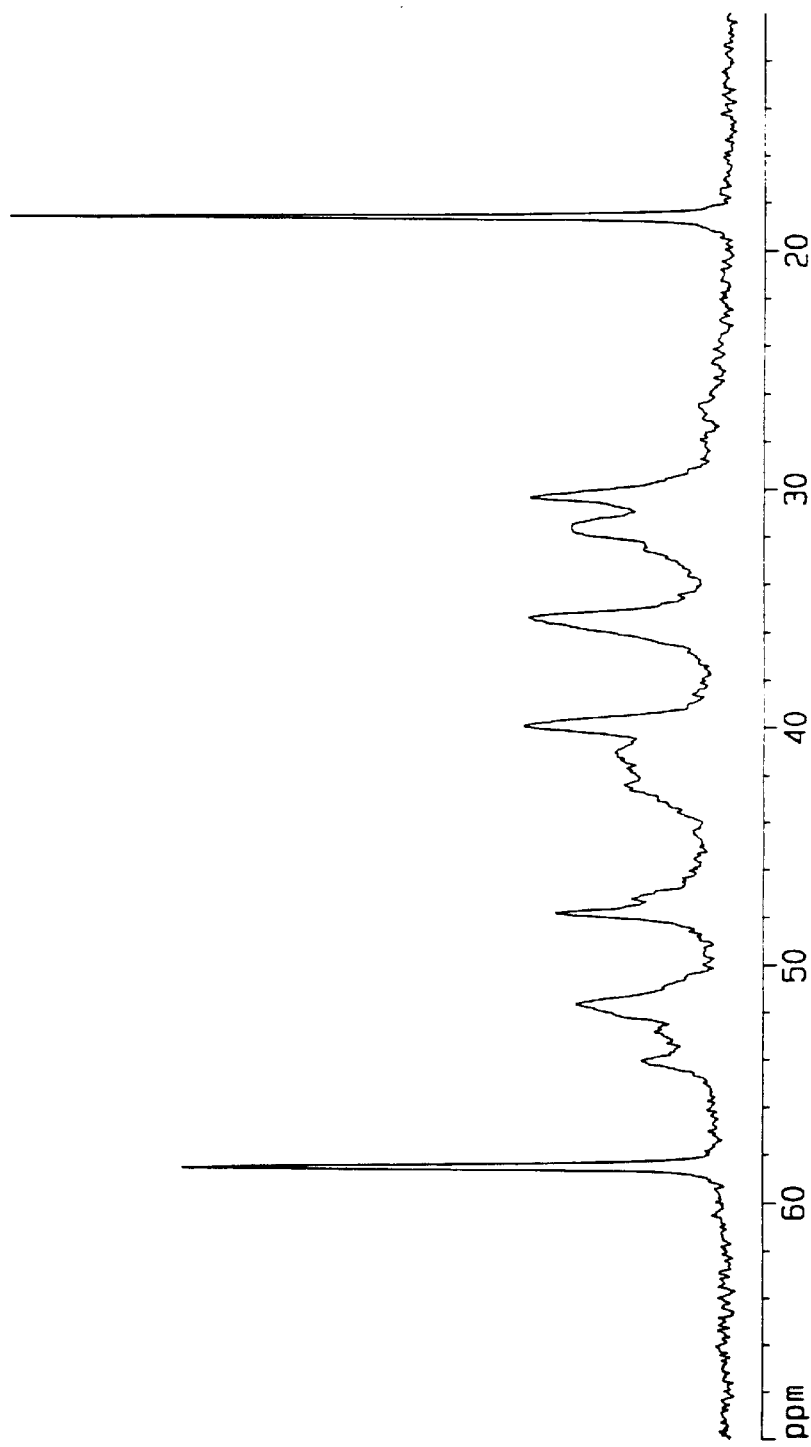
FIG. 3 is a 125 MHz $^{13}$C-NMR spectrum in o-dichlorobenzene-$D_4$ at 323° K of a silyl functional polycyclic polymer of the invention that was catalyzed by a nickel Type II catalyst.
Figure 4:
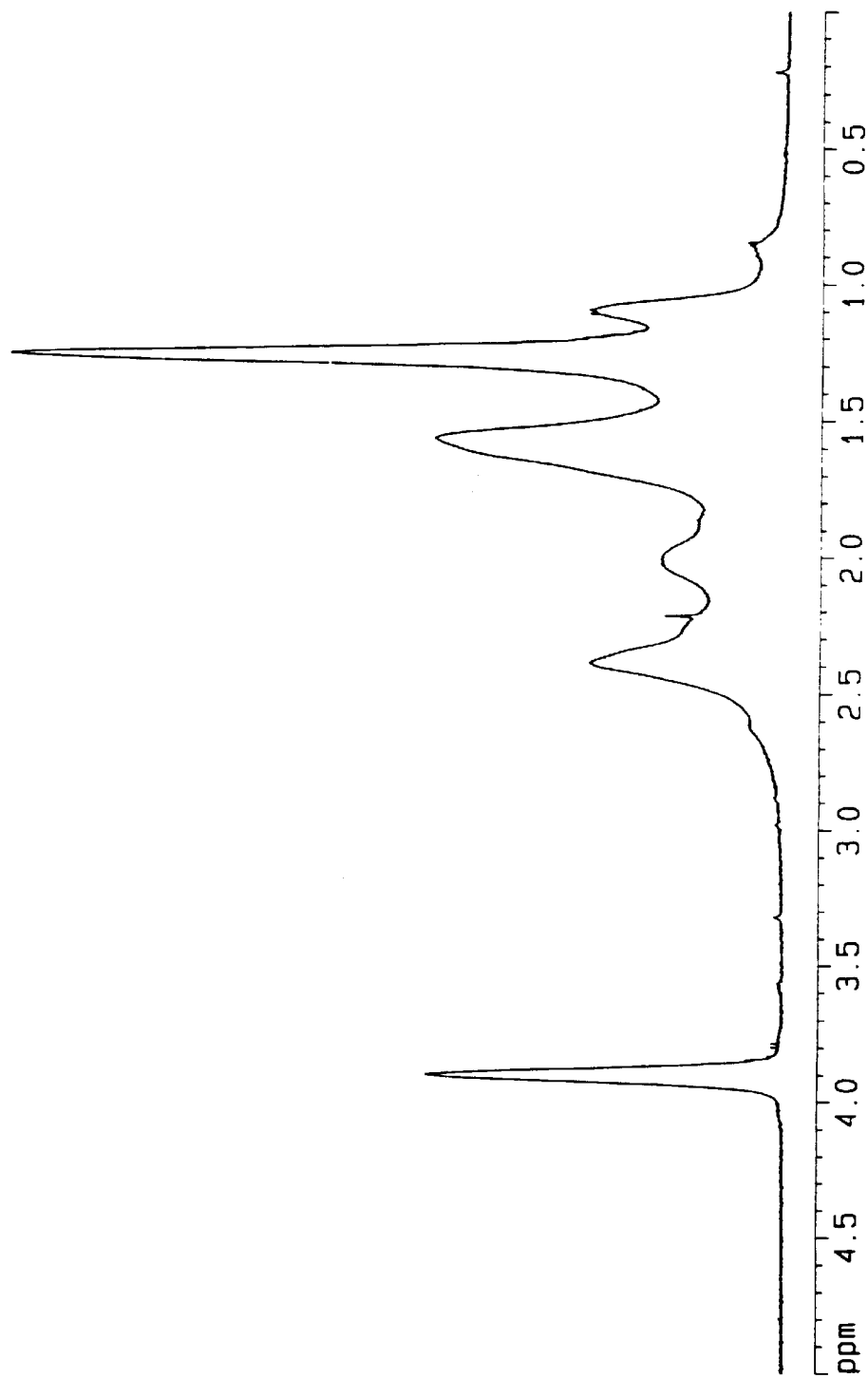
FIG. 4 is a 500 MHz $^1$H-NMR spectrum in o-dichlorobenzene-$D_4$ at 323° K of the polymer illustrated in FIG. 3.

In FIG. 3 is presented a $^{13}$C-NMR spectrum at 125 MHz of the polymer of Example 10. The polymer was catalyzed in the presence of a nickel ethylhexanoate, tris (perfluorophenyl)boron, triethylaluminum catalyst system. In the region from 25 to 55 ppm 5 groups of resonances are present. The resonance peak at 28 to 34 ppm are non-bridging $CH_2$ groups (carbons 5 and 6). The resonance peak at 34 to 38 ppm is a remaining $CH_2$ group (carbon 3). The peak between 38 and 44 ppm are bridgehead groups CH (carbons 1 and 4). The resonance peaks at 45 to 49 and 50 to 55 are backbone connecting CH groups (carbons 2 and 7).

The peaks at 18.4 ppm and 58.4 ppm are characteristic of the ethoxy groups on the silicon atom of the silyl functionality.

In sharp contrast, the polymers catalyzed by the multicomponent systems of the type shown in embodiment one above (hereinafter Type I catalysts) exhibit a different microstructure as confirmed by NMR analysis. Polymers catalyzed by the Type I catalyst systems contain what we believe to be exclusive 2,3-enchained repeating units. The NMR spectra of these polymers are shown in FIGS. 1 and 2.

In FIG. 1, the $^{13}$C-NMR spectrum at 125 MHz of the polymer prepared in accordance with Example 1 is shown. The polymer was catalyzed in the presence of a nickel ethylhexanoate, $BF_3$.etherate and triethylaluminum catalyst system. In the region from 28 to 55 ppm four groups of resonances are delineated. The peaks in the region of 25 to 34 ppm are non-bridging $CH_2$ groups (carbons 5 and 6). The resonances present between 34 to 37 ppm represent a bridge $CH_2$ group (carbon 7). The resonance between 37 and 42 ppm are bridgehead CH groups (carbons 1 and 4) and the resonance peaks between 45 to 55 ppm are backbone connecting CH groups (carbons 2 and 3). The breadth of the chemical shifts between 45 and 55 ppm are due to polymer tacticity (e.g. diisotactic, and/or disyndiotactic). As in FIG. 4, the tall narrow peaks at 18.4 ppm and 58.4 ppm are characteristic of ethoxy groups on the silicon atom.

Figure 2:
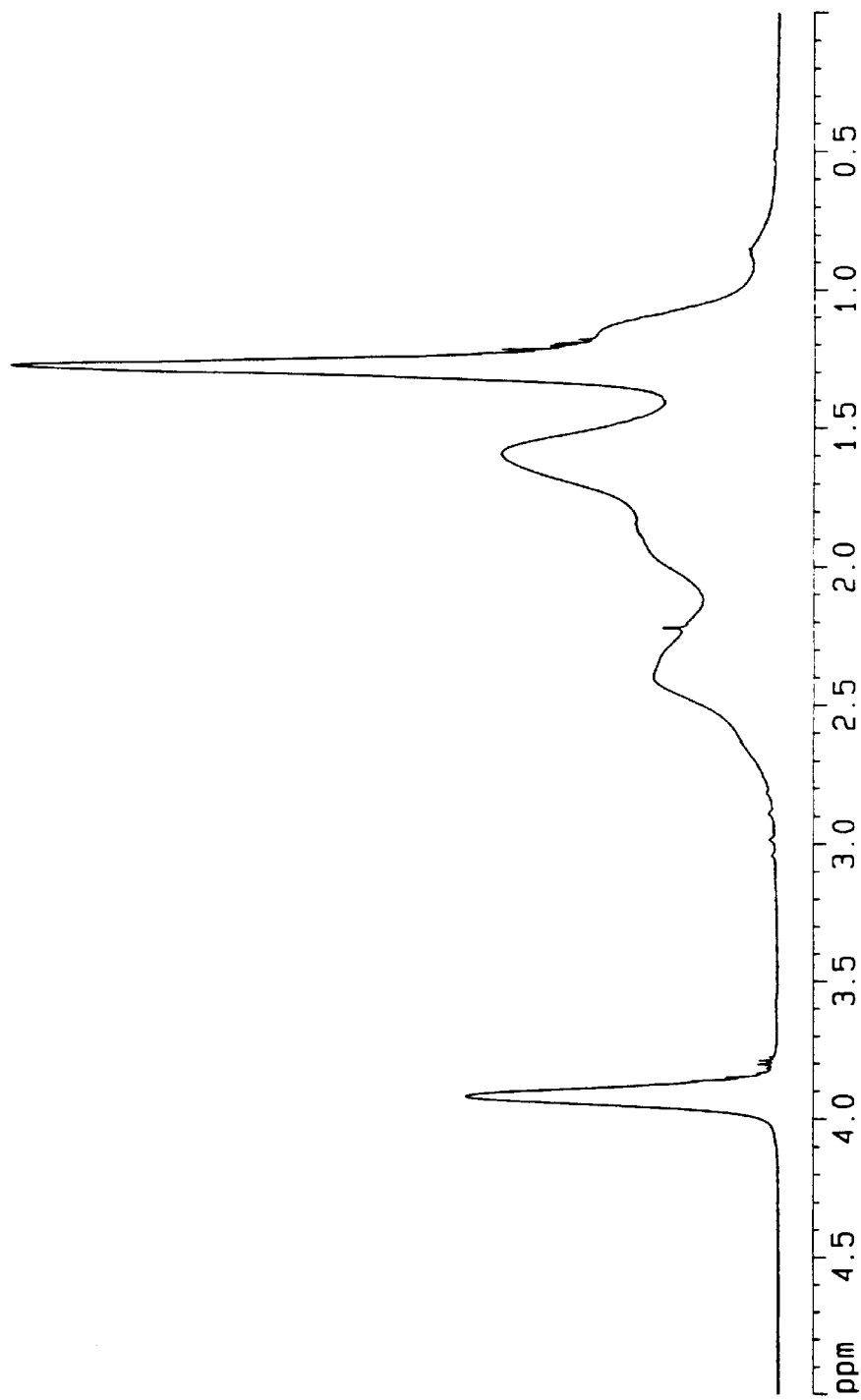
FIG. 2 is a 500 MHz $^1$H-NMR spectrum in o-dichlorobenzene-$D_4$ at 323° K of the polymer illustrated in FIG. 1.

Referring to FIGS. 2 and 4, the $^1$H-proton NMR spectra at 500 MHz of the polymers of Examples 1 and 10, respectively, are shown. The same differences in microstructure is evident from proton NMR. In FIGS. 2 and 4, major differences are noted for the group of peaks appearing between 1.0 ppm and 4.1 ppm. In FIG. 2 the peak having a resonance between 1.4 and 2.0 ppm shows a shoulder at 1.7 ppm. The shoulder is not present in FIG. 4. Other differences appear at 1.1 ppm and 2.4 ppm.

Referring to FIGS. 1 and 3 one would expect a larger number of sharp resonances in a 2,7-enchained repeat unit relative to a 2,3-enchained repeat unit where due to symmetry considerations a low number of broadly defined resonances is present, the breadth of which being determined by the degree of tacticity.

As stated above, differing repeat unit enchainment schemes can be controlled by the catalyst system employed. For example, when copolymerizing norbornene with 5-triethoxysilylnorbornene we have observed that palladium catalysts typically afford norbornene units which are exclusively 2,3 enchained showing some degree of tacticity and exhibiting relatively poor solubility in solvents other than chlorinated aromatics at elevated temperatures. When higher levels of triethoxysilylnorbornene are used ($\geq$8% mole) the resulting polymer shows increasing solubility in methylene dichloride. In the case of the nickel catalyzed copolymerizations of these same two monomers the microstructure is heavily dependent on the choice of Lewis acid and/or counterion. For example, when a nickel salt is used as catalyst in the presence of triethylaluminum as the cocatlayst and a strong Lewis acid, we have found that the microstructure is determined by the choice of Lewis acid. When $BF_3$.etherate is used, the resulting copolymer is essentially all 2,3 enchained and apparently atactic. When trisperfluorophenylboron is used, the resulting copolymer appears to be exclusively 2,7 enchained. Both copolymers are soluble in toluene etc. with the 2,7 enchained polymer solutions showing a markedly higher solution viscosity. At high levels of trithoxysilylNB (>10% mole) both microstructures show good solubility in methylene chloride.

Reactions utilizing the single and multicomponent catalysts of the present invention are carried out in an organic solvent which does not adversely interfere with the catalyst system and is a solvent for the monomer. Examples of organic solvents are aliphatic (non-polar) hydrocarbons such as pentane, hexane, heptane, octane and decane; alicyclic hydrocarbons such as cyclopentane and cyclohexane; aromatic hydrocarbons such as benzene, chlorobenzene, o-dichlorobenzene, toluene, and xylenes; halogenated (polar) hydrocarbons such as methylene chloride, chloroform, carbon tetrachloride, ethyl chloride, 1,1-dichloroethane, 1,2-dichloroethane, 1,2-dichloroethylene, 1-chloropropane, 2-chloropropane, 1-chlorobutane, 2-chlorobutane, 1-chloro-2-methylpropane, and 1-chloropentane.

The choice of reaction solvent is made on the basis of a number of factors including the choice of catalyst and whether it is desired to run the polymerization as a slurry or solution process. For most of the catalysts described in this invention, the preferred solvents are chlorinated hydrocarbons such as methylene chloride and 1,2-dichloroethane and aromatic hydrocarbons such as chlorobenzene and nitrobenzene, with simple hydrocarbons being less preferred due to the resulting lower conversion of the functional NB-type monomer(s). Surprisingly we have discovered that certain of the catalyst systems, most notably the multicomponent catalysts based on Group VIII metal compounds and alkylaluminum halides, specifically, monoalkylaluminum dihalides, (e.g., ethylaluminum dichloride), and the Type II catalysts referred to above also give excellent results (and high monomer conversion) when run in simple hydrocarbons such as heptane, cyclohexane, and toluene.

The molar ratio of total monomer to Group VIII metal for the single and multicomponent catalysts can run from 20:1 to 100,000:1, preferably 100:1 to 20,000:1, and most preferably 200:1 to 10,000:1.

In the multicomponent catalyst systems, the cocatalyst metal (e.g., aluminum, zinc, magnesium, and lithium) to Group VIII metal molar ratio ranges from less than or equal to 100:1, preferably less than or equal to 30:1, and most preferably less than or equal to 20:1.

The third component is employed in a molar ratio to Group VIII metal ranging from 0.25:1 to 20:1. When acids are employed as third components, the acid to Group VIII metal range is less than or equal to 4:1, preferably less than or equal to 2:1.

The temperature at which the polymerization reactions of the present invention are carried out typically ranges from $-100°$ C. to $120°$ C., preferably $-60°$ C. to $90°$ C., and most preferably $-10°$ C. to $80°$ C.

The optimum temperature for the present invention is dependent on a number of variables, primarily the choice of catalyst and the choice of reaction diluent. Thus, for any given polymerization the optimum temperature will be experimentally determined taking these variables into account.

To control the rate of the polymerization reactions carried out with the single or multicomponent catalyst systems of this invention, a suitable monomer to catalyst molar ratio is selected, the reactor can be cooled to slow down the reaction, and the reaction can be carried out in a high boiling solvent. By high boiling solvent is meant that the solvent has a boiling point above the polymerization temperature. If a pressure reaction vessel is employed to contain the polymerization reaction, the foregoing considerations do not have to be taken into account.

The polymers obtained by the process of the present invention are produced in a molecular weight ($M_n$) range from about 10,000 to about 1,000,000, preferably from about 20,000 to about 700,000, and more preferably from about 30,000 to about 500,000.

Molecular weight can be controlled by changing the catalyst to monomer ratio, i.e., by changing the initiator to monomer ratio. Lower molecular weight polymers and oligomers may also be formed in the range from about 500 to about 500,000 by carrying out the polymerization in the presence of a chain transfer agent. Macromonomers or oligomers comprising from 4 to 50 repeating units can be prepared in the presence of a CTA (Chain Transfer Agent) selected from a compound having a terminal olefinic double bond between adjacent carbon atoms, wherein at least one of the adjacent carbon atoms has two hydrogen atoms attached thereto. The CTA is exclusive of styrenes (non-styrenes), vinyl ethers (non-vinyl ether) and conjugated dienes. By non-styrenic, non-vinyl ether is meant that compounds having the following structures are excluded from the chain transfer agents of this invention:

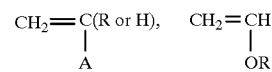

wherein A is an aromatic substituent and R is hydrocarbyl.

The preferred CTA compounds of this invention are represented by the following formula:

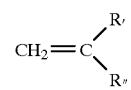

wherein $R_l$ and $R_n$ independently represent hydrogen, branched or unbranched ($C_1$ to $C_{40}$) alkyl, branched or unbranched ($C_2$ to $C_{40}$) alkenyl, halogen, or the group

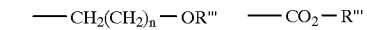

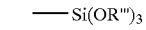

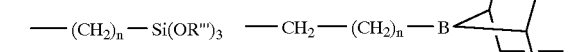

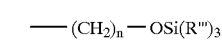

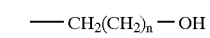

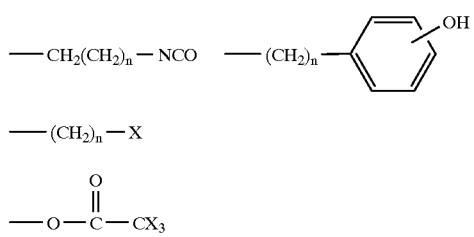

wherein R'" is branched or unbranched ($C_1$ to $C_{10}$) alkyl, preferably methyl or ethyl, branched or unbranched ($C_3$–$C_{90}$) alkenyl, substituted or unsubstituted ($C_6$–$C_{15}$) aryl wherein said substituents if present are selected from branched or unbranched ($C_1$–$C_{10}$) alkyl or haloalkyl, and halogen, X is chlorine, fluorine, bromine or iodine, and n is 0 to 20, preferably 1 to 5.

Of the above chain transfer agents the α-olefins having 2 to 10 carbon atoms are preferred, e.g., ethylene, propylene, 4-methyl-1-pentene, 1-hexene, 1-decene, 1,7-octadiene, and 1,6-octadiene, or isobutylene.

While the optimum conditions for any given result should be experimentally determined by a skilled artisan taking into the account all of the above factors there are a number of general guidelines which can be conveniently utilized where appropriate. We have learned that, in general, α-olefins (e.g., ethylene, propylene, 1-hexene, 1-decene, 4-methyl-1-pentene) are the most effective chain transfer agents with 1,1-disubstituted olefins (e.g., isobutylene) being less efficient. In other words, all other things being equal, the concentration of isobutylene required to achieve a given molecular weight will be much higher than if ethylene were chosen. Styrenic olefins, conjugated dienes, and vinyl ethers are not effective as chain transfer agents due to their propensity to polymerize with the catalysts described herein.

The CTA can be employed in an amount ranging from about 0.10 mole % to over 50 mole % relative to the moles of total NB-type monomer. Preferably, the CTA is employed in the range of 0.10 to 10 mole %, and more preferably from 0.1 to 5.0 mole %. As discussed above, depending on catalyst type and sensitivities, CTA efficiencies and desired end group, the concentration of CTA can be in excess of 50 mole % (based on total NB-functional monomer present), e.g., 60 to 80 mole %. Higher concentrations of CTA (e.g., greater than 100 mole %) may be necessary to achieve the low molecular weight embodiments of this invention such as in oligomer and macromonomer applications. It is important and surprising to note that even such high concentrations the CTA's (with the exception of isobutylene) do not copolymerize into the polymer backbone but rather insert as terminal end-groups on each polymer chain. Besides chain transfer, the process of the present invention affords a way by which a terminal α-olefinic end group can be placed at the end of a polymer chain.

As previously discussed, polymers produced in the presence of a CTA of this invention have an olefinic end group attached to a terminal end thereof as shown in structures IIIa, IVa, Va, and VIa hereinabove.

Polymers of the present invention that are prepared in the presence of the instant CTA's have molecular weights ($M_n$) ranging from about 5,000 to about 500,000, preferably from about 10,000 to about 300,000, and most preferably from about 20,000 to about 200,000.

The silyl functional polycycloolefins of the present invention are useful in a wide variety of applications. The present polymers find utility in a broad range of electronics and microelectronics applications including planarizing dielectric layers in IC manufacture, passivation layers, as protective coatings and potting compounds, as adhesives, as polymers for printed wire board fabrication, for flexible circuit boards, as tape automated bonding substrates, as dielectric layers in multichip modules and other high density interconnect devices.

The polymers of this invention are also useful as dielectric coatings in other passive or active discrete electronic components, such as capacitors, resistors, inductors, transformers, diodes, transistors, and the like.

The present polymers are transparent and are thus useful in optical applications. The term "transparent" as employed herein refers to an optical medium which is transparent or light transmitting with respect to both fundamental and harmonic frequencies, and which does not have crystalline regions. Useful optical applications include films for liquid crystal displays, resins and films for other flat panel displays (e.g., emmissive), optical storage disks, light valves, solar windows, and the like.

The polymers of the present invention are also useful in optic and electro-optic applications such as optical wave guides, optical fibers, coatings for optical fibers, and non-linear optical devices.

The instant polymers can be used as wire coatings, wire wrap film, and as protective and anticorrosion coatings.

The polymers can also be formed into fibers by methods known in the art such as wet spinning, dry spinning, and extrusion.

In one embodiment of the present invention the instant polymers are deposited as a coating from solution. The present polymers (particularly the Type II nickel catalyzed compositions) have good solubility in common organic solvents such as chlorobenzene, mesitylene, decalin (decahydronapthalene) and methylene chloride, and can be cast as films using methods known to those skilled in the art, such as spin coating, dip coating, brush coating, roller coating, spray coating, solution casting, fluidized bed deposition, electrocoating, vacuum deposition, extrustion coating, and the like. Generally, spin coating is preferred due to its simplicity and high uniformity. Cast film have superior properties such as toughness, craze resistance to solvents, and adhesion among other properties. Polymers of 2,7-enchainment are preferred when films of enchanced mechanical integrity are desired.

For spin coating the polymer is first isolated from the reaction medium and purified to remove spent catalyst system components. The purified polymer is then redissolved in a suitable solvent. The polymer solution has a preferred solids content of from 5 to 50 wt. % in solvent. Most preferably the solids content ranges from 5 to 30 wt. %. Solution viscosities can range from 10 to 10,000 centipoise (cp). Desired additives such as fillers, processing aids, antioxidants, UV stabilizers, heat stabilizers, flame retardants, antistatic agents, pigments, and the like can be added to the spin coating solution at this point. The casting solution is then spin coated onto the desired substrate such as, for example, silicon, glass, metals, plastics, and the like at spin speeds ranging from 200 to 5,000 revolutions per minute (rpm) for periods ranging from 20 to 200 seconds. Film thickness is a function of spin speed and time. Generally, the films have a thickness of 0.2 to 25 μm microns. Drying and subsequent curing of the coatings leaves films with good transparency, toughness, low dielectric constant, and adhesion. Illustrative examples of suitable solvents for coating compositions include decahydranaphthalene, mesitylene, chlorobenzene, and methylene chlorine.

Figure 7:
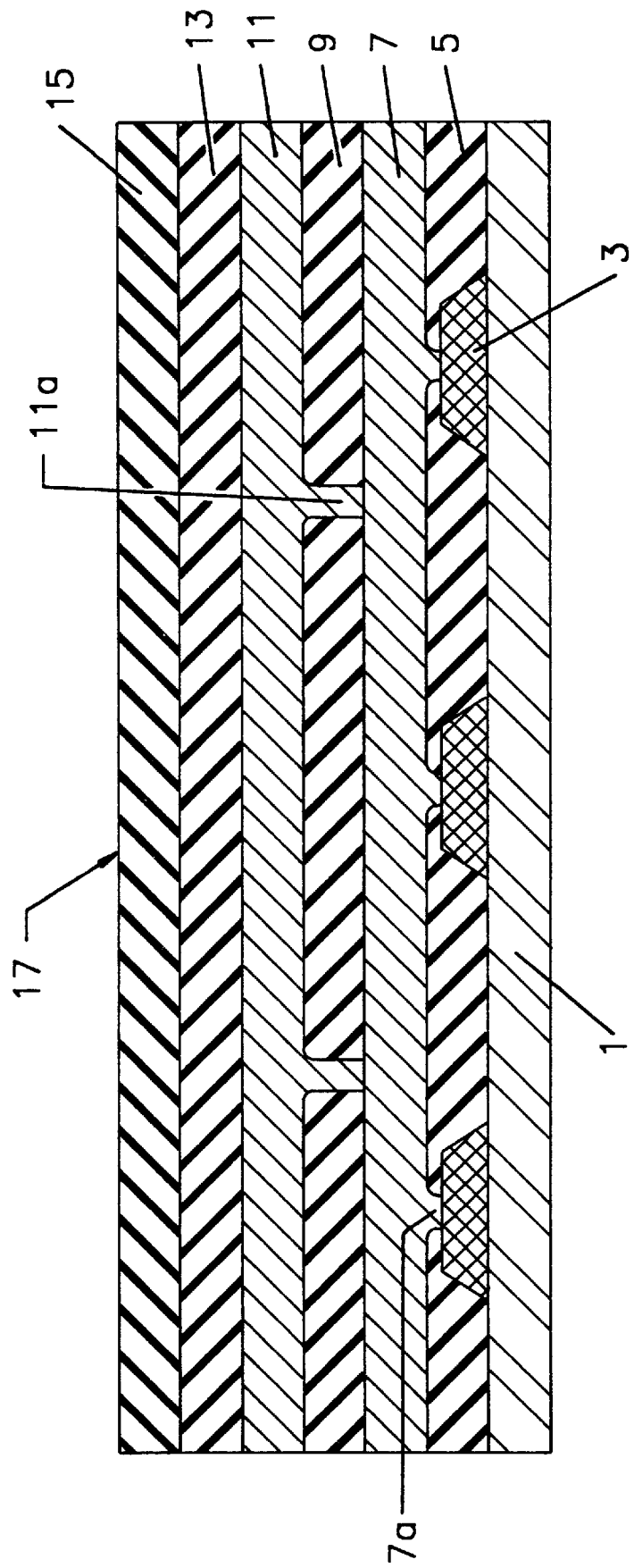
FIG. 7 is a schematic cross sectional side view of a multichip module layered with a polymer of the present invention.

Referring to FIG. 7 a semi-schematic cross-sectional side view of a multichip module (17) is shown. In the manufacture of multichip modules a silicon or alumina wafer (1) optionally having a plurality of resistors (3) on its surface, is spin coated with a solution of a silyl functional polycycloolefin of the present invention. Solvent from the spin coating process is removed in an oven, and an adherent silyl functional polymer film (5) is formed over the wafer and resistors. The film is cured by heating to a selected temperature for a selected period of time. Vias not shown are cut through the polymer by techniques known in the art, for example, laser drilling or patterning and etching. A layer of metal (7), is deposited and patterned using techniques known in the art, for example, metal sputtering followed by etching to form metal lines with a portion of the metal (7a) extending through the via and contacting the resistors (3). A second layer of the silyl functional polycycloolefin (9) is spin coated, dried, and cured to completely cover the underlying metal. Vias (not shown) are cut as above and a second layer of metal (11) is deposited and patterned with a portion of the metal (11a) extending through the second polymer layer and contacting metal layer (7). Additional layers of polymer (13), (15) can be formed as desired as described above.

The following examples are for illustrative purposes and are not intended to limit the invention in any way.

Molecular Weight Determination

The molecular weights of the exemplified polymers were determined relative to polynorbornene standards made according to the method described in WO 95/14048 (published May 26, 1995) using catalyst A of that publication [$\eta^3$-crotyl)(cycloocta-1,5-diene)nickel] and decene-1 as chain transfer agent to control molecular weight. The absolute molecular weights of the resulting samples were determined by using size exclusion chromatography (SEC) in combination with low angle laser light scattering (LALLS). The resulting molecular weight data was used to construct a calibration curve which was used for the molecular weight determinations herein and which allows comparison to conventional polystyrene standards. Using this procedure the PNB calibrated molecular weights were approximately 1.6 times higher than the polystyrene standard molecular weights. The calibrated molecular weight data is given in the following table:

| Molecular Weight Polystyrene Standard | Molecular Weight Polynorbornene Standard |
| --- | --- |
| 3,040,000 | 5,000,000 |
| 330,000 | 540,000 |
| 66,000 | 103,000 |
| 9,200 | 14,800 |
| 255 | 400 |

Adhesion Test

The following generally describes the adhesion test that is performed to test the adherence of the polymer films/coatings of the invention to common substrates utilized in the microelectronics industry.

Silicon substrates are prepared by the wet oxidation of silicon wafers (4 in. diameter) at 1100° C. for 12 hours to give typically a 1000 to 2000 Å layer of silica. Metal substrates are prepared by applying a metal layer onto the surface of the oxidized silicon wafer. This is accomplished by sputtering the desired metal (e.g., aluminum, copper, silver, gold) onto the surface of the silicon substrate to a thickness of about 1000 to 3000 Å. An appropriate tie layer can be used as desired between the silicon substrate and the metal surface layer to aid in adhesion. For the copper, silver, and gold substrates exemplified herein, a titanium tie layer (60 to 100 Å thick) was utilized between the silicon dioxide substrate and the metal layer.

Solutions of the polymers of the present invention are prepared by dissolving the test polymer in a solvent (e.g., chlorobenzene, mesitylene). The substrate is centered on the vacuum chuck of a spin coating apparatus. A quantity of the polymer solution (approximately 1 to 3 ml) is placed on the center of the substrate. The substrate is then spun at 700 to 3000 rpm for 30 seconds. The coated substrate is heated to 90 to 95° C. for 20 to 30 minutes (air atmosphere) to drive off most of the solvent. The coated substrate is then placed in a nitrogen purged furnace which is gradually heated (5° C./min.) to a final temperature of 250 to 350° C. Once attained, the final temperature is maintained for one hour to cure the polymer. The final cure temperature is dependent upon the degree of cure desired. The cured film is then allowed to cool to room temperature. Cure schedules are non-optimized and other time/temperature combinations are similarly meant to pertain to the present examples.

A small area of the polymer film (approximately 1 cm$^2$) is cross-hatched using a diamond scribe. A piece of Scotch™ brand tape (Magic™ brand No. 810 manufactured and sold by the 3M Company) is affixed to the scribed area and subsequently pulled off. The cross-hatched area is examined under a microscope for film removal. The sample passes the adhesion test if none of the cross-hatched sections are removed by the tape.

Film Thickness and Refractive Index Measurments

Film thickness and index of refraction (transverse electric (TE) and transverse magnetic (TM)) were measured with a prism coupler system (Model 2010 from Metricon Corporation, Pennington, N.J.) with HeNe laser (632.8 nm) and a cubic zirconium prism which simultaneously measures refractive indices (TE and TM) and film thickness. The values reported are the TE mode and Δn. Δn (the difference between TE and TM) is the birefringence value of the sample.

Photolithographic Patterning

To determine if the polymers of the present invention could survive the harsh conditions of photolithographic processes and to measure the dielectric constant of same, polymer coated metal substrates were patterned as describe below.

A cured polymer coated metal substrate (silicon-silicon dioxide-metal-polymer) is prepared as described above per the adhesion test. A desired metal and (e.g., Al, Cu. Ag, Au) is sputtered to a thickness of 1000 to 3000 Å onto the top of the polymer layer (silicon-silicon dioxide-metal-polymer-metal). A photoresist (Microposit® SC 1827 from Shipley Company, Inc.) is then spin coated onto the substrate as per the spin coating procedure set forth above (Step 1 below in the diagram below and developed with Microposit® 354 developer from Shipley). The photoresist coated substrate (silicon-silicon dioxide-metal-polymer-metal-photorisist) is soft baked on a hot plate for 2 minutes at 90 to 95° C. The area of the photoresist that is to be developed (i.e., removed) is exposed to UV light (Step 2 below). Microposit® 354 developer is used to remove the exposed photoresist to expose the underlying metal (Step 3 below). The substrate is then baked on a hot plate for 2 minutes at 115 to 120° C. At this point the exposed metal substrate is etched through to the underlying polymer layer (Step 4 below). Each metal has a specific etching solution as follows:

Al-PAN (16 parts phosphoric acid, 1 part acetic acid, and 1 part nitric acid with 1 part water)

Au-$I_2$/KI (equimolar, 1 molar)

Cu-$H_2SO_4$/$H_2O$ (dilute) (2%, solution)

Ag-$NH_4OH$/$H_2O_2$ (dilute) (2% peroxide solution, 1 molar $NH_4OH$)

Ti-HF/$NH_4F$ (dilute) (equimolar, 1 molar)

Following the etching step, the remaining photoresist is removed by rinsing the substrate in acetone, methanol, isopropanol, or a commercial photoresist stripper (Step 5 below):

A Hewlett-Packard LCR meter (Model No. 4263A) was used to measure capacitance and conductance by probing through the polymer to the underlying metal (ground plane), i.e., one probe is placed on the patterned metal surface and the other probe is placed on the ground plane (Step 6 below).

Catalyst A could be stored for several days in a freezer with no apparent deterioration in performance.

CATALYST B

To a flask containing bis(cycloocta-1,5-diene)nickel (2.75 g, 10 mmol), was added a solution of crotyl bromide (1.35 g, 10 mmol) and butadiene (2.5 g) in toluene (24 ml). A deep-red solution of (crotyl)nickelbromide dimer resulted. After 2 hours at ambient temperature the solvent was removed under reduced pressure. To the resulting powder was added a solution of 1,5-cyclooctadiene (3.6 ml) in tetrahydrofuran (32 ml). After cooling to 0° C. thallium hexafluorophosphate (3.5 g, 10 mmol) was added to the resulting mixture which was then allowed to warm to ambient temperature and stir for one hour.

The solvent as stripped off under reduced pressure and dichloromethane (24 ml) was added. The insoluble thallium bromide was removed by filtration (under nitrogen) to afford the product as a solution in dichloromethane. This solution was reduced in volume and then diethylether was added to afford the catalyst, {B, [($\eta^3$-crotyl)(cycloocta-1,5-diene)nickel]hexafluorophosphate} (1.3 g) as orange crystals.

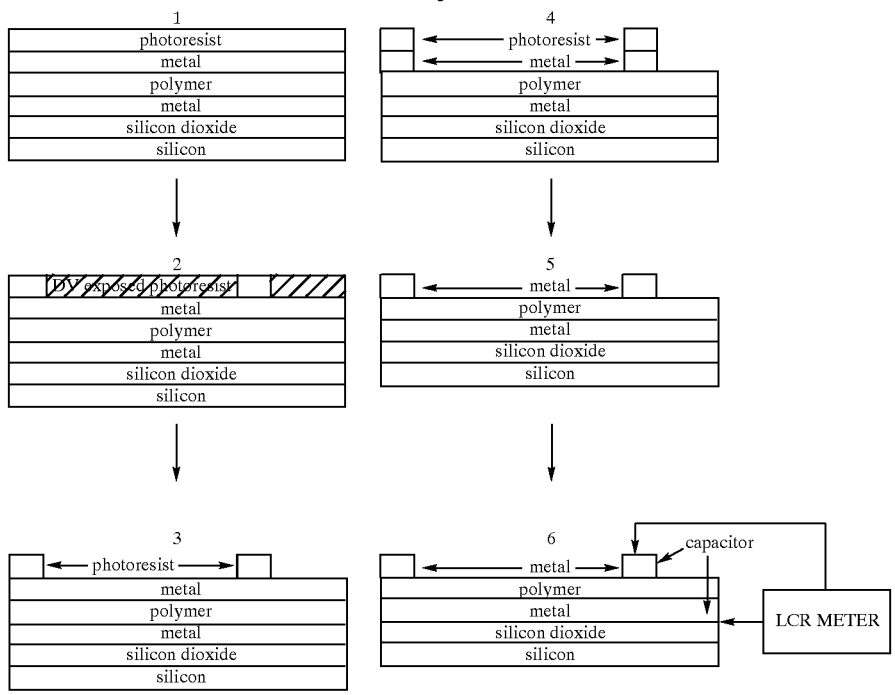

Diagram 2

The diameter of the capacitor is measured to calculate the permittivity and loss factor from the capacitance reading. These values are often reported as dielectric constant. The frequency of the measurement was 10 kilohertz with a 1 volt bias.

CATALYST A

Hexafluoroantimonic acid (HSbF$_6$, 0.708 g, 3 mmole) was placed in a dry, nitrogen filled Teflon® bottle with a Teflon® cap/valve containing a magnetic stir-bar. The bottle was cooled in alcohol/dry ice and nickel ethylhexanoate (8%w Ni in mineral spirits, 3.8 ml, 3 mmole) was added and the contents were allowed to warm to room temperature. The resulting catalyst component is referred to as "catalyst A".

CATALYST C

To a 500 ml Ehrlenmeyer flask was added sodium chloride (2.95 g, 50.4 mmol), palladium dichloride (4.44 g, 25.3 mmol), methanol (150 ml) and water (2.25 g, 125 mmol). The resulting suspension was stirred at ambient temperature for an hour affording a dark-brown solution. To this solution was added crotyl bromide (7.6 ml., 74 mmol).

The vessel was then purged with carbon monoxide for 30 minutes (at a rate of 40 ml per minute). After several minutes the solution became lighter in color with a noticeable amount of a precipitate. The mixture was then poured into water (1 liter) affording an amber-brown colored solid. The mixture was extracted with 3 aliquots of chloroform (total volume 500 ml) removal of the chloroform from the resulting solution afforded a yellow green solid which was characterized by proton NMR methods as ($\eta^3$-crotyl)palladium halide dimer. The yield was essentially quantitative. This yellow-green solid was dissolved in tetrahydrofuran (100 ml) and 1,5-cyclooctadiene (8.7 ml) was added. Thereafter thallium hexafluorophosphate (8.8 g, 25.3 mmol) was dissolved in tetrahydrofuran and both solutions were cooled to 0° C. The thallium hexafluorophosphate solution was added slowly to the solution of the palladium compound. An immediate off-white precipitate was observed, the amount of which increased as more of the thallium solution was added.

After the addition was completed the ice-bath was removed and the suspension was allowed to warm to ambient temperature, with stirring. The tetrahydrofuran was removed under vacuum and dichloromethane (100 ml) was added. The mixture was filtered and the solution was concentrated to a volume of about 40 ml. To this solution was added diethylether (100 ml) which resulted in the formation of light yellow-white crystals of catalyst C, [($\eta^3$-crotyl)(cycloocta-1,5-diene)-palladium] hexafluorophosphate in high yield. The material being characterized by NMR methods.

SOLUTION D 10 g polybutadiene from Aldrich Chemical Company (Mn 420,000, 9% vinyl groups due to 1,2 incorporation of the butadiene) was dissolved in 200 ml dichloroethane. The solution was dried over 4 A sieves and stripped with nitrogen.

SOLUTION E

A 1,2-polybutadiene functionalized with triethoxysilane, 50% by weight in toluene, purchased from United Chemical Technologies (Product #PS078.5).

CATALYST F

This synthesis followed the literarture method of T. M. G. Carneiro et al., Quimica Nova, 1988, 11, 215. A toluene (150 ml) slurry of $PPh_3$ (5.0 g, 19.1 mmol) and the ylid, PhC(O)CHPPh$_3$, (7.3 g, 19.1 mmol), was added to a chilled (0° C.) toluene (80 ml) slurry of Ni(COD)$_2$ (5.3 g, 19.1 mmol). Upon completion of the addition, the mixture became a red-brown slurry. The mixture was allowed to warm to room temperature and was stirred for a further 21 hours. The mixture was then heated to 50° C. for 2 hours. The mixture was then cooled to room temperature and allowed to stir for a further 16 hours. The mixture was then filtered to give a red-brown filtrate which yielded a brown residue after solvent removal. The residue was dissolved in toluene (50 ml) from which a tan precipitate formed upon addition of hexane (50 ml). The mixture was stored in the freezer overnight to give a gold tan solid (catalyst F) (PPh$_3$)(C$_6$H$_5$)Ni(Ph$_2$PCH=C(O)Ph) which was filtered, washed with hexane, and dried. Yield 10.5 g (79%).

CATALYST G

To a flask containing bis(cycloocta-1,5-diene)nickel (2.75 g, 10 mmol), was added a solution of crotyl bromide (1.35 g, 10 mmol) and butadiene (2.5 g) in toluene (24 ml). A deep-red solution of (crotyl)nickelbromide dimer resulted. After 2 hours at ambient temperature the solvent was removed under reduced pressure to afford the catalyst as a free-flowing deep red-brown solid.

CATALYST H

Hexafluoroantimonic acid (HSbF$_6$, 0.708 g, 3 mmole) was placed in a dry, nitrogen filled Teflon® bottle with a Teflon® cap/valve containing a magnetic stir-bar. The bottle was cooled in alcohol/dry ice and cobalt ethylhexanoate (8%w Co in mineral spirits, 3.8 ml, 3 mmole) was added and the contents were allowed to warm to room temperature. The resulting catalyst component is referred to as "catalyst H". Catalyst H could be stored for several days in a freezer with no apparent deterioration in performance.

CATALYST I

In an inert atmosphere-filled glove box, to a sample vial containing allylpalladiumchloride (4.75 mg, 26 mol) in methylene chloride (3 ml) was added a solution of silver hexafluoroantimonate (10 mg, 30 mol) in methylene chloride (3 ml). After mixing the pale solution was filtered (to remove the precipitate of silver chloride) and the resulting catalyst solution was used as such, without isolating.

CATALYST J

Five grams (27 mmol) of 2,2,6,6-tetramethylheptane-3,5, dione (DPM) was dissolved in 13.5 ml of ethanol. To this solution was added 3.9 g (13.5 mmol) Ni(NO$_3$)$_2$.6H$_2$O in 35 ml of 50% aqueous ethanol. To the resultant stirring solution was added 1.1 g (13.5 mmol) sodium hydroxide in 35 ml of 50% ethanol. Immediate precipitation of a mint green solid resulted (the dihydrate of Ni(DPM)$_2$). The solid was filtered, washed with 50% aqueous ethanol, and air dried overnight. To remove water from the complex the solid was dried in a 110° C. oven to constant weight (about 10 hours). A purple powder was obtained. Yield 4.6 g (80%). Recrystallization from dichloroethane gave purple crystals. Yield 1.9 g (33%).

COMPARATIVE EXAMPLE 1

To a 3 L glass polymerization vessel fitted with a mechanical stirrer and baffles was added norbornene (210 g, 2.23 mol) and 1-decene (5.3 ml, 0.28 mol) and dichloroethane (2 L). To this stirred solution at ambient temperature was added the catalyst (catalyst B, 0.205 g, 0.558 mmol). The polymerization ensued immediately with the temperature rising to 54° C.

After 1 hour the polymerization, which was in the form of a polymer "cake", was terminated by addition of methanol. The polymer was isolated by filtration and washed with excess methanol before drying at 80° C. under vacuum overnight to afford the copolymer product (195 g, 93% yield). GPC analysis showed the copolymer to have a molecular weight ($M_w$) of 153,000 ($M_n$ 60,200).

A silicon water with a thermally grown silicon dioxide layer was spin coated at 2,000 rpm with a solution of the polynorbornene polymer of Comparative Example 1 (20.79 weight % in chlorobenzene, ≈80 cp). Following curing a polymer film of 8.2 $\mu$m was obtained.

Delamination of the film from the wafer occurred after 1.5 minutes in boiling water followed by immersion in liquid nitrogen for 1.5 minutes. The polymer had a refractive index of 1.521 (TE mode) and a birefringence of $\Delta n = 0.0004$. Photolithography was impossible because the polymer delaminated upon exposure (for 15 seconds) to photoresist developer (dilute sodium hydroxide). The polymer had a permittivity of 2.5 (softbaked at 90° C. for 30 min. with aluminum shadow mask capacitors).

EXAMPLES 1–5

To a 100 ml glass vial equipped with a Teflon® coated stirbar was added norbornene (4.0 g, 42.4 mmol), methylene chloride (40 ml), triethoxysilylnorbornene (2.8 ml, 10.6 mmol) and 1-hexene (amount indicated in the following table). To this stirred solution at ambient temperature was added catalyst A (0.012 g, 13 µmol), borontrifluoride.etherate (0.015 ml, 117 mol) and finally triethylaluminum (0.077 ml of a 1.7 molar solution in cyclohexane, 130 µmol). After 18 hours the reaction was terminated by pouring the resulting solution into a large, stirred volume of methanol, filtered, washed with an excess of methanol, and dried overnight in a heated vacuum oven (80° C.) to afford the product.

| Example Number | 1-Hexene (ml, mmol) | 1-Hexene (mole % on monomers) | Conversion (%) | $M_w$ | $M_n$ |
|---|---|---|---|---|---|
| 1 | 0, 0 | 0 | 56 | 462,000 | 136,000 |
| 2 | 0.0165, 0.133 | 0.25 | 61 | 334,000 | 104,000 |
| 3 | 0.066, 0.53 | 1 | 64 | 159,000 | 57,000 |
| 4 | 0.132, 1.06 | 2 | 74 | 192,000 | 39,000 |
| 5 | 0.264, 2.12 | 4 | 59 | 103,000 | 24,000 |

The proton NMR spectra of the polymers recovered from Examples 1 and 5 were recorded in deuterochloroform. A singlet resonance at 3.8 ppm was assigned to the methylene protons (—CH$_2$—) of the ethoxy groups on the triethoxysilylnorbornene monomer, from the integration of this signal it was possible to determine the level of incorporation of the triethoxysilylnorbornene in the resulting copolymer. In Example 1 the copolymer composition was 83:17 norbornene/triethoxysilylnorbornene while in Example 5 the copolymer composition was 82.5:17.5. Furthermore the NMR spectrum of the copolymer resulting from Example 5 exhibited resonances in the region 5.3–6.2 ppm indicative of olefinic end groups derived from the 1-hexene chain transfer agent (these resonances were not present in Example 1 since no chain transfer agent was used).

EXAMPLES 6–10

To a 100 ml glass vial equipped with a Teflon® coated stirbar was added norbornene (4.0 g, 42.4 mmol), methylene chloride (40 ml), triethoxysilylnorbornene (2.8 ml, 10.6 mmol) and 1-hexene (amount indicated in the following table). To this stirred solution at ambient temperature was added nickel ethylhexanoate (0.01 ml of an 8%w nickel solution in mineral spirits, 13 µmol), tris(pentafluorophenyl) boron (117 µmol in petroleum naphtha) and finally triethylaluminum (0.077 ml of a 1.7 molar solution in cyclohexane, 130 µmol). The reaction was allowed to run for 18 hours the reaction was terminated by pouring the resulting solution into a large, stirred volume of methanol, filtered, washed with an excess of methanol, and dried overnight in a heated vacuum oven (80° C.) to afford the product.

| Example Number | 1-Hexene (ml, mmol) | 1-Hexene (mole % on Monomers) | Conversion (%) | $M_w$ | $M_n$ |
|---|---|---|---|---|---|
| 6 | 0, 0 | 0 | 45 | n.d | n.d |
| 7 | 0.0165, 0.133 | 0.25 | 58 | n.d | n.d |
| 8 | 0.066, 0.53 | 1 | 43 | 1,134,000 | 343,000 |
| 9 | 0.132, 1.06 | 2 | 34 | 1,068,000 | 312,000 |
| 10 | 0.264, 2.12 | 4 | 25 | 766,000 | 240,000 |

The proton NMR spectra of the polymer recovered from Example 10 was recorded in deuterochloroform. A singlet resonance at 3.8 ppm was assigned to the methylene protons (—CH$_2$—) of the ethoxy groups on the triethoxysilylnorbornene monomer, from the integration of this signal it was possible to determine the level of incorporation of the triethoxysilylnorbornene in the resulting copolymer. In Example 10 the copolymer composition was 85:15 norbornene/triethoxysilylnorbornene. The copolymers obtained in Examples 6 and 7 formed such viscous solutions that reliable GPC data could not be obtained.

EXAMPLE 11

To a 100 ml glass vial equipped with a Teflon® coated stirbar was added norbornene (5 g, 53.1 mmol), methylene chloride (35 ml) and triethoxysilylnorbornene (5.0 ml, 19.1 mmol). To this stirred solution at ambient temperature was added palladium ethylhexanoate (0.9 ml of an 0.029 M palladium solution in dichloroethane, 26 µmol), and diethylaluminumchloride (0.07 ml of a 3.4 molar solution in hexanes, 238 µmol). The reaction was allowed to run for one week and then methanol was injected to kill the reaction. The polymer was washed with excess methanol and dried. The yield of copolymer was 5.8 g. GPC analysis showed the copolymer to have a molecular weight ($M_w$) of 124,000 and a polydispersity of 5.8. The proton NMR data indicated that the copolymer comprised approximately 28 mole % triethoxysilylnorbornene and 72 mole % norbornene.

Solutions of the polymer (7.3 wt. % in chlorobenzene) were spin coated onto silicon dioxide and aluminum substrates (750 rpm, cured film thickness of 4.5 µm). The polymer passed the tape test on both of the substrates. Refractive index 1.506 (TE mode), Δn=0.0024. Permittivity 2.9. The high permittivity value was due to the high level of residual catalyst and large particulate impurities in the polymer.

EXAMPLE 12

To a 100 ml glass vial equipped with a Teflon® coated stirbar was added norbornene (5 g, 53.1 mmol), methylene chloride (35 ml) and triethoxysilylnorbornene (1.54 ml, 5.9 mmol). To this stirred solution at ambient temperature was added palladium ethylhexanoate (0.74 ml of an 0.2 M palladium solution in dichloroethane, 14.75 µmol), 5.0 ml 1-hexene and ethylaluminumdichloride (0.02 ml of a 3.4 molar solution in hexanes, 75 µmol). The reaction was allowed to run for two hours and then methanol was injected to kill the reaction. The polymer was washed with excess methanol and dried. The yield of copolymer was 2.7 g.

Solutions of the polymer (6.7 wt. % in chlorobenzene) were spin coated onto aluminum and silicon dioxide substrates. The cured films passed the tape test for both substrates.

EXAMPLE 13

To a 100 ml glass vial equipped with a Teflon® coated stirbar was added norbornene (4.12 g, 43.8 mmol), dichloroethane (35 ml), ethylidenenorbornene (0.35 ml, 2.65 mmol), triethoxysilylnorbornene (0.35 ml, 1.3 mmol) and decylnorbornene (1.44 ml, 5.3 mmol). To this stirred solution at ambient temperature was added nickel ethylhexanoate (0.01 ml of an 8% nickel solution in mineral spirits, 13.0 µmol), and ethylaluminumdichloride (0.04 ml of a 3.4 molar solution in hexanes, 150 µmol). The reaction was allowed to run for two hours and then methanol was injected to kill the reaction. The polymer was washed with excess methanol and dried. The yield of copolymer was 1.7 g. GPC analysis showed the polymer to have a molecular weight ($M_w$) of 72,000 and a polydispersity of 2.4. Proton NMR confirmed that the product was a copolymer of all four monomers.

EXAMPLE 14

To a 100 ml glass vial equipped with a Teflon® coated stirbar was added norbornene (4.12 g, 43.8 mmol), dichloroethane (35 ml), ethylidenenorbornene (0.35 ml, 2.65 mmol), and triethoxysilylnorbornene (0.35 ml, 1.3 mmol). To this stirred solution at ambient temperature was added a 1:1 mol/mol solution in dichloroethane (0.1 molar) of nickel ethylhexanoate and dimethylanilinium tetrakis (pentafluorophenyl)boron (13.0 μmol), and triethylaluminum (0.09 ml, 0.65 mmol). The reaction was allowed to run for one hour and then methanol was injected to kill the reaction. The polymer was washed with excess methanol and dried. The yield of terpolymer was 1.3 g. GPC analysis showed the polymer to have a molecular weight ($M_w$) of 64,000 and a polydispersity of 2.15. Proton NMR confirmed that the product was a terpolymer of all three monomers.

Solutions of the polymer (17.2 wt. % in chlorobenzene) were spin coated (1250 rpm) onto silicon dioxide and aluminum substrates (cured film thickness 2.5 μm). Refractive index 1.536 (TE mode), Δn=0.0005. The polymer passed the tape test for both substrates. The polymer did not delaminate after exposure in boiling water (1.5 min.) followed by liquid nitrogen (1.5 min). Permittivity of 3.1 was high due to residual catalyst in the polymer.

EXAMPLE 15

To a 100 ml glass vial equipped with a Teflon® coated stirbar was added norbornene (4.12 g, 43.8 mmol), dichloroethane (35 ml), ethylidenenorbornene (0.35 ml, 2.65 mmol), and triethoxysilylnorbornene (0.35 ml, 1.3 mmol). To this stirred solution at ambient temperature was added catalyst C [($\eta^3$-crotyl)(cycloocta-1,5-diene)palladium] hexafluorophosphate (6.0 mg, 13.0 μmol) dissolved in dichloroethane (2 ml). The reaction was allowed to run for one hour and then methanol was injected to kill the reaction. The polymer was washed with excess methanol and dried. The yield of terpolymer was 1.4 g.

EXAMPLE 16

To a 100 ml glass vial equipped with a Teflon® coated stirbar was added norbornene (4.75 g, 50.5 mmol), dichloroethane (35 ml), vinylnorbornene (0.38 ml, 2.65 mmol) and triethoxysilylnorbornene (0.35 ml, 1.3 mmol). To this stirred solution at ambient temperature was added palladium ethylhexanoate (0.005 ml of a 0.2 M solution in dichloroethane, 13.0 μmol), and ethylaluminumdichloride (0.04 ml of a 3.4 molar solution in hexanes, 150 μmol). The reaction was allowed to run for two days and then methanol was injected to kill the reaction. The polymer was washed with excess methanol and dried. The yield of terpolymer was 2.4 g. GPC analysis showed the polymer to have a molecular weight ($M_w$) of 217,000 and a polydispersity of 2.8.

EXAMPLE 17

To a 100 ml glass vial equipped with a Teflon® coated stirbar was added norbornene (4.7 g, 49.8 mmol), dichloroethane (35 ml) and triethoxysilylnorbornene (0.7 ml, 2.7 mmol). To this stirred solution at ambient temperature was added catalyst A (0.012 g, 13 μmol), borontrifluoride.etherate (0.015 ml, 117 μmol) and finally triethylaluminum (1.3 ml of a 0.1 molar solution in heptane, 130 mol).

After 60 minutes the reaction was terminated by injecting methanol (3 ml). The polymer was then washed with an excess of methanol and dried overnight in a heated vacuum oven to afford the product (4.6 g, 85% conversion). GPC analysis showed the copolymer to have a molecular weight ($M_w$) of 491,000 ($M_n$ of 116,000) and exhibited a glass transition temperature of 373° C. Proton NMR revealed that the copolymer composition was 95:5 norbornene/triethoxysilylnorbornene.

EXAMPLE 18

To a 100 ml glass vial equipped with a Teflon® coated stirbar was added norbornene (4.6 g, 48.8 mmol), dichloroethane (50 ml) and triethoxysilylnorbornene (0.97 ml, 3.7 mmol). To this stirred solution at 60° C. was added catalyst A (0.012 g, 13 μmol), borontrifluoride.etherate (0.015 ml, 117 μmol) and finally triethylaluminum (0.077 ml of a 1.7 molar solution in heptane, 130 μmol).

After 60 minutes the reaction was terminated by injecting methanol (3 ml). The polymer was then washed with an excess of methanol and dried overnight in a heated vacuum oven to afford the product (3.9 g, 70%). GPC analysis showed the copolymer to have a molecular weight ($M_w$) of 68,100 ($M_n$ 34,900).

EXAMPLE 19

To a 100 ml glass vial equipped with a Teflon® coated stirbar was added norbornene (4.6 g, 48.8 mmol), dichloroethane (50 ml) and triethoxysilylnorbornene (1.12 ml, 4.24 mmol). To this stirred solution at ambient temperature was added catalyst A (0.012 g, 13 μmol), borontrifluoride.etherate (0.015 ml, 117 μmol) and finally triethylaluminum (0.077 ml of a 1.7 molar solution in cyclohexane, 130 μmol).

After 60 minutes the reaction was terminated by injecting methanol (3 ml). The polymer was then washed with an excess of methanol and dried overnight in a heated vacuum oven to afford the product (4.0 g, 70%). GPC analysis showed the copolymer to have a molecular weight ($M_w$) of 346,000 ($M_n$ 128,000). The proton NMR data indicated that the copolymer comprised 7.2% triethoxysilylnorbornene (13.6 wt. %) and 92.8% norbornene.

Solutions of the polymer were spin coated onto gold, aluminum, and silicon dioxide substrates. The polymers passed the tape test on all substrates. The polymer did not delaminate from the gold substrate after exposure to boiling water for 1.5 hours. Refractive index 1.514 (TE mode), Δn=0.0014. Permittivity 2.4–2.5.

EXAMPLE 20

To a 100 ml glass vial equipped with a Teflon® coated stirbar was added norbornene (4.6 g, 48.8 mmol), dichloroethane (50 ml), triethoxysilylnorbornene (1.12 ml, 4.24 mmol) and ethylidenenorbornene (0.35 ml, 2.65 mmol). To this stirred solution at ambient temperature was added catalyst A (0.012 g, 13 μmol), borontrifluoride.etherate (0.015 ml, 117 mol) and finally triethylaluminum (0.077 ml of a 1.7 molar solution in cyclohexane, 130 μmol).

After 60 minutes the reaction was terminated by injecting methanol (3 ml). The polymer was then washed with an excess of methanol and dried overnight in a heated vacuum oven to afford the product (2.8 g).

EXAMPLE 21

To a 100 ml glass vial equipped with a Teflon® coated stirbar was added norbornene (4.6 g, 48.8 mmol), monochlorobenzene (50 ml) and triethoxysilylnorbornene (1.12 ml, 4.24 mmol). To this stirred solution at ambient temperature was added catalyst A (0.012 g, 13 μmol), borontrifluoride.etherate (0.015 ml, 117 μmol) and finally triethylaluminum (0.077 ml of a 1.7 molar solution in cyclohexane, 130 μmol).

After 60 minutes the reaction was terminated by injecting methanol (3 ml). The polymer was then washed with an excess of methanol and dried overnight in a heated vacuum oven to afford the product (4.1 g, 71%).

EXAMPLE 22

To a 100 ml glass vial equipped with a Teflon® coated stirbar was added norbornene (4.6 g, 48.8 mmol), monochlorobenzene (50 ml) and triethoxysilylnorbornene (1.12 ml, 4.24 mmol). To this stirred solution at 60° C. was added catalyst A (0.012 g, 13 μmol), borontrifluoride-etherate (0.015 ml, 117 μmol) and finally triethylaluminum (0.077 ml of a 1.7 molar solution in cyclohexane, 130 μmol).

After 60 minutes the reaction was terminated by injecting methanol (3 ml). The polymer was then washed with an excess of methanol and dried overnight in a heated vacuum oven to afford the product (4.0 g, 70%).

EXAMPLE 23

To a 500 ml glass vial equipped with a Teflon® coated stirbar was added norbornene (18.4 g, 195 mmol), dichloroethane (163 ml) and triethoxysilylnorbornene (4.44 ml, 16.9 mmol). To this stirred solution at 50° C. was added a mixture of catalyst A (0.048 g, 52 μmol), borontrifluoride-etherate (0.06 ml, 468 μmol) and finally triethylaluminum (0.31 ml of a 1.7 molar solution in cyclohexane, 520 μmol), that had been premixed in dichloroethane (2 ml) for 30 seconds.

After 60 minutes the reaction was terminated by injecting methanol (10 ml). The polymer was then washed with an excess of methanol and dried overnight in a heated vacuum oven to afford the product (8.1 g).

EXAMPLE 24

To a 100 ml glass vial equipped with a Teflon® coated stirbar was added norbornene (91 g, 0.96 mol), triethoxysilylnorbornene (21.8 ml, 83.2 mmol) and monochlorobenzene (405 ml). To this stirred solution at ambient temperature was added catalyst A (0.17 g, 0.104 mmol), borontrifluoride-etherate (0.12 ml, 0.936 mmol) and finally triethylaluminum (0.62 ml of a 1.7 molar solution in cyclohexane, 1.04 mmol).

After 60 minutes the reaction was terminated by injecting methanol (30 ml). The viscous polymer cement was diluted with 1 liter of cyclohexane and then precipitated into excess acetone and then the polymer was washed with an excess of acetone and dried overnight in a heated vacuum oven (90° C.) to afford the product (81.0 g, 72%). GPC analysis showed the copolymer to have a molecular weight ($M_w$) of 955,000 ($M_n$ 298,000). The proton NMR data indicated that the copolymer comprised 7.8% triethoxysilylnorbornene and 92.2% norbornene.

EXAMPLE 25

To a 100 ml glass vial equipped with a Teflon® coated stirbar was added norbornene (4.6 g, 48.8 mmol), monochlorobenzene (50 ml) triethoxysilylnorbornene (1.12 ml, 4.24 mmol) and isobutylene (0.3 g, 5.3 mmol). To this stirred solution at ambient temperature was added catalyst A (0.012 g, 13 μmol), borontrifluoride-etherate (0.015 ml, 117 μmol) and finally triethylaluminum (0.077 ml of a 1.7 molar solution in cyclohexane, 130 μmol).

After 60 minutes the reaction was terminated by injecting methanol (3 ml). The polymer was then washed with an excess of methanol and dried overnight in a heated vacuum oven to afford the product (4.9 g). GPC analysis showed the copolymer to have a molecular weight ($M_w$) of 107,500 ($M_n$ 46,100). The proton NMR data indicated that the polymer contained approximately 6.7% triethoxysilylnorbornene.

EXAMPLE 26

To a 100 ml glass vial equipped with a Teflon® coated stirbar was added norbornene (4.6 g, 48.8 mmol), monochlorobenzene (50 ml), triethoxysilylnorbornene (1.12 ml, 4.24 mmol) and butadiene (0.3 g, 5.3 mmol). To this stirred solution at ambient temperature was added catalyst A (0.012 g, 13 μmol), borontrifluoride-etherate (0.015 ml, 117 μmol) and finally triethylaluminum (0.077 ml of a 1.7 molar solution in cyclohexane, 130 μmol).

After 60 minutes the reaction was terminated by injecting methanol (3 ml). The polymer was then washed with an excess of methanol and dried overnight in a heated vacuum oven to afford the product (5.0 g). GPC analysis showed the copolymer to have a molecular weight ($M_w$) of 26,100 ($M_n$ 12,200).

EXAMPLE 27

To a 100 ml glass vial equipped with a Teflon® coated stirbar was added norbornene (4.6 g, 48.8 mmol), monochlorobenzene (40 ml), triethoxysilylnorbornene (1.12 ml, 4.24 mmol) and solution D (0.67 ml). To this stirred solution at ambient temperature was added catalyst A (0.012 g, 13 μmol), borontrifluoride-etherate (0.015 ml, 117 μmol) and finally triethylaluminum (0.077 ml of a 1.7 molar solution in cyclohexane, 130 μmol).

After 60 minutes the reaction was terminated by injecting methanol (3 ml). The polymer was then washed with an excess of methanol and dried overnight in a heated vacuum oven to afford the product (5.6 g, 93% conversion). GPC analysis showed the copolymer to have a molecular weight ($M_w$) of 384,000 ($M_n$ 103,000).

EXAMPLE 28

To a 100 ml glass vial equipped with a Teflon® coated stirbar was added norbornene (9.2 g, 97.6 mmol), monochlorobenzene (50 ml), triethoxysilylnorbornene (2.2 ml, 8.48 mmol) and solution E (1.36 g). To this stirred solution at ambient temperature was added catalyst A (0.012 g, 13 μmol), borontrifluoride-etherate (0.015 ml, 117 μmol) and finally triethylaluminum (0.077 ml of a 1.7 molar solution in cyclohexane, 130 μmol).

After 60 minutes the reaction was terminated by injecting methanol (3 ml). The polymer was then washed with an excess of methanol and dried overnight in a heated vacuum oven to afford the product (11.7 g). GPC analysis showed the copolymer to have a molecular weight ($M_w$) of 369,000 ($M_n$ 84,000).

EXAMPLE 29

To a 100 ml glass vial equipped with a Teflon® coated stirbar was added norbornene (5 g, 53.1 mmol), toluene (35 ml) and triethoxysilylnorbornene (1.24 ml, 4.7 mmol). To this stirred solution at ambient temperature was added catalyst A (0.012 g, 13 μmol), tris(pentafluorophenyl)boron (117 μmol in petroleum naphtha) and finally triethylaluminum (0.077 ml of a 1.7 molar solution in cyclohexane, 130 μmol). Upon addition of the trialkylaluminum there ensued an exothermic reaction. The reaction was allowed to run for 60 minutes and then methanol was injected to kill the reaction. The polymer was washed with excess methanol and dried. The yield of copolymer was 6.2 g. GPC analysis showed the copolymer to have a molecular weight ($M_w$) of 2,550,000 ($M_n$ 222,000).

EXAMPLE 30

To a 100 ml glass vial equipped with a Teflon® coated stirbar was added norbornene (4.6 g, 48.8 mmol), toluene (35 ml) and triethoxysilylnorbornene (1.12 ml, 4.24 mmol). To this stirred solution at ambient temperature was added nickel ethylhexanoate (0.01 ml of an 8% w nickel solution in mineral spirits, 13 μmol), tris(pentafluorophenyl)boron (117 μmol in petroleum naphtha) and finally triethylaluminum (0.077 ml of a 1.7 molar solution in cyclohexane, 130 μmol). Upon addition of the trialkylaluminum there ensued an exothermic reaction resulting in a very viscous solution. The reaction was allowed to run for 60 minutes and then methanol was injected to kill the reaction. The polymer was washed with excess methanol and dried. The yield of copolymer was 6.0 g. GPC analysis showed the copolymer to have a molecular weight ($M_w$) of 1,440,000 ($M_n$ 201,000).

EXAMPLE 31

To a 100 ml glass vial equipped with a Teflon® coated stirbar was added norbornene (4.6 g, 48.8 mmol), cyclohexane (30 ml) and triethoxysilylnorbornene (1.12 ml, 4.24 mmol). To this stirred solution at ambient temperature was added nickel ethylhexanoate (0.01 ml of an 8% w nickel solution in mineral spirits, 13 μmol), tris(pentafluorophenyl)boron (13 μmol in petroleum naphtha) and finally triethylaluminum (0.077 ml of a 1.7 molar solution in cyclohexane, 130 μmol). Upon addition of the trialkylaluminum there ensued an exothermic reaction. The reaction was allowed to run for 60 minutes and then methanol was injected to kill the reaction. The polymer was washed with excess methanol and dried. The yield of copolymer was 1.2 g (21% conversion). GPC analysis showed the copolymer to have a molecular weight ($M_w$) of 1,856,000.

EXAMPLE 32

To a 100 ml glass vial equipped with a Teflon® coated stirbar was added norbornene (4.6 g, 48.8 mmol), cyclohexane (30 ml) and triethoxysilylnorbornene (1.12 ml, 4.24 mmol). To this stirred solution at ambient temperature was added nickel ethylhexanoate (0.01 ml of an 8% w nickel solution in mineral spirits, 13 μmol), tris(pentafluorophenyl)boron (13 μmol in petroleum naphtha) and finally triethylaluminum (0.023 ml of a 1.7 molar solution in cyclohexane, 40 μmol). The reaction was allowed to run for 60 minutes and then methanol was injected to kill the reaction. The polymer was washed with excess methanol and dried. The yield of copolymer was 0.8 g (14% conversion). GPC analysis showed the copolymer to have a molecular weight ($M_w$) of 2,934,000.

EXAMPLE 33

To a 100 ml glass vial equipped with a Teflon® coated stirbar was added norbornene (4.6 g, 48.8 mmol), toluene (30 ml), triethoxysilylnorbornene (1.12 ml, 4.24 mmol) and solution D (0.77 ml). To this stirred solution at ambient temperature was added nickel ethylhexanoate (0.01 ml of an 8% w nickel solution in mineral spirits, 13 μmol), tris(pentafluorophenyl)boron (117 μmol in petroleum naphtha) and finally triethylaluminum (0.077 ml of a 1.7 molar solution in cyclohexane, 130 μmol). Upon addition of the trialkylaluminum there ensued an exothermic reaction. The reaction was allowed to run for 60 minutes and then methanol was injected to kill the reaction. The polymer was washed with excess methanol and dried. The yield of copolymer was 4.5 g.

EXAMPLE 34

To a 100 ml glass vial equipped with a Teflon® coated stirbar was added norbornene (5 g, 53.1 mmol), cyclohexane (35 ml), triethoxysilylnorbornene (1.24 ml, mmol) and solution D, (0.77 ml). To this stirred solution at ambient temperature was added nickel ethylhexanoate (0.01 ml of an 8% w nickel solution in mineral spirits, 13 μmol), tris(pentafluorophenyl)boron (117 μmol in petroleum naphtha) and finally triethylaluminum (0.077 ml of a 1.7 molar solution in cyclohexane, 130 μmol). Upon addition of the trialkylaluminum there ensued an exothermic reaction. The reaction was allowed to run for 60 minutes and then methanol was injected to kill the reaction. The polymer was washed with excess methanol and dried. The yield of copolymer was 5.1 g.

EXAMPLE 35

To a 100 ml glass vial equipped with a Teflon® coated stirbar was added norbornene (4.6 g, 48.9 mmol), cyclohexane (30 ml), butadiene (0.15 g, 2.8 mmol) and triethoxysilylnorbornene (1.12 ml, 4.2 mmol). To this stirred solution at ambient temperature was added nickel ethylhexanoate (0.01 ml of an 8% w nickel solution in mineral spirits, 13 μmol), tris(pentafluorophenyl)boron (117 μmol in petroleum naphtha) and finally triethylaluminum (0.077 ml of a 1.7 molar solution in cyclohexane, 130 μmol). The reaction was allowed to run for 60 minutes and then methanol was injected to kill the reaction. The polymer was washed with excess methanol and dried. The yield of terpolymer was 0.6 g. GPC analysis showed the terpolymer to have a molecular weight ($M_w$) of 157,000 ($M_n$ 59,000).

EXAMPLE 36

To a 100 ml glass vial equipped with a Teflon® coated stirbar was added norbornene (4.6 g, 48.9 mmol), cyclohexane (30 ml), isobutylene (0.3 g, 5.37 mmol) and triethoxysilylnorbornene (1.12 ml, 4.2 mmol). To this stirred solution at ambient temperature was added nickel ethylhexanoate (0.01 ml of an 8% w nickel solution in mineral spirits, 13 μmol), tris(pentafluorophenyl)boron (117 μmol in petroleum naphtha) and finally triethylaluminum (0.077 ml of a 1.7 molar solution in cyclohexane, 130 μmol). The reaction was allowed to run for 60 minutes and then methanol was injected to kill the reaction. The polymer was washed with excess methanol and dried. The yield of terpolymer was 2.7 g.

EXAMPLE 37

To a 100 ml glass vial equipped with a Teflon® coated stirbar was added norbornene (4.6 g, 48.8 mmol), chlorobenzene (35 ml), triethoxysilylnorbornene (1.12 ml, 4.24 mmol) and 5-decylnorbornene (1.6 ml, 5.9 mmol). To this stirred solution at ambient temperature was added catalyst A (0.012 g, 13 μmol), borontrifluoride-etherate (0.015 ml, 117 μmol) and finally triethylaluminum (0.077 ml of a 1.7 molar solution in cyclohexane, 130 μmol). Upon addition of the trialkylaluminum there ensued an exothermic reaction. The reaction was allowed to run for one hour and then methanol was injected to kill the reaction. The polymer was washed with excess methanol and dried. The yield of copolymer was 6.3 g. GPC analysis showed the polymer to have a molecular weight ($M_w$) of 681,000 and a polydispersity of 3.1.

EXAMPLE 38

To a 100 ml glass vial equipped with a Teflon® coated stirbar was added norbornene (4.6 g, 48.8 mmol), chlorobenzene (35 ml), triethoxysilylnorbornene (1.12 ml, 4.24 mmol) and triisobutylene (0.5 g, 3.6 mmol). To this stirred solution at ambient temperature was added catalyst A (0.012 g, 13 μmol), borontrifluoride-etherate (0.015 ml, 117 μmol) and finally triethylaluminum (0.077 ml of a 1.7 molar solution in cyclohexane, 130 μmol). Upon addition of the trialkylaluminum there ensued an exothermic reaction. The reaction was allowed to run for one hour and then methanol was injected to kill the reaction. The polymer was washed with excess methanol and dried. The yield of copolymer was 4.5 g. GPC analysis showed the polymer to have a molecular weight ($M_w$) of 681,000 and a polydispersity of 3.6.

EXAMPLE 39

To a 100 ml glass vial equipped with a Teflon® coated stirbar was added norbornene (4.6 g, 48.8 mmol), chlorobenzene (35 ml), triethoxysilylnorbornene (1.12 ml, 4.24 mmol) and triisobutylene (0.5 g, 3.6 mmol). To this stirred solution at ambient temperature was added nickel ethylhexanoate (0.01 ml of an 8% w nickel solution in mineral spirits, 13 μmol), tris(pentafluorophenyl)boron (117 μmol in petroleum naphtha) and finally triethylaluminum (0.077 ml of a 1.7 molar solution in cyclohexane, 130 μmol). Upon addition of the trialkylaluminum there ensued an exothermic reaction. The reaction was allowed to run for 60 minutes and then methanol was injected to kill the reaction. The polymer was washed with excess methanol and dried. The yield of copolymer was 5.1 g. GPC analysis showed the polymer to have a molecular weight ($M_w$) of 589,000 and a polydispersity of 2.1.

EXAMPLE 40

To a 100 ml glass vial equipped with a Teflon® coated stirbar was added norbornene (4.6 g, 48.8 mmol), chorobenzene (35 ml), butadiene (0.15 g, 2.8 mmol) and triethoxysilylnorbornene (1.12 ml, 4.24 mmol). To this stirred solution at ambient temperature was added nickel ethylhexanoate (0.01 ml of an 8% w nickel solution in mineral spirits, 13 μmol), tris(pentafluorophenyl)boron (117 μmol in petroleum naphtha) and finally triethylaluminum (0.077 ml of a 1.7 molar solution in cyclohexane, 130 μmol). The reaction was allowed to run for 60 minutes and then methanol was injected to kill the reaction. The polymer was washed with excess methanol and dried. The yield of copolymer was 3.5 g. GPC analysis showed the copolymer to have a molecular weight ($M_w$) of 120,000 ($M_n$ 18,900). The GPC data showed the terpolymer to be distinctly bimodal in character.

EXAMPLE 41

To a 100 ml glass vial equipped with a Teflon® coated stirbar was added norbornene (1.8 g, 19.1 mmol), cyclohexane (20 ml) and triethoxysilylnorbornene (3.00 ml, 11.5 mmol). To this stirred solution at ambient temperature was added nickel ethylhexanoate (0.01 ml of an 8% w nickel solution in mineral spirits, 13 μmol), tris(pentafluorophenyl) boron (117 μmol in petroleum naphtha) and finally triethylaluminum (0.077 ml of a 1.7 molar solution in cyclohexane, 130 μmol). The reaction was allowed to run for 18 hours and then methanol was injected to kill the reaction. The polymer was washed with excess methanol and dried. The yield of copolymer was 3.3 g.

EXAMPLE 42

To a 100 ml glass vial equipped with a Teflon® coated stirbar was added norbornene (1.25 g, 13.3 mmol), monochlorobenzene (30 ml) and triethoxysilylnorbornene (10.4 ml, 40.0 mmol). To this stirred solution at ambient temperature was added catalyst A (0.012 g, 13 μmol), borontrifluoride-etherate (0.015 ml, 117 μmol) and finally triethylaluminum (0.077 ml of a 1.7 molar solution in cyclohexane, 130 μmol). The reaction was allowed to run for 18 hours and then methanol was injected to kill the reaction. The polymer was washed with excess methanol and dried. The yield of copolymer was 2.4 g. Proton NMR revealed the resulting copolymer to comprise 58 mol % norbornene units and 42 mol % triethoxysilylnorbornene units.

EXAMPLE 43

To a 100 ml glass vial equipped with a Teflon® coated stirbar was added norbornene (2.5 g, 26.6 mmol), monochlorobenzene (30 ml) and triethoxysilylnorbornene (7.0 ml, 26.6 mmol). To this stirred solution at ambient temperature was added nickel ethylhexanoate (0.01 ml of an 8% w nickel solution in mineral spirits, 13 μmol), tris(pentafluorophenyl) boron (117 μmol in petroleum naphtha) and finally triethylaluminum (0.077 ml of a 1.7 molar solution in cyclohexane, 130 μmol). The reaction was allowed to run for 18 hours and then methanol was injected to kill the reaction. The polymer was washed with excess methanol and dried. The yield of copolymer was 0.8 g. Proton NMR revealed the resulting copolymer to comprise 58 mol % norbornene units and 42 mol % triethoxysilylnorbornene units.

EXAMPLE 44

To a 100 ml glass vial equipped with a Teflon® coated stirbar was added norbornene (4.6 g, 48.8 mmol), dichloroethane (20 ml), triethoxysilylnorbornene (1.12 ml, 4.24 mmol) and vinylcyclohexeneepoxide (1.0 ml, 7.7 mmol). To this stirred solution at ambient temperature was added nickel ethylhexanoate (0.01 ml of an 8% w nickel solution in mineral spirits, 13 μmol), tris(pentafluorophenyl)boron (117 μmol in petroleum naphtha) and finally triethylaluminum (0.077 ml of a 1.7 molar solution in cyclohexane, 130 μmol). The reaction was allowed to run for 60 minutes and then methanol was injected to kill the reaction. The polymer was washed with excess methanol and dried. The yield of copolymer was 2.4 g. GPC analysis showed the polymer to have a molecular weight ($M_w$) of 1,120,000. Proton NMR showed the product to be a terpolymer containing all three monomers.

EXAMPLE 45

To a 100 ml glass vial equipped with a Teflon® coated stirbar was added norbornene (4.6 g, 48.8 mmol), cyclohexane (25 ml), triethoxysilylnorbornene (1.12 ml, 4.24 mmol) and vinylcyclohexeneepoxide (1.0 ml, 7.7 mmol). To this stirred solution at ambient temperature was added nickel ethylhexanoate (0.01 ml of an 8% w nickel solution in mineral spirits, 13 μmol), tris(pentafluorophenyl)boron (117 μmol in petroleum naphtha) and finally triethylaluminum (0.077 ml of a 1.7 molar solution in cyclohexane, 130 μmol). The reaction was allowed to run for 60 minutes and then methanol was injected to kill the reaction. The polymer was washed with excess methanol and dried. The yield of copolymer was 2.6 g. GPC analysis showed the polymer to have a molecular weight ($M_w$) of 477,000. ($M_n$ 19,000). Proton NMR showed the product to be a terpolymer containing all three monomers.

EXAMPLE 46

To a 100 ml glass vial equipped with a Teflon® coated stirbar was added norbornene (4.6 g, 48.8 mmol), cyclohexane (35 ml), triethoxysilylnorbornene (1.12 ml, 4.24 mmol) and ethylvinylether (2.0 ml, 20.9 mmol). To this stirred solution at ambient temperature was added nickel ethylhexanoate (0.01 ml of an 8% w nickel solution in mineral spirits, 13 µmol), tris(pentafluorophenyl)boron (117 µmol in petroleum naphtha) and finally triethylaluminum (0.077 ml of a 1.7 molar solution in cyclohexane, 130 µmol). The reaction was allowed to run for 60 minutes and then methanol was injected to kill the reaction. The polymer was washed with excess methanol and dried. The yield of copolymer was 4.2 g. GPC analysis showed the polymer to have a molecular weight ($M_w$) of 1,146,000 and a broad polydispersity.

EXAMPLE 47

To a 100 ml glass vial equipped with a Teflon® coated stirbar was added norbornene (4.6 g, 48.8 mmol), cyclohexane (35 ml), triethoxysilylnorbornene (1.12 ml, 4.24 mmol) and ethylvinylether (0.5 ml, 5.2 mmol). To this stirred solution at ambient temperature was added nickel ethylhexanoate (0.01 ml of an 8% w nickel solution in mineral spirits, 13 µmol), tris(pentafluorophenyl)boron (117 µmol in petroleum naphtha) and finally triethylaluminum (0.077 ml of a 1.7 molar solution in cyclohexane, 130 µmol). The reaction was allowed to run for 60 minutes and then methanol was injected to kill the reaction. The polymer was washed with excess methanol and dried. The yield of copolymer was 6.1 g. GPC analysis showed the polymer to have a molecular weight ($M_w$) of 69,400 and a polydispersity of 2.8.

EXAMPLE 48

To a 100 ml glass vial equipped with a Teflon® coated stirbar was added norbornene (4.6 g, 48.8 mmol), chlorobenzene (30 ml), triethoxysilylnorbornene (1.12 ml, 4.24 mmol) and n-butylvinylether (0.5 ml, 3.9 mmol). To this stirred solution at ambient temperature was added nickel ethylhexanoate (0.01 ml of an 8% w nickel solution in mineral spirits, 13 µmol), tris(pentafluorophenyl)boron (117 µmol in petroleum naphtha) and finally triethylaluminum (0.077 ml of a 1.7 molar solution in cyclohexane, 130 µmol). The reaction was allowed to run for 60 minutes and then methanol was injected to kill the reaction. The polymer was washed with excess methanol and dried. The yield of terpolymer was 3.1 g.

EXAMPLE 49

To a 100 ml glass vial equipped with a Teflon® coated stirbar was added norbornene (4.6 g, 48.8 mmol), chlorobenzene (35 ml), triethoxysilylnorbornene (1.12 ml, 4.24 mmol) and n-butylvinylether (2.5 ml, 19.3 mmol). To this stirred solution at ambient temperature was added nickel ethylhexanoate (0.01 ml of an 8% w nickel solution in mineral spirits, 13 µmol), tris(pentafluorophenyl)boron (117 µmol in petroleum naphtha) and finally triethylaluminum (0.077 ml of a 1.7 molar solution in cyclohexane, 130 µmol). The reaction was allowed to run for 60 minutes and then methanol was injected to kill the reaction. The polymer was diluted with excess dichlorobenzene, precipitated into excess methanol, washed with excess methanol and dried. The yield of terpolymer was 1.9 g.

EXAMPLE 50

To a 100 ml glass vial equipped with a Teflon® coated stirbar was added norbornene (4.6 g, 48.8 mmol), chlorobenzene (35 ml) and triethoxysilylnorbornene 1.12 ml, 4.24 mmol). To this stirred solution at ambient temperature was added palladium ethylhexanoate (0.13 ml of a 0.1M solution in cyclohexane, 13 µmol) followed by tris (pentafluorophenyl)boron (117 µmol in petroleum naphtha). The reaction was allowed to run overnight and then methanol was injected to kill the reaction. The polymer produced was insoluble in cyclohexane, hot o-dichlorobenzene etc.

EXAMPLE 51

To a 100 ml glass vial equipped with a Teflon® coated stirbar was added norbornene (4.6 g, 48.8 mmol), dichloroethane (35 ml) and triethoxysilylnorbornene (1.12 ml, 4.24 mmol). To this stirred solution at ambient temperature was added palladium ethylhexanoate (0.13 ml of a 0.1M solution in cyclohexane, 13 µmol) immediately followed by tris (pentafluorophenyl)boron (117 µmol in petroleum naphtha) and finally triethylaluminum (0.077 ml of a 1.7 molar solution in cyclohexane, 130 µmol). The reaction was allowed to run for 60 minutes and then methanol was injected to kill the reaction. The polymer was washed with excess methanol and dried. The yield of copolymer was 2.9 g.

EXAMPLE 52

To a 100 ml glass vial equipped with a Teflon® coated stirbar was added norbornene (4.6 g, 48.8 mmol), chlorobenzene (35 ml) and triethoxysilylnorbornene (1.12 ml, 4.24 mmol). To this stirred solution at ambient temperature was added palladium ethylhexanoate (0.13 ml of a 0.1M solution in cyclohexane, 13 µmol) followed by tris (pentafluorophenyl)boron (117 µmol in petroleum naphtha). The reaction was allowed to run for 60 minutes and then methanol was injected to kill the reaction. The polymer was washed with excess methanol and dried. The yield of copolymer was quantitative, 5.9 g.

EXAMPLE 53

To a 100 ml glass vial equipped with a Teflon® coated stirbar was added norbornene (2.0 g, 21.2 mmol), cyclohexane (40 ml) and triethoxysilylnorbornene (3.00 ml, 11.5 mmol). To this stirred solution at ambient temperature was added nickel ethylhexanoate (0.01 ml of an 8% w nickel solution in mineral spirits, 13 µmol), tris(pentafluorophenyl) boron (117 µmol in petroleum naphtha) and finally triethylaluminum (0.077 ml of a 1.7 molar solution in cyclohexane, 130 µmol). The reaction was allowed to run for 18 hours and then methanol was injected to kill the reaction. The polymer was washed with excess methanol and dried. The yield of copolymer was 2.8 g (57%). GPC analysis showed the polymer to have a molecular weight ($M_w$) of 610,000. Proton NMR revealed the copolymer to contain 30.5 mol % triethoxysilylnorbornene units.

EXAMPLE 54

To a 100 ml glass vial equipped with a Teflon® coated stirbar was added norbornene (2.0 g, 21.2 mmol), chlorobenzene (40 ml) and triethoxysilylnorbornene (3.00 ml, 11.5 mmol). To this stirred solution at ambient temperature was added nickel ethylhexanoate (0.01 ml of an 8% w nickel solution in mineral spirits, 13 μmol), tris(pentafluorophenyl) boron (117 μmol in petroleum naphtha) and finally triethylaluminum (0.077 ml of a 1.7 molar solution in cyclohexane, 130 μmol). The reaction was allowed to run for 18 hours and then methanol was injected to kill the reaction. The polymer was washed with excess methanol and dried. The yield of copolymer was 1.6 g. GPC analysis showed the polymer to have a molecular weight ($M_w$) of 368,000 and a polydispersity of 4.4.

EXAMPLE 55

To a 100 ml glass vial equipped with a Teflon® coated stirbar was added norbornene (4.6 g, 48.8 mmol), chlorobenzene (40 ml), triethoxysilylnorbornene (1.12 ml, 4.24 mmol) and 1-hexene (0.066 ml, 0.53 mmol). To this stirred solution at ambient temperature was added nickel ethylhexanoate (0.01 ml of an 8% w nickel solution in mineral spirits, 13 μmol), tris(pentafluorophenyl)boron (117 μmol in petroleum naphtha) and finally triethylaluminum (0.077 ml of a 1.7 molar solution in cyclohexane, 130 μmol). Upon addition of the trialkylaluminum there ensued an exothermic reaction. The reaction was allowed to run for 60 minutes and then 2,4-pentanedione was injected to kill the reaction. The polymer was washed with excess methanol and dried. The yield of copolymer was 5.9 g, 95%. GPC analysis showed the copolymer to have a molecular weight ($M_w$) of 359,500 and a polydispersity of 3.7.

EXAMPLE 56

To a 100 ml glass vial equipped with a Teflon® coated stirbar was added norbornene (2.5 g, 26.5 mmol), cyclohexane (35 ml) and triethoxysilylnorbornene (6.9 ml, 26.5 mmol). To this stirred solution at ambient temperature was added nickel ethylhexanoate (0.01 ml of an 8% w nickel solution in mineral spirits, 13 μmol), tris(pentafluorophenyl) boron (117 μmol in petroleum naphtha) and finally triethylaluminum (0.077 ml of a 1.7 molar solution in cyclohexane, 130 μmol). The reaction was allowed to run for 48 hours and then methanol was injected to kill the reaction. The polymer was washed with excess methanol and dried. The yield of copolymer was 0.9 g.

EXAMPLE 57

To a 100 ml glass vial equipped with a Teflon® coated stirbar was added norbornene (4.6 g, 48.8 mmol), monochlorobenzene (35 ml) and triethoxysilylnorbornene (1.12 ml, 4.24 mmol). To this stirred solution at ambient temperature was added catalyst B (4.6 mg, 13 μmol). The reaction was allowed to run for 24 hours and then methanol was injected to kill the reaction. The copolymer was washed with excess methanol and dried. The yield of copolymer was 0.7 g. Proton NMR revealed the copolymer to contain 8 mol % triethoxysilylnorbornene units. GPC indicated the molecular weight ($M_w$) to be 330,000 with a polydispersity of 2.5.

EXAMPLE 58

To a 100 ml glass vial equipped with a Teflon® coated stirbar was added norbornene (4.0 g, 42.4 mmol), cyclohexane (35 ml) and triethoxysilylnorbornene (2.8 ml, 10.6 mmol). To this stirred solution at ambient temperature was added nickel ethylhexanoate (0.02 ml of an 8% w nickel solution in mineral spirits, 26 μmol) followed by tris (pentafluorophenyl)boron (234 μmol in petroleum naphtha) and diethylzinc (260 μmol) which had been premixed at ambient temperature for 5 minutes in hydrocarbon diluent. The reaction was allowed to run for 24 hours and then methanol was injected to kill the reaction. The polymer was washed with excess methanol and dried. The yield of copolymer was 1.6 g. GPC studies showed the copolymer to have a high molecular weight ($M_n$ 1,274,000).

EXAMPLE 59

To a 100 ml glass vial equipped with a Teflon® coated stirbar was added norbornene (4.0 g, 42.4 mmol), cyclohexane (35 ml) and triethoxysilylnorbornene (2.8 ml, 10.6 mmol). To this stirred solution at ambient temperature was added nickel ethylhexanoate (0.02 ml of an 8% w nickel solution in mineral spirits, 26 μmol) followed by tris (pentafluorophenyl)boron (234 μmol in petroleum naphtha), triethylaluminum (130 μmol) and diethylzinc (130 μmol) the latter three components having been premixed at ambient temperature in a small amount of hydrocarbon diluent. There ensued a rapid and exothermic reaction. The reaction was allowed to run for 60 minutes and then methanol was injected to kill the reaction. The polymer was washed with excess methanol and dried. The yield of copolymer was 5.2 g. GPC studies showed the copolymer to have a high molecular weight ($M_n$ 1,241,000).

EXAMPLE 60

To a 100 ml glass vial equipped with a Teflon® coated stirbar was added norbornene (4.0 g, 42.4 mmol), cyclohexane (35 ml) and triethoxysilylnorbornene (2.8 ml, 10.6 mmol). To this stirred solution at ambient temperature was added nickel ethylhexanoate (0.02 ml of an 8% w nickel solution in mineral spirits, 26 μmol) followed by tris (pentafluorophenyl)boron (234 μmol in petroleum naphtha), triethylaluminum (33 μmol) and diethylzinc (97 μmol) the latter three components having been premixed at ambient temperature in a small amount of hydrocarbon diluent. There ensued a rapid and exothermic reaction. The reaction was allowed to run for 60 minutes and then methanol was injected to kill the reaction. The polymer was washed with excess methanol and dried. The yield of copolymer was 4.6 g. GPC studies showed the copolymer to have a high molecular weight ($M_n$ 1,213,000) with a polydispersity of 3.2.

EXAMPLES 61–62

To a 100 ml glass vial equipped with a Teflon® coated stirbar was added norbornene (4.0 g, 42.4 mmol), cyclohexane (35 ml), triethoxysilylnorbornene (2.8 ml, 10.6 mmol) and ethylene (amount indicated in the following table, ethylene gas introduced at atmospheric pressure and ambient temperature as a gas using a glass syringe). To this stirred solution at ambient temperature was added nickel ethylhexanoate (0.02 ml of an 8% w nickel solution in mineral spirits, 26 μmol) and a mixture of tris(pentafluorophenyl)boron (234 μmol in petroleum naphtha) and triethylaluminum (0.16 ml of a 1.7 molar solution in cyclohexane, 260 μmol). The reaction was allowed to run for 18 hours the reaction was terminated by pouring the resulting solution into a large, stirred volume of methanol, filtered, washed with an excess of methanol, and dried overnight in a heated vacuum oven (80° C.) to afford the product.

| Example Number | Ethylene (gas-ml) | Yield (g) | $M_w$ | $M_n$ |
|---|---|---|---|---|
| 61 | 10 | 2.3 | 233,000 | 41,400 |
| 62 | 5 | 2.8 | 359,000 | 83,100 |

EXAMPLES 63–64

To a 100 ml glass vial equipped with a Teflon® coated stirbar was added norbornene (4.0 g, 42.4 mmol), diluent (35 ml) and triethoxysilylnorbornene (2.8 ml, 10.6 mmol). To this stirred solution at ambient temperature was added catalyst A (0.024 g, 26 μmol), borontrifluoride-etherate (0.03 ml, 234 μmol) and finally triethylaluminum (0.16 ml of a 1.7 molar solution in cyclohexane, 260 μmol). After 60 minutes the reactions were terminated by pouring the resulting solution (in the case of Example 63 the polymer was first dissolved in THF to form a homogeneous solution) into a large, stirred volume of methanol, filtered, washed with an excess of methanol, and dried overnight in a heated vacuum oven (80° C.) to afford the product.

| Example Number | Diluent | Polymerization Type | Conversion % | $M_w$ | $M_n$ |
|---|---|---|---|---|---|
| 63 | dichloroethane | Heterogeneous (product precipitated) | 79 | 244,100 | 52,100 |
| 64 | methylene chloride | Solution | 67 | 271,000 | 97,300 |

EXAMPLE 65

To a 100 ml glass vial equipped with a Teflon® coated stirbar was added norbornene (4.0 g, 42.4 mmol), dichloroethane (40 ml) and triethoxysilylnorbornene (2.8 ml, 10.6 mmol). To this stirred solution at ambient temperature was added the reaction product of nickel ethylhexanoate (0.01 ml of an 8% w nickel solution in mineral spirits, 13 μmol) and trifluoroacetic acid (13 μmol), followed by a mixture of tris(pentafluorophenyl)boron (117 μmol in petroleum naphtha) and triethylaluminum (0.077 ml of a 1.7 molar solution in cyclohexane, 130 μmol). The reaction was allowed to run for 18 hours and then methanol was injected to kill the reaction. The polymer was washed with excess methanol and dried. The yield of copolymer was 2.3 g. GPC showed the copolymer to exhibit a high molecular weight ($M_n$ 392,000) and a polydispersity of 4.2.

EXAMPLES 66–67

To a 100 ml glass vial equipped with a Teflon® coated stirbar was added norbornene (4.0 g, 42.4 mmol), diluent (35 ml) and triethoxysilylnorbornene (2.8 ml, 10.6 mmol). To this stirred solution at ambient temperature was added catalyst A (0.012 g, 13 μmol), borontrifluoride-etherate (0.015 ml, 117 μmol) and finally triethylaluminum (0.077 ml of a 1.7 molar solution in cyclohexane, 130 μmol). After 60 minutes the reactions were terminated by pouring the resulting homogeneous solution into a large, stirred volume of methanol, filtered, washed with an excess of methanol, and dried overnight in a heated vacuum oven (80° C.) to afford the product.

| Example Number | Diluent | Yield (g) | Level of Triethoxysilyl-norbornene in Copolymer ($^1$H-NMR) | $M_w$ | $M_n$ |
|---|---|---|---|---|---|
| 66 | toluene | 4.5 | 19.2 | 1,335,000 | 401,100 |
| 67 | monochlorobenzene | 5.3 | 17.9 | n.d. | n.d. |

EXAMPLE 68

To a 100 ml glass vial equipped with a Teflon® coated stirbar was added norbornene (4.0 g, 42.4 mmol), monochlorobenzene (35 ml) and triethoxysilylnorbornene (2.8 ml, 10.6 mmol). To this stirred solution at ambient temperature was added catalyst A (0.012 g, 13 μmol), borontrifluoride-etherate (0.015 ml, 117 μmol) and finally diethylzinc (0.195 ml of a 1.0 molar solution in cyclohexane, 195 μmol). The reaction was allowed to run for 18 hours and then methanol was injected to kill the reaction. The polymer was washed with excess methanol and dried. The yield of copolymer was 1.2 g.

EXAMPLES 69–74

To a 100 ml glass vial equipped with a Teflon® coated stirbar was added norbornene (4.0 g, 42.4 mmol), diluent (35 ml) and triethoxysilylnorbornene (2.8 ml, 10.6 mmol). To this stirred solution at ambient temperature was added the catalyst (26 μmol) followed by the second component indicated in the following table. After the stated time the reactions were terminated by diluting the reaction mixtures with excess methylene chloride of dichlorobenzene (to afford a homogeneous solution) and pouring the resulting solution into a large, stirred volume of acetone, filtered, washed with an excess of acetone, and dried overnight in a heated vacuum oven (80° C.) to afford the product.

| Example Number | Catalyst Type | Second Component (Type, Micromoles) | Diluent (Type, ml) | Time (hr) | Yield (g) | $M_w$ |
|---|---|---|---|---|---|---|
| 69 | F | $B(C_6F_5)_3$, 234 | toluene, 35 | 22 | 4 | 732,600 |
| 70 | G | $AgSbF_6$, 30 | dichloroethane, 35 | 1 | 1.2 | |
| 71 | G | $B(C_6F_5)_3$, 117 | dichloroethane, 35 | 1 | 4.3 | |
| 72 | G | $B(C_6F_5)_3$, 117 | methylene chloride, 35 | 3 | 3.0 | |
| 73 | Nickel ethylhexanoate | $B(C_6F_5)_3$, 234 | cyclohexane, 35 | 18 | 1.9 | |
| 74 | Nickel ethylhexanoate | $B(C_6F_5)_3$, 234 | dichloroethane, 35 | 18 | 4.3 | |

EXAMPLE 75

To a 100 ml glass vial equipped with a Teflon® coated stirbar was added norbornene (4.6 g, 48.8 mmol), dichloroethane (40 ml) and triethoxysilylnorbornene (1.12 ml, 4.24 mmol). To this stirred solution at ambient temperature was added catalyst H (13 μmol) in dichloroethane (2 ml), borontrifluoride-etherate (0.015 ml, 117 μmol) and finally triethylaluminum (0.077 ml of a 1.7 molar solution in cyclohexane, 130 μmol). The reaction was allowed to run for 48 hours and then methanol was injected to kill the reaction. The polymer was washed with excess acetone and dried. The yield of copolymer was 0.8 g.

EXAMPLE 76

To a 100 ml glass vial equipped with a Teflon® coated stirbar was added norbornene (4.0 g, 42.4 mmol), methylene chloride (40 ml) and triethoxysilylnorbornene (2.8 ml, 10.6 mmol). To this stirred solution at ambient temperature was added catalyst I (26 μmol). The reaction was allowed to run for 18 hours and then methanol was injected to kill the reaction. The polymer was washed with excess methanol and dried. The yield of copolymer was 6.7 g.

EXAMPLES 77–78

To a 100 ml glass vial equipped with a Teflon® coated stirbar was added norbornene (4.0 g, 42.4 mmol), cyclohexane (35 ml), triethoxysilylnorbornene (2.8 ml, 10.6 mmol) and hydrogen (in Example 77, 10 psig over-pressure, in Example 78, the solution was first saturated with hydrogen and then 10 psig over pressure was applied). To this stirred solution at ambient temperature was added nickel ethylhexanoate (0.02 ml of an 8% w nickel solution in mineral spirits, 26 μmol) and a mixture of tris(pentafluorophenyl)boron (234 μmol in petroleum naphtha) and triethylaluminum (0.16 ml of a 1.7 molar solution in cyclohexane, 260 μmol). The reaction was allowed to run for 2 hours (Example 77) or 18 hours (Example 78) the reaction was terminated by pouring the resulting solution into a large, stirred volume of methanol, filtered, washed with an excess of methanol, and dried overnight in a heated vacuum oven (80° C.) to afford the product. The yields of copolymer were 2.5 g (Example 77) and 4.6 g (Example 78).

EXAMPLE 79

To a 250 ml round-bottomed flask equipped with a Teflon® coated stirbar was added norbornene (18.4 g, 195 mmol), monochlorobenzene (100 ml) and triethoxysilylnorbornene (4.44 ml, 16.9 mmol). To this stirred solution at ambient temperature was added catalyst A (0.085 g, 52 μmol), borontrifluoride-etherate (0.06 ml, 468 μmol) and finally triethylaluminum (0.31 ml of a 1.7 molar solution in cyclohexane, 520 μmol).

After 60 minutes the reaction mixture was diluted with toluene (300 ml) and then precipitated in an excess of acetone and filtered. The polymer was then washed with an excess of glacial acetic acid and then acetone and dried overnight in a heated vacuum oven (120° C.) to afford the product (21.2 g, 94%). GPC analysis showed the copolymer to have a molecular weight ($M_w$) of 690,560 ($M_n$ 156,330). The proton NMR data indicated that the polymer contained approximately 7.8% triethoxysilylnorbornene.

Adhesion to gold

Three commercial high performance polymers, Pryalin 2540 polyimide (DuPont), Ultradel 7501 polyimide (Amoco) and Cyclotene CY3022-57 BCB (Dow Chemical Company) were compared to the polymer prepared in the present example for adhesion to gold. Spin coated substrates of each polymer were prepared as follows:

Silicon wafers were sputtered with an adhesion layer of titanium. To the titanium layer a layer of approximately 2400 Å of gold was sputtered to give a gold covered substrate. The gold substrates were stored in a cleanroom dry box until needed.

Polyimide (Pyralin 2540)

An amino functional silane adhesion promoter solution (VM-651 available from DuPont) was prepared by mixing 3 drops of the VM-651 in 100 ml of deionized water. Three ml of the solution was placed in one of the gold substrates prepared above and spun at 5,000 rpm for 30 seconds. A 3 ml solution of the polyimide (15 wt. % in n-methyl pyrrolidone solvent, 4000 to 7000 cp) was placed on the adhesion promoter coated substrate and spun at 4,800 rpm for 30 sec. The coated substrate was then soft baked for 30 minutes at 120° C. in air. The polyimide coated substrate was then placed in a nitrogen purged furnace and cured according to the following schedule:

a. 2° C./min. to 200° C., hold for 1 hour
b. 2° C./min. to 365° C., hold for 1 hour
c. Cool to 25° C.

Polyimide (Ultradel 7501)

An amino functional silane (A/B 2000 available from Amoco) was prepared by mixing 5 ml of 3-aminopropyl triethoxysilane with 750 ml of xylene. After 24 hours 1 to 3 ml of the adhesion promoter was placed on a gold substrate prepared above. The substrate was then spun at 4,000 rpm for 30 sec. The coated substrate was baked on a hot plate at 100° C. for 30 sec. Three ml of a solution of the polyimide (12 wt. % in γ-butyrolactone solvent) and spun at 2,700 rpm for 60 seconds. The polymer coated substrate was soft baked on a hot plate at 100° C. for 10 minutes. The polymer coated substrate was exposed to UV light, baked on a hot plate at 100° C. for 10 minutes and developed using ULTRADEL B 760D developer. The polymer coated substrate was then placed in a nitrogen purged furnace and cured as follows:

a. 5° C./min. to 80° C., hold for 1 hour
b. 5° C./min. to 160° C., hold for 1 hour
c. 5° C./min. to 200° C., hold for 1 hour
d. 5° C./min. to 300° C., hold for 1 hour
e. Cool to 25° C.

BCB (Cyclotene CY3022-57)

Three ml of a solution of the BCB (55 wt. % in mesitylene, 259 cp solvent) was placed on a gold substrate prepared above. The substrate was then spun at 1,500 rpm for 30 seconds. The polymer coated substrate was placed in a nitrogen purged furnace and cured according to the following schedule:

a. 5° C./min. to 250° C.
b. Cool to 25° C.

Five ml of a solution of the present polymer (9.9 wt. % in mesitylene) was placed on a gold substrate prepared above. The substrate was spun at 1,500 rpm for 30 seconds. The coated substrate was then placed in a nitrogen purged furnace and cured at 5° C./min. to 250° C. and held for 1 hour. The cured substrated was then allowed to cool to 25° C.

The thickness of each film was measured and recorded. Each of the coated substrates were subjected to the tape test. The coated substrates were also subjected to a peel test. In this test the coated substrates are scribed in order to create an edge where the film could be peeled from the substrate surface. If the film could not be removed, it was noted as a "pass". If any polymer was removed, the sample was noted as "fail". Results are reported below:

| Polymer | Film Thickness (μm) | Tape Test | Peel Test |
|---|---|---|---|
| Polyimide - 2540 | 4.202 ± 0.059 | Fail | Fail |
| Polyimide - 7501 | 4.667 ± 0.027 | Pass | Fail |
| BCB - | 5.332 ± 0.052 | Fail | Fail |
| Polymer of the invention | 3.213 ± 0.032 | Pass | Pass |

EXAMPLE 80

To a 1 L round-bottomed flask equipped with a Teflon® coated stirbar was added norbornene (91.94 g, 977 mmol), dichloroethane (350 ml) and triethoxysilylnorbornene (22.24 ml, 85 mmol). To this stirred solution at ambient temperature was added catalyst A (0.40 g, 260 μmol) premixed with borontrifluoride-etherate (0.30 ml, 2.34 mmol) and finally triethylaluminum (1.54 ml of a 1.7 molar solution in cyclohexane, 2.60 mmol).

After 60 minutes the reaction was terminated using methanol (5 ml). The polymer was divided into several portions to allow a variety of different work-up procedures to be evaluated. First the slurry was poured into methanol, filtered and washed with excess methanol and dried to allow the NMR and GPC data to be measured. GPC analysis showed the copolymer to have a molecular weight ($M_w$) of 828,000 ($M_n$ 168,600). The proton NMR data indicated that the polymer contained approximately 8.3% triethoxysilylnorbornene. The polymer was divided into several portions and redissolved in toluene. One portion of this solution was simply reprecipitated into an excess of ethanol and filtered. Two other toluene solutions were first filtered through microfilters prior to reprecipitation, while the final samples were filtered through various grades of alumina.

Polymer solutions (12.3 wt. % in mesitylene) were spin coated (1,250 rpm, cured film thickness 6.5 μm) onto gold, copper, and aluminum substrates. The polymer solutions contained 250 ppm and 55 ppm of residual Al and Ni (as measured by x-ray fluorescence). The polymer passed the tape test. The polymer treated gold and copper substrates were exposed to boiling water for 1.5 hours without delamination (passed the tape test). Refractive index 1.516 (TE mode), Δn=0.0005. Permittively 2.5.

Two film samples were prepared from the polymer sample cast from the above mesitylene solution onto glass plates. One film sample was dried at 250° C. and the other at 300° C. Each film was exposed to various solvents and photolithographic solutions and evaluated for crazing, i.e., stress cracks induced from solvent sorption. The film dried at 250° C. did not craze in acetone, methanol, isopropanol, aqueous base (pH 14), 2% HCl, 15% HCl, PAN etching solution, or dilute ammonium hydroxide solution. The film dried at 300° C. did not craze in acetone, methanol, isopropanol, or dilute hydrogen fluoride solution.

A second sample of the polymer was reprecipitated from toluene. Solutions of the precipitated polymer were prepared (9.3 wt. %) in chlorobenzene) and spin coated onto aluminum, gold, and silver substrates (1,800 rpm, cured film thickness was 2.2 μm). The polymer solution had a residual aluminum and nickel content of 33 ppm and 4 ppm, respectively (determined by x-ray fluorescence). The polymer film passed the tape test for all substrates. Refractive index 1.518 (TE mode), Δn=0.0008. Permittivity 2.5.

A third sample of the polymer was twice reprecipated from toluene. Solutions of the twice reprecipitated polymer were prepared (9.7 wt. % in chlorobenzene) and spin coated onto aluminum, silver, and gold substrates (700 rpm, cured film thickness 4.3 μm). The polymer solution contained residual aluminum and nickel of 35 ppm and 7 ppm, respectively (determined by x-ray fluorescence). All coated substrates passed the tape test. Refractive index 1.518 (TE mode), Δn=0.0008. Permittivity 2.5.

A fourth sample of the polymer was acid washed in acetic acid. Solutions of the polymer were prepared in chlorobenzene (10.9 wt. %) and mesitylene (10.0 wt. %). The solutions were each spin coated onto aluminum, silver, gold, and copper substrates (chlorobenzene solution spun at 1,250 rpm, cured film thickness of 3.1 μm, mesitylene solution spun at 1,000 rpm, cured film thickness of 2.1 μm). The film prepared from the mesitylene solution appeared to have a better surface uniformly than the film prepared from the chlorobenzene solution. The polymer solutions contained 33 ppm and 4 ppm of residual aluminum and nickel, respectively. All of the coated substrates passed the tape test. Refractive index 1.516 (TE mode), Δn=0.0030. Permittivity 2.5.

EXAMPLE 81

To a 100 ml glass vial equipped with a Teflon® coated stirbar was added norbornene (4.7 g, 49.8 mmol), dichloroethane (30 ml) and triethoxysilylnorbornene (0.7 ml, 2.66 mmol). To this stirred solution at ambient temperature was added the catalyst (an equimolar mixture of nickel ethylhexanoate and dimethylaniliniumtetrakis (pentafluorophenyl)borate (13 μmol)) followed by triethylaluminum (650 μmol, neat). After 60 minutes the reaction was terminated by adding methanol, the polymer was then filtered, washed with an excess of methanol, and dried overnight in a heated vacuum oven (80° C.) to afford the product (1.15 g). The proton NMR data indicated that the polymer contained approximately 3% triethoxysilylnorbornene. The refractive index was measured to be 1.52 (TE mode).

EXAMPLE 82

To a 100 ml glass vial equipped with a Teflon® coated stirbar was added norbornene (4.7 g, 49.8 mmol), dichloroethane (40 ml) and triethoxysilylnorbornene (0.7 ml, 2.66 mmol). To this stirred solution at ambient temperature was added catalyst A (0.012 g, 13 μmol), borontrifluorideetherate (0.15 ml, 1.17 mmol) and finally triethylaluminum (0.077 ml of a 1.7 molar solution in cyclohexane, 130 μmol).

After 60 minutes the polymer slurry was diluted with chlorobenzene (100 ml), the resulting solution filtered and reprecipitated into an excess of methanol. The resulting copolymer was washed with excess methanol and dried overnight in a heated vacuum oven (80° C.) to afford the product (4.0 g). GPC analysis showed the copolymer to have a molecular weight ($M_w$) of 470,000 ($M_n$ 184,400).

Polymer solutions (12.8 wt. % in chlorobenzene) were spin coated (800 rpm, cured film thickness of 5.4 μm) onto gold, aluminum, and silicon dioxide substrates. The polymer passed the tape test on all substrates. The polymer could not be removed from any of the substrates after the termal shock test in boiling water (1.5 mins. exposure) followed by liquid nitrogen (2 mins. exposure). Permittivity 2.4. Refractive index 1.516 (TE mode), Δn=0.0012.

EXAMPLE 83

To a dry 100 ml glass vial containing a magnetic stirrer and a mixture of norbornene (4.49 g, 0.0478 mol), and triethoxysilyl norbornene (1.39 ml, 0.00531 mol) was added cyclohexane (50 ml) followed by nickel ethylhexanoate (0.013 mmol), tris-pentafluorophenyl boron (0.117 mmol) and triethylaluminum (0.130 mmol) under argon atmosphere. The reaction was allowed to stir for 15 hours at room temperature after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 3.8 g. The polymer was further characterized using GPC to obtain molecular weight information and using $^1$H-NMR for the copolymer composition. These results are provided in Table 1.

EXAMPLE 84

To a dry 100 ml glass vial containing a magnetic stirrer and a mixture of norbornene (8.49 g, 0.090 mol), and triethoxysilyl norbornene (5.56 ml, 0.0159 mol) was added cyclohexane (75 ml) followed by nickel ethylhexanoate (0.026 mmol), tris-pentafluorophenyl boron (0.234 mmol) and triethylaluminum (0.260 mmol) under argon atmosphere. The reaction was allowed to stir for 15 hours at room temperature after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 6.8 g. The polymer was further characterized using GPC to obtain molecular weight information and using $^1$H-NMR for the copolymer composition. These results are provided in Table 1.

EXAMPLE 85

To a dry 100 ml glass vial containing a magnetic stirrer and a mixture of norbornene (7.99 g, 0.0848 mol), and triethoxysilyl norbornene (5.6 ml, 0.0212 mol) was added cyclohexane (75 ml) followed by nickel ethylhexanoate (0.026 mmol), tris-pentafluorophenyl boron (0.234 mmol) and triethylaluminum (0.260 mmol) under argon atmosphere. The reaction was allowed to stir for 15 hours at room temperature after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 6.3 g. The polymer was further characterized using GPC to obtain molecular weight information and using $^1$H-NMR for the copolymer composition. These results are provided in Table 1.

EXAMPLE 86

To a dry 100 ml glass vial containing a magnetic stirrer and a mixture of norbornene (7.49 g, 0.0796 mol), and triethoxysilyl norbornene (6.95 ml, 0.0265 mol) was added cyclohexane (75 ml) followed by nickel ethylhexanoate (0.026 mmol), tris-pentafluorophenyl boron (0.234 mmol) and triethylaluminum (0.260 mmol) under argon atmosphere. The reaction was allowed to stir for 15 hours at room temperature after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 4.5 g. The polymer was further characterized using GPC to obtain molecular weight information and using $^1$H-NMR for the copolymer composition. These results are provided in Table 1.

EXAMPLE 87

To a dry 100 ml glass vial containing a magnetic stirrer and a mixture of norbornene (3.99 g, 0.0424 mol ), 1-hexene (0.18 g, 2.12 mmol) and triethoxysilyl norbornene (2.78 ml, 0.0106 mol) was added cyclohexane (75 ml) followed by nickel ethylhexanoate (0.013 mmol), tris-pentafluorophenyl boron (0.117 mmol) and triethylaluminum (0.130 mmol) under argon atmosphere. The reaction was allowed to stir for 15 hours at room temperature after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 2.9 g. The polymer was further characterized using GPC to obtain molecular weight information and using $^1$H-NMR for the copolymer composition. These results are provided in Table 1.

EXAMPLE 88

To a dry 100 ml glass vial containing a magnetic stirrer and a mixture of norbornene (3.99 g, 0.0424 mol), 1-hexene (0.18 g, 2.12 mmol) and triethoxysilyl norbornene (2.78 ml, 0.0106 mol) was added cyclohexane (75 ml) followed by nickel ethylhexanoate (0.026 mmol), tris-pentafluorophenyl boron (0.234 mmol) and triethylaluminum (0.260 mmol) under argon atmosphere. The reaction was allowed to stir for 15 hours at room temperature after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 5.4 g. The polymer was further characterized using GPC to obtain molecular weight information and using $^1$H-NMR for the copolymer composition. These results are provided in Table 1.

TABLE 1

| Example Number | Moles Added (%) NB | Moles Added (%) TESNB | Moles Found in Polymer (%) From $^1$H-NMR TESNB | GPC molecular weight (g/mole) at 25° C. chlorobenzene $M_n$ (1000) | GPC molecular weight (g/mole) at 25° C. chlorobenzene $M_w$ (1000) | Polydispersity |
|---|---|---|---|---|---|---|
| 83 | 90 | 10 | 10.4 | 344 | 1177 | 3.4 |
| 84 | 85 | 15 | 14.9 | 185 | 1173 | 6.3 |
| 85 | 80 | 20 | 18.8 | 265 | 1164 | 4.3 |
| 86 | 75 | 25 | 22.4 | 456 | 1205 | 2.6 |
| 87 | 80 | 20 | 18.0 | 391 | 1204 | 3.0 |
| 88 | 80 | 20 | 18.5 | 148 | 478 | 3.2 |

Dilute solutions (10% in chloroform) of the polymers of Examples 83 through 88 chloroform were cast onto glass plates and allowed to dry slowly at room temperature for 15 hours. The cast polymer films (100 to 200 µm thick) were then removed from the glass plate and heated to 180° C. for 1 hour followed by heating the films to 300° C. by increasing the temperature by 5° C./min. The 300° C. temperature was maintained for 1 hour in a nitrogen atmosphere for complete removal of solvent. The films were then cooled to room temperature and samples were then cut for Dynamic Mechanical Analysis (DMA).

Examples 87 and 88 demonstrate the effect of controlling the molecular weight of the polymer using 1-hexene as a chain transfer agent. It can be clearly observed that under the same reaction conditions, increase in the concentration of the catalyst in combination with 1-hexene, results in a decrease in the molecular weight of the polymer formed. Also the yield of the polymer obtained has been observed to be higher with a decrease in the monomer/catalyst ratio as observed in Examples 87 and 88.

Figure 5:
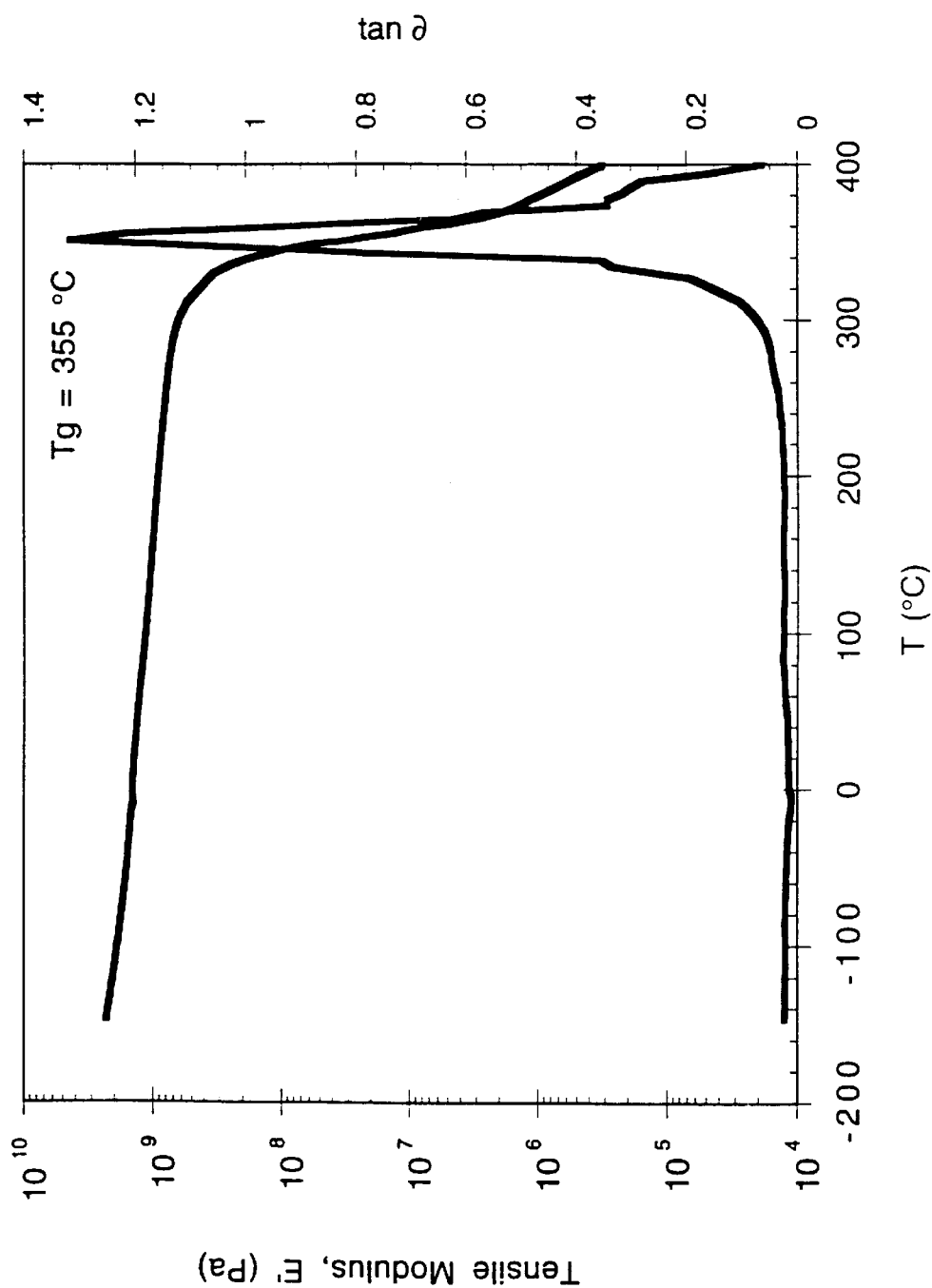
FIG. 5 is a dynamic mechanical analysis plot illustrating the $T_g$ of a silyl functional polymer of the invention.

Dynamic mechanical analysis was performed on the above polymers using a Rheometrics solid analyzer (RSA II) at a temperature range from −150° C. to 400° C. (heating rate of 2° C./min) at a constant frequency of 1 Hz under nitrogen atmosphere. A single glass temperature transition at around 355° C. was observed for each of the examples according to the peak in the tan $\partial$ and was observed to be independent of the silane amount. The glassy modulus for the samples were observed to range from 2 to 3 GPa. FIG. 5 illustrates the DMA plot for the polymer of Example 85.

EXAMPLE 89

To a dry 100 ml glass vial containing a magnetic stirrer and a mixture of norbornene (3.99 g, 0.0424 mol ), 1-hexene (0.134 g, 1.54 mmol) and triethoxysilyl norbornene (2.78 ml, 0.0106 mol) was added cyclohexane (75 ml) followed by nickel ethylhexanoate (0.026 mmol), tris-pentafluorophenyl boron (0.234 mmol) and triethylaluminum (0.260 mmol) under argon atmosphere. The reaction was allowed to stir for 15 hours at room temperature after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 6.1 g. The polymer was further characterized using GPC to obtain molecular weight information, Mn=156,000, Mw=641,000 with a polydispersity of 4.1.

Polymer films of the polymer samples have a permittivity of 2.59±0.08.

EXAMPLE 90

To a dry 100 ml glass vial containing a magnetic stirrer and a mixture of norbornene (11.99 g, 0.1273 mol ), 1-hexene (0.804 g, 9.56 mmol) and triethoxysilyl norbornene (8.4 ml, 0.0318 mol) was added cyclohexane (175 ml) followed by nickel ethylhexanoate (0.078 mmol), tris-pentafluorophenyl boron (0.702 mmol) and triethylaluminum (0.780 mmol) under argon atmosphere. The reaction was allowed to stir for 15 hours at room temperature after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 11.2 g. The polymer was further characterized using GPC to obtain molecular weight information, $M_n$=45,000, $M_w$=273,000 with a polydispersity of 5.9.

Moisture absorption was measured by creating capacitor structures on a substrate (Diagram 1, Step 6 hereinabove) and measuring the capacitance immediately after a bake at 150° C. under nitrogen. The capacitance values were again measured after 12 hours and 1 month after storage at 25° C. and 45% relative humidity. After 1 month capacitance values only changed 0.6±0.3%. Since the dielectric constant of this polymer was measured at 2.6 and the dielectric constant of water is approximately 78, a 1% change in capacitance corresponds to 0.013 wt. % moisture absorption. Polyimides typically ranged from 0.5 to 3 wt. % moisture absorption.

EXAMPLE 91

To a dry 100 ml glass vial containing a magnetic stirrer and a mixture of norbornene (119.6 g, 1.27 mol) and triethoxysilyl norbornene (81.6 g, 0.3182 mol) was added methylene chloride (1000 ml) followed by catalyst A (1.199 g, 1.2 mmol), borontrifluoride-etherate (0.90 ml, 6.99 mmol) and triethylaluminum (4.78 ml of a 1.7 molar solution in cyclohexane, 8.0 mmol) under argon atmosphere. The reaction was allowed to stir for 15 hours at room temperature after which it was terminated by injecting 25 ml of ethanol into the solution. The polymer solution was then diluted with cyclohexane and precipitated with excess acetone. The precipitated polymer was filtered, washed with acetone, and dried overnight under vacuum. Polymer yield was found to be 124.1 g (62% conversion). The polymer was further characterized using GPC to obtain molecular weight information, $M_n$=65,000, $M_w$=306,000 with a polydispersity of 4.6.

EXAMPLE 92

To a dry 5 L glass reactor containing a magnetic stirrer and a mixture of norbornene (59.44 g, 0.631 mol), 1-hexene (5.93 ml, 9.56 mmol) and triethoxysilyl norbornene (40.57 g, 0.159 mol) was added cyclohexane (1.1 L) followed by nickel ethylhexanoate (2.6 mmol), tris-pentafluorophenyl boron (27 mmol) and triethylaluminum (19.9 mmol) under argon atmosphere. The reaction was allowed to stir for 15 hours at room temperature after which in order to remove the catalyst 8-hydroxy quinolin (11.0 g) dissolved in 100 ml chloroform was added via syringe and the solution was allowed to stir for 15 hours. The reaction was terminated by injection 5 ml of ethanol into the solution. The polymer solution was then diluted with cyclohexane and filtered through celite and precipitated into excess (10 times by volume of polymer solution) acetone. The precipitated polymer was filtered, washed with acetone, and dried overnight under vacuum. The polymer was redissolved in cyclohexane and reprecipitated into methanol. The precipitated polymer was dried at room temperature under vacuum for 24 hours. Polymer yield was found to be 32 g. The polymer was further characterized using GPC to obtain molecular weight information, $M_n$=156,000, $M_w$=434,000 with a polydispersity of 2.8. The residual nickel and aluminum in the polymer was analyzed using atomic absorption spectroscopy and these were observed to be as follows:

| Metals Analyzed | Amount of Metal Before Treatment (ppm) | Amount of Metal After 8-Hydroxyquinoline Treatment (ppm) |
|---|---|---|
| Nickel | 320 | 2.6 |
| Aluminum | 2217 | 35 |

The dried polymer (32 g) was dissolved in 400 ml of mestylene, and filtered through 0.5$\mu$ millipore filter capsules and later through 0.2$\mu$ filter.

A polymer solution (8 wt. % in mesitylene) was prepared and spin coated onto silicon dioxide wafers (1,000 rpm, cured thickness of 2.65 $\mu$m and 2,000 rpm, cured thickness of 1.47 $\mu$m). The substrates were cured at 250° C. and 300° C. After curing the coated substrates at 250° C. for 1 hour in a nitrogen purged furnace the permittivity was measured to be 2.57±0.03 and the loss is 0.001±0.001. The permittivity for the 300° C. cured substrates (1 hour in a nitrogen pured furnace) was 2.60±0.04 and the less 0.002±0.002. The refractive index was measured at 1.505±0.0001 (TE mode)

and Δn of 0.0031±0.0001 indicating extremely low birefringence and hence good uniformity. The best of the polyimides exhibit birefringence values on the order of 0.080 under similar conditions (Colburn et al., *J. Polym. Sci. B.*, 32, 1271 (1994)).

The above described polymer solution was also used to coat aluminum, gold, silver, and copper substrates.

Polymer adhesion to aluminum was measured as excellent using the tape test for films cured at 250° and 300° C., both with polymer spun on top of aluminum and aluminum sputtered onto the polymer. Even after 2 hours in boiling water, there was no evidence of any delamination and all samples again passed the tape test. These samples also survived a thermal shock test by exposing the polymer/aluminum substrates to boiling water for 1 minute, then immediately placing them in liquid nitrogen for 1 minute and repeating this cycle 10 times. No delamination occurred and all thermally shocked samples passed the tape test.

Adhesion of the polymer to gold substrates was measured to be excellent using the tape test for films cured at 250°, 300°, 350°, and 400° C. Gold sputtered coated onto polymer films cured at 250° and 300° C. also survived the tape test. Polymer films spun onto gold immediately after the sputtering process survived exposure to 2 hours of boiling water without delamination and passed the tape test. There is no reported example of polyimide or benzocyclobutene maintaining adhesion to gold following exposure to boiling water.

Adhesion of this polymer to silver was excellent (passed the tape test for films cured at 350° C.) and continued to pass the tape test even after 1 hour in boiling water.

Adhesion to copper was determined after cleaning sputtered copper with a 10% sulfuric acid solution for 1 minute, then rinsing for 1 minute with deionized water. The copper was then dried with a dry nitrogen stream and the polymer was spin coated thereon. The sample was then cured at 300° C. for 1 hour. The film passed the tape test, and continued to pass the tape test after exposure to boiling water for 2 hours.

Films spun from the mesitylene solution and dried at 250° and 300° C. did not craze in acetone, methanol, isopropanol, developer (aqueous base, pH=14), 2% HCl, 15% HCl, PAN etch, hydrofluoric acid solution (dilute), and ammonium hydroxide solution (dilute).

Excellent crosslinking was observed for films treated at 300° C. and above. Free standing films cured at 300° C. would not re-dissolve in solvent. Multi-layer processing depends on cure temperature of first layer. The deposition of subsequent layers having a thickness approaching that of the underlying layer appears to be related to the crosslink density of the underlying layer.

| Curing Temperature of First Layer | Thickness (layer 1) | Thickness (layer 1 + 2) | (layer 1 + 2)/ (layer 1) |
|---|---|---|---|
| RT (approx. 25° C.) | 3.04 μm | 3.4 μm | 1.12 |
| 100° C., hot plate | 1.99 μm | 2.93 μm | 1.47 |
| 150° C., hot plate | 1.25 μm | 2.36 μm | 1.89 |
| 300° C., $N_2$ | 3.04 μm | 5.97 μm | 1.96 |

Perfect layer additivity would give 2× total thickness, and this is closest for the 300° C. cure under nitrogen.

EXAMPLE 93

To a dry 5 L glass reactor containing a stirring paddle, a mixture of norbornene (147 g, 2.03 mol), and triethoxysilyl norbornene (35.5 ml, 0.128 mol) was added dichloroethane (1300 ml) followed by catalyst A (0.65 g, 1.2 mmol), borontrifluoride-etherate (0.63 ml, 4.9 mmol) and triethylaluminum (3.2 ml of a 1.7 molar solution in cyclohexane, 8.0 mmol) under argon atmosphere. The reaction was allowed to stir for 3 hours at room temperature after which it was terminated by injecting 25 ml of ethanol into the solution. The polymer solution was then diluted with cyclohexane and precipitated with excess acetone. The precipitated polymer was filtered, washed with acetone, and dried overnight under vacuum. Polymer yield was found to be 133.8 g (75% conversion). The polymer was further characterized using GPC to obtain molecular weight information, $M_w$=550,000.

A solution of the polymer (12.5 wt. % in mesitylene, 50 cp) was spin coated onto gold (2,000 rpm, cured thickness 1.15 μm), aluminum (2,000 rpm, cured thickness 1.13 μm) and copper 1,000 rpm, cured thickness 1.60 μm). All samples were cured to 250° C. in a furnace under nitrogen atmosphere. Each coated substrate was subjected to photolithography. The measured permittivity values were measured as follows:

| | |
|---|---|
| gold | 2.48 ± 0.03 and loss 0.001 ± 0.0007 |
| aluminum | 2.45 ± 0.06 and loss 0.004 ± 0.0003 |
| copper | 2.50 ± 0.15 and loss 0.002 ± 0.0002 |

EXAMPLE 94

To a dry 100 ml glass vial containing a magnetic stirrer and a mixture of norbornene (3.99 g, 0.0424 mol) triethoxysilyl norbornene (2.78 ml, 0.0106 mol) was added cyclohexane (75 ml) and the solution was stirred at room temperature. To this was added nickel ethylhexanoate (0.026 mmol), tris-pentafluorophenyl boron (0.234 mmol) and triethylaluminum (0.260 mmol) under argon atmosphere. The reaction was allowed to stir for 3 hours, after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 5.0 g. The polymer was further characterized using GPC to obtain molecular weight information and using $^1$H-NMR for the copolymer composition. These results are provided in Table 2.

EXAMPLE 95

To a dry 100 ml glass vial containing a magnetic stirrer and a mixture of norbornene (3.99 g, 0.0424 mol ) triethoxysilyl norbornene (2.78 ml, 0.0106 mol) was added cyclohexane (75 ml) and the solution was heated to 40° C. To this was added nickel ethylhexanoate (0.026 mmol), tris-pentafluorophenyl boron (0.234 mmol) and triethylaluminum (0.260 mmol) under argon atmosphere. The reaction was allowed to stir for 3 hours at 40° C., after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 5.3 g. The polymer was further characterized using GPC to obtain molecular weight information and using $^1$H-NMR for the copolymer composition. These results are provided in Table 2.

EXAMPLE 96

To a dry 100 ml glass vial containing a magnetic stirrer and a mixture of norbornene (3.99 g, 0.0424 mol) triethoxysilyl norbornene (2.78 ml, 0.0106 mol) was added cyclohexane (75 ml) and the solution was heated to 55° C. To this was added nickel ethylhexanoate (0.026 mmol), tris-pentafluorophenyl boron (0.234 mmol) and triethylaluminum (0.260 mmol) under argon atmosphere. The reaction was allowed to stir for 3 hours at 55° C., after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 6.0 g. The polymer was further characterized using GPC to obtain molecular weight information and using $^1$H-NMR for the copolymer composition. These results are provided in Table 2.

EXAMPLE 97

To a dry 100 ml glass vial containing a magnetic stirrer and a mixture of norbornene (3.99 g, 0.0424 mol ) triethoxysilyl norbornene (2.78 ml, 0.0106 mol) was added cyclohexane (75 ml) and the solution was heated to 70° C. To this was added nickel ethylhexanoate (0.026 mmol), tris-pentafluorophenyl boron (0.234 mmol) and triethylaluminum (0.260 mmol) under argon atmosphere. The reaction was allowed to stir for 3 hours at 70° C., after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 6.55 g. The polymer was further characterized using GPC to obtain molecular weight information and using $^1$H-NMR for the copolymer composition. These results are provided in Table 2.

EXAMPLE 98

To a dry 100 ml glass vial containing a magnetic stirrer and a mixture of norbornene (3.99 g, 0.0424 mol ), 1-hexene (0.22 g, 2.65 mmol), triethoxysilyl norbornene (2.78 ml, 0.0106 mol) was added cyclohexane (75 ml) and the solution was heated to 70° C. To this was added nickel ethylhexanoate (0.026 mmol), tris-pentafluorophenyl boron (0.234 mmol) and triethylaluminum (0.260 mmol) under argon atmosphere. The reaction was allowed to stir for 3 hours at 70° C., after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 6.55 g. The polymer was further characterized using GPC to obtain molecular weight information and using $^1$H-NMR for the copolymer composition. These results are provided in Table 2.

In order to prepare polynorbornene copolymer films, samples of polynorbornene/triethoxysilyl norbornene copolymers were dissolved in chloroform and the solutions were filtered through 3 micron filter. The filtered solution was casted on a glass plate and allowed to dry at room temperature for 48 hours. The films were heated for 5 hours at 130° C. in a vacuum oven. The samples were further dried for 1 hour at 300° C. in a hot tube under nitrogen atmosphere. All films were observed to be tough, creasable, and transparent.

TABLE 2

| Example Number | Reaction Temperature | Polymer Yield (%) | Moles Found in Polymer (%) From $^1$H-NMR | GPC Molecular Weight (g/mole) at 25° C. in chlorobenzene | | |
|---|---|---|---|---|---|---|
| | | | | $M_n$ (1000) | $M_w$ (1000) | PD. |
| 94 | 25° C. | 74 | 22.4 | 177 | 761 | 4.2 |
| 95 | 40 | 79 | — | 201 | 731 | 3.6 |
| 96 | 55 | 90 | 23 | 77 | 576 | 7.4 |
| 97 | 70 | 96 | 24 | 75 | 438 | 5.9 |
| 98 | 70 | 80 | 23.4 | 71 | 324 | 4.5 |

The effect of reaction temperature on polymer yield and molecular weight is shown above in Table 2. The data clearly shows that the yield of the reaction is controlled by temperature. Almost quantitative conversion can be obtained at around 70° C.

Thin film stress-strain analyses was performed on the polymers obtained in Examples 95 to 98. Polymer films were cast as in Examples 83 to 88. The stress-strain analyses were conducted on a BFGoodrich Portable Universal Tester™ at a strain rate of 0.1 inches/min. The elongation at break was observed to range from 4 to 10%, and was observed to increase with increasing mole % of triethoxysilyl norbornene in the copolymer as shown in Table 3.

TABLE 3

| Example Number | Mole % of TESNB in copolymer | % Elongation at break |
|---|---|---|
| 95 | 10.5 | 4 |
| 96 | 14.9 | 7 |
| 97 | 18.8 | 8 |
| 98 | 22.4 | 10 |

Coefficient of thermal expansion was measured for the polymers obtained in Examples 95 to 98 in the expansion mode using Perkin Elmer Thermomechanical Analyzer from 50 to 300° C. at a heating rate of 3° C./min. under a nitrogen atmosphere. The coefficient of thermal expansion was observed to be approximately 50±15 ppm/°C.($10^{-6}$/°C.).

EXAMPLE 99

To a dry 100 ml glass vial containing a magnetic stirrer and a mixture of decylnorbornene (11.16 g, 0.0477 mol), and trimethylsilyl norbornene (1.36 g, 0.00531 mol) was added cyclohexane (50 ml) followed by nickel ethylhexanoate (0.026 mmol). The sample was heated to 70° C. at which point, tris-pentafluorophenyl boron (0.234 mmol) and triethylaluminum (0.260 mmol) was added under an argon atmosphere. The reaction was allowed to stir for 24 hours at room temperature after which it was terminated by injecting 5 ml of ethanol into the polymer solution. The polymer solution was then diluted with cyclohexane and precipitated with excess acetone. The precipitated polymer was filtered, washed with acetone, and dried overnight under vacuum. Polymer yield was found to be 10.1 g. The polymer was further characterized using GPC to obtain molecular weight information. The molecular weight of the polymer was found to be 51,800 g/mol ($M_w$) and 1,401,00 g/mole ($M_w$), with a polydispersity of 2.7.

Figure 6:
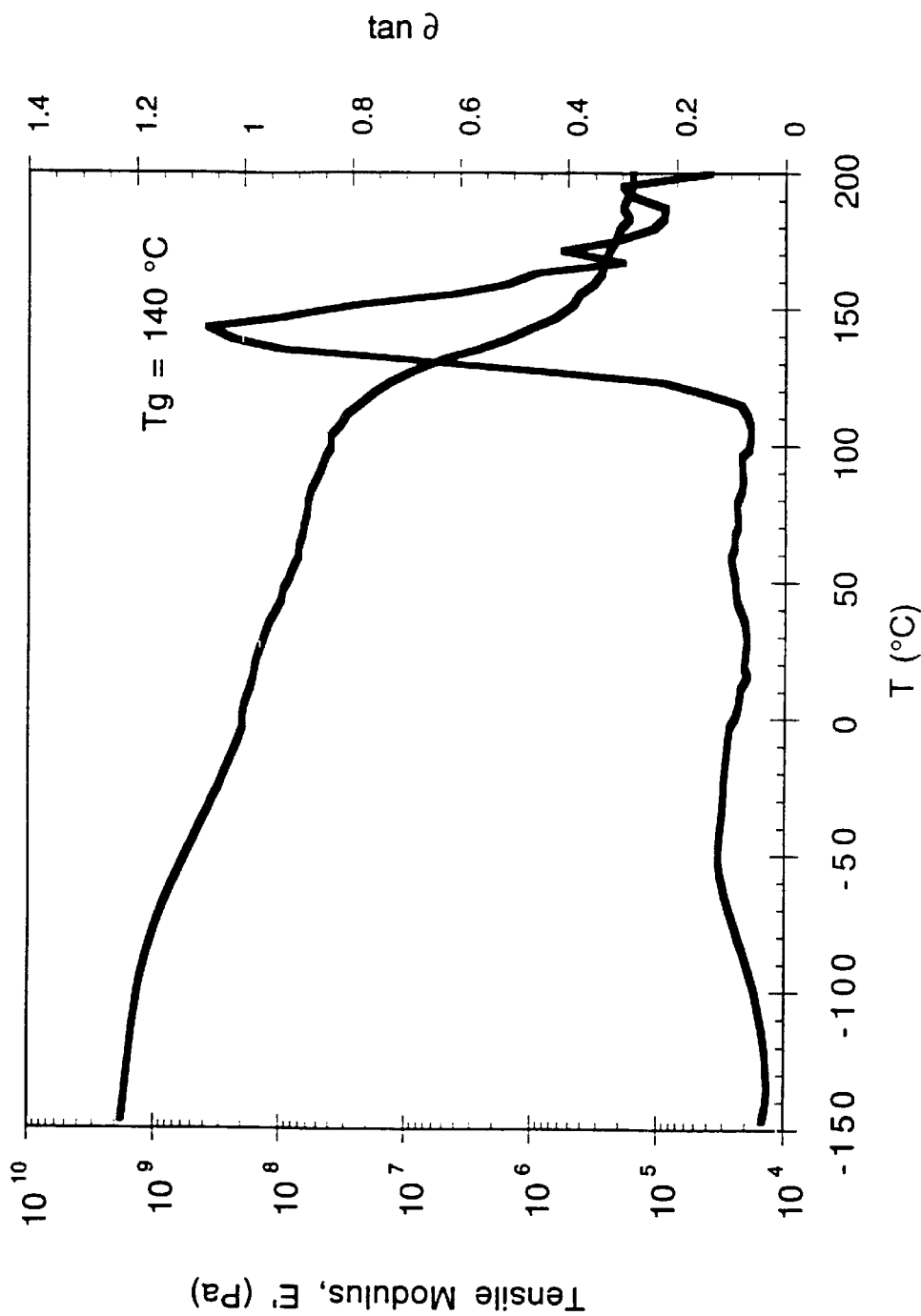
FIG. 6 is a dynamic mechanical analysis plot of a silyl functional polymer of the invention illustrating the effect of long alkyl chains on the $T_g$ of the polymer.

Dynamic mechanical analysis was performed on the polymer using a Rheometrics solid analyzer (RSA II) at a temperature range from –150° C. to 200° C. (heating rate of 2° C./min.) at a constant frequency of 1 Hz under nitrogen atmosphere. Two transitions were observed, a high temperature glass transition at around 140° C. and a low temperature transition at −50° C. The DMA plot for the polymer is shown in FIG. 6. By copolymerizing a polycyclic monomer with a long aliphatic substituent or side chain, the $T_g$ of the polymer can be controlled.

EXAMPLE 100

To a dry 100 ml glass vial containing a magnetic stirrer and a mixture of decylnorbornene (9.923 g, 0.0424 mol ), and trimethylsilyl norbornene (2.8 ml, 0.0106 mol) was added cyclohexane (50 ml) followed by nickel ethylhexanoate (0.026 mmol). The sample was heated to 70° C. at which point, tris-pentafluorophenyl boron (0.234 mmol) and triethylaluminum (0.260 mmol) was added under an argon atmosphere. The reaction was allowed to stir for 12 hours at room temperature after which it was terminated by injecting 5 ml of ethanol into the polymer solution. The polymer solution was then diluted with cyclohexane and precipitated with excess acetone. The precipitated polymer was filtered, washed with acetone and dried overnight under vacuum. Polymer yield was found to be 7.3 g. The polymer was further characterized using GPC to obtain molecular weight information and using $^1$H-NMR for the copolymer composition. The molecular weight of the polymer was found to be 40,000 g/mol ($M_n$) and 109,000 g/mole ($M_w$), with a polydispersity of 2.7.

EXAMPLE 101

This example demonstrates the post reaction of a halide containing silyl functional polymer with a correactive moiety to obtain a modified polymer.

To a dry 100 ml glass vial containing a magnetic stirrer and a mixture of Norbornene (3.99 g, 0.0424 mol ), and trichlorosilyl norbornene (2.4 ml, 0.0106 mol) was added cyclohexane (50 ml) followed by nickel ethylhexanoate (0.026 mmol), tris-pentafluorophenyl boron (0.234 mmol) and triethylaluminum (0.260 mmol) was added under an argon atmosphere. The reaction was allowed to stir for 12 hours at room temperature after which the polymer solution was cannula transferred into a 150 ml round bottom flask containing 3 ml of tetrahydrofuran under nitrogen atmosphere. To the flask was added n-butyl lithium (180 ml, 2.5 mol solution in hexane) dropwise and the solution was stirred for 4 hours under room temperature. The polymer solution was then diluted with cyclohexane and precipitated with excess acetone. The precipitated polymer was filtered, washed with acetone and dried overnight under vacuum. Polymer yield was found to be 5.1 g. The polymer was further characterized using GPC to obtain molecular weight information and using $^1$H-NMR for copolymer composition characterization. The molecular weight of the polymer was found to be 440,000 g/mol ($M_n$) and 1,470,000 g/mole ($M_w$), with a polydispersity of 3.3.

EXAMPLE 102

To a dry 100 ml glass vial containing a magnetic stirrer and a mixture of norbornene (3.99 g, 0.0424 mol), and trichlorosilyl norbornene (2.4 ml, 0.0106 mol) was added cyclohexane (50 ml) followed by nickel ethylhexanoate (0.026 mmol), tris-pentafluorophenyl boron (0.234 mmol) and triethylaluminum (0.260 mmol) was added under an argon atmosphere. The reaction was allowed to stir for 12 hours at room temperature after which the polymer solution was cannula transferred into a 150 ml round bottom flask containing 3 ml of tetrahydrofuran under nitrogen atmosphere. To the flask was added dropwise, phenol (5.5 g in 30 ml of methylene chloride) and pyridine (3 ml), and the solution was stirred for 20 hours under room temperature. The polymer solution was then diluted with cyclohexane and precipitated with excess acetone. The precipitated polymer was filtered, washed with acetone and dried overnight under vacuum. Polymer yield was found to be 3.1 g. The polymer was further characterized using GPC to obtain molecular weight information and using $^1$H-NMR for the presence of aromatic protons. The molecular weight of the polymer was found to be 63,000 g/mol ($M_w$) and 278,000 g/mole ($M_w$), with a polydispersity of 4.3. $^1$H-NMR indicated the presence of the aromatic protons at around 6.8–7 ppm indicating the presence of aromatic groups.

EXAMPLE 103

To a dry 100 ml glass vial containing a magnetic stirrer and a mixture of norbornene (7.99 g, 0.0848 mol), bis(2,2, 6,6-tetramethyl-3,5-heptanedionate) nickel (II) (5.6 mg, 0.013 mmol), and triethoxysilyl norbornene (5.6 ml, 0.0212 mol) was added cyclohexane (75 ml) followed by tris-pentafluorophenyl boron (0.13 mmol, 2.25 ml of 3 wt. % solution in isopar E) under argon atmosphere. The reaction was allowed to stir for 15 hours at room temperature after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 6.6 g. The polymer was further characterized using GPC to obtain molecular weight information, and these results are provided in the table below.

EXAMPLE 104

To a dry 100 ml glass vial containing a magnetic stirrer and a mixture of norbornene (7.99 g, 0.0848 mol), bis(2,2, 6,6-tetramethyl-3,5-heptanedionate) nickel (II) (5.6 mg, 0.013 mmol), and triethoxysilyl norbornene (5.6 ml, 0.0212 mol) was added cyclohexane (75 ml) followed by 1-hexene (0.045 g, 0.53 mmol) and tris-pentafluorophenyl boron (0.13 mmol, 2.25 ml of 3 wt. % solution in isopar E) under argon atmosphere. The reaction was allowed to stir for 15 hours at room temperature after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 4.0 g. The polymer was further characterized using GPC to obtain molecular weight information, and these results are provided in the table below.

EXAMPLE 105

To a dry 100 ml glass vial containing a magnetic stirrer and a mixture of norbornene (7.99 g, 0.0848 mol), bis(2,2, 6,6-tetramethyl-3,5-heptanedionate) nickel (II) (5.6 mg, 0.013 mmol), and triethoxysilyl norbornene (5.6 ml, 0.0212 mol) was added cyclohexane (75 ml) followed by 1-hexene (0.13 g, 1.59 mmol) and tris-pentafluorophenyl boron (0.13 mmol, 2.25 ml of 3 wt. % solution in isopar E) under argon atmosphere. The reaction was allowed to stir for 15 hours at room temperature after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 3.7 g. The polymer was further characterized using GPC to obtain molecular weight information, and these results are provided in the table below.

EXAMPLE 106

To a dry 100 ml glass vial containing a magnetic stirrer and a mixture of norbornene (7.99 g, 0.0848 mol), bis(2,2,6,6-tetramethyl-3,5-heptanedionate) nickel (II) (5.6 mg, 0.013 mmol), and triethoxysilyl norbornene (5.6 ml, 0.0212 mol) was added cyclohexane (75 ml) followed by 1-hexene (0.61 g, 7.3 mmol) and tris-pentafluorophenyl boron (0.13 mmol, 2.25 ml of 3 wt. % solution in isopar E) under argon atmosphere. The reaction was allowed to stir for 15 hours at room temperature after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 3.0 g. The polymer was further characterized using GPC to obtain molecular weight information, and these results are provided in the table below.

EXAMPLE 107

To a dry 100 ml glass vial containing a magnetic stirrer and a mixture of norbornene (7.99 g, 0.0848 mol), bis(2,2,6,6-tetramethyl-3,5-heptanedionate) nickel (II) (5.6 mg, 0.013 mmol), and triethoxysilyl norbornene (5.6 ml, 0.0212 mol) was added cyclohexane (75 ml) followed by tris-pentafluorophenyl boron (0.13 mmol, 0.2 ml of 3 wt. % solution in isopar E) under argon atmosphere. The reaction was allowed to stir for 15 hours at room temperature after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 0.9 g. The polymer was further characterized using GPC to obtain molecular weight information, and these results are provided in the table below.

EXAMPLE 108

To a dry 100 ml glass vial containing a magnetic stirrer and a mixture of norbornene (7.99 g, 0.0848 mol), bis(2,2,6,6-tetramethyl-3,5-heptanedionate) nickel (II) (5.6 mg, 0.013 mmol), and triethoxysilyl norbornene (5.6 ml, 0.0212 mol) was added cyclohexane (75 ml) followed by tris-pentafluorophenyl boron (0.039 mmol, 0.7 ml of 3 wt. % solution in isopar E) under argon atmosphere. The reaction was allowed to stir for 15 hours at room temperature after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 4.5 g. The polymer was further characterized using GPC to obtain molecular weight information, and these results are provided in the table below.

EXAMPLE 109

To a dry 100 ml glass vial containing a magnetic stirrer and a mixture of norbornene (7.99 g, 0.0848 mol), bis(2,2,6,6-tetramethyl-3,5-heptanedionate) nickel (II) (5.6 mg, 0.013 mmol), and triethoxysilyl norbornene (5.6 ml, 0.0212 mol) was added cyclohexane (75 ml) followed by tris-pentafluorophenyl boron (0.078 mmol, 1.35 ml of 3 wt. % solution in isopar E) under argon atmosphere. The reaction was allowed to stir for 15 hours at room temperature after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 5.3 g. The polymer was further characterized using GPC to obtain molecular weight information, and these results are provided in the table below.

EXAMPLE 110

To a dry 100 ml glass vial containing a magnetic stirrer and a mixture of norbornene (7.99 g, 0.0848 mol), bis(2,2,6,6-tetramethyl-3,5-heptanedionate) nickel (II) (11 mg, 0.026 mmol), and triethoxysilyl norbornene (5.6 ml, 0.0212 mol) was added cyclohexane (75 ml) followed by tris-pentafluorophenyl boron (0.26 mmol, 5.5 ml of 3 wt. % solution in isopar E) under argon atmosphere. The reaction was allowed to stir for 15 hours at room temperature after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 6.4 g. The polymer was further characterized using GPC to obtain molecular weight information, and these results are provided in the table below.

EXAMPLE 111

To a dry 100 ml glass vial containing a magnetic stirrer and a mixture of norbornene (7.99 g, 0.0848 mol), bis(2,2,6,6-tetramethyl-3,5-heptanedionate) nickel (II) (7.65 mg, 0.018 mmol), and triethoxysilyl norbornene (5.6 ml, 0.0212 mol) was added cyclohexane (75 ml) followed by tris-pentafluorophenyl boron (0.18 mmol, 3.8 ml of 3 wt. % solution in isopar E) under argon atmosphere. The reaction was allowed to stir for 15 hours at room temperature after which it was terminated by injecting 5 ml of ethanol into the solution. The polymer solution was then diluted with cyclohexane and precipitated with excess acetone. The precipitated polymer was filtered, washed with acetone, and dried overnight under vacuum. Polymer yield was found to be 6.1 g. The polymer was further characterized using GPC to obtain molecular weight information, and these results are provided in the table below.

Examples 103 to 111

| Example | Moles of norbornene | Moles of triethoxysilyl norbornene | Moles of 1-Hexene | Monomer/Ni/B | $M_n \, 10^3$ | $M_w \, 10^3$ | Polydispersity |
|---------|---------------------|-----------------------------------|-------------------|--------------|---------------|---------------|----------------|
| 103 | 80 | 20 | 0 | 4000/1/10 | 650 | 1500 | 2.3 |
| 104 | 80 | 20 | 1 | 4000/1/10 | 470 | 1060 | 2.2 |
| 105 | 80 | 20 | 3 | 4000/1/10 | 275 | 650 | 2.3 |
| 106 | 80 | 20 | 5 | 4000/1/10 | 206 | 505 | 2.4 |
| 107 | 80 | 20 | 0 | 4000/1/1 | 413 | 990 | 2.3 |
| 108 | 80 | 20 | 0 | 4000/1/3 | 473 | 1130 | 2.4 |
| 109 | 80 | 20 | 0 | 4000/1/6 | 441 | 1275 | 2.8 |

-continued

Examples 103 to 111

| Example | Moles of norbornene | Moles of triethoxysilyl norbornene | Moles of 1-Hexene | Monomer/ Ni/B | $M_n\ 10^3$ | $M_w\ 10^3$ | Polydispersity |
|---|---|---|---|---|---|---|---|
| 110 | 80 | 20 | 0 | 2000/1/10 | 245 | 898 | 3.4 |
| 111 | 80 | 20 | 0 | 3000/1/1 | 263 | 920 | 3.4 |

We claim:

1. An addition polymer having a $T_g$ of at least 250° C. comprising polycyclic repeating units wherein at least a portion of said repeating units include a silyl functional group represented by the following formulae:

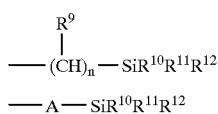

wherein A is a divalent radical selected from the following structures:

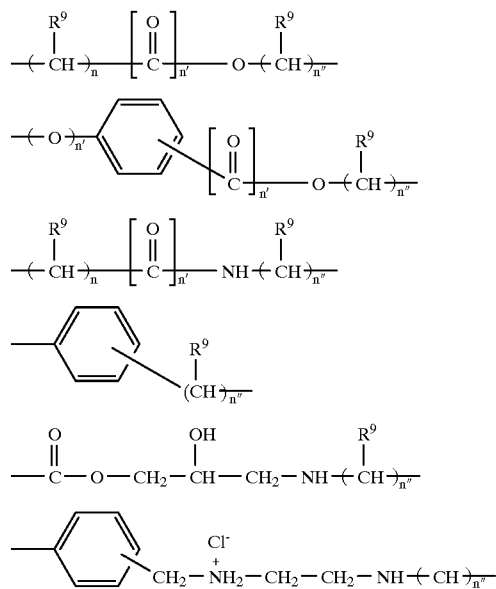

and $R^9$ independently represents hydrogen, methyl, or ethyl; $R^{10}$, $R^{11}$, and $R^{12}$ independently represent halogen, linear or branched ($C_1$ to $C_{20}$) alkyl, linear or branched ($C_1$ to $C_{20}$) alkoxy, linear or branched ($C_1$ to $C_{20}$) alkyl carbonyloxy, ($C_1$ to $C_{20}$) alkyl peroxy, and substituted or unsubstituted ($C_6$ to $C_{20}$) aryloxy; $R^{10}$, $R^{11}$, and $R^{12}$ together with the silicon atom to which they are attached form the group:

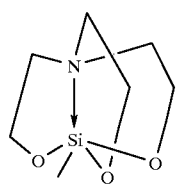

n is a number from 0 to 5; and n' is 0 or 1; and n" is a number from 0 to 10.

2. The addition polymer of claim 1 wherein at least one of $R^{10}$ to $R^{12}$ is a linear or branched ($C_1$ to $C_{10}$) alkoxy group or halogen.

3. The addition polymer of claim 2 wherein $R^{10}$ to $R^{12}$ are the same and are selected from the group consisting of methoxy, ethoxy, propoxy, butoxy, pentoxy, and halogen.

4. The addition polymer of claim 3 wherein $R^{10}$ to $R^{12}$ are each ethoxy or chlorine.

5. The addition polymer of claim 4 wherein said silyl functional group is triethoxysilyl or trichlorosilyl.

6. The addition polymer of claim 1 wherein said repeating units containing said silyl functional groups comprise at least 5 mole % of the polymer.

7. A polycyclic polymer having a $T_g$ of at least 250° C. comprising repeating units formed from:

(a) one or more silyl substituted polycycloolefin monomer(s); or (b) one or more silyl substituted polycycloolefin monomer(s) and one or more hydrocarbyl substituted polycycloolefin monomer(s); or (c) one or more silyl substituted polycycloolefin monomer(s), one or more hydrocarbyl substituted polycycloolefin monomer(s) and at least one acyclic monomer selected from the group consisting of ethyl vinyl ether, isobutylene, styrene, vinyltriethoxysilane, vinyltrimethoxysilane, 1,3-butadiene, 1,2-butadiene, diisobutylene, triisobutylene, tetrafluoroethylene cyclopentene and cyclooctene; or (d) one or more silyl substituted polycycloolefin monomer(s) and at least one acyclic monomer selected from the group consisting of ethyl vinyl ether, isobutylene, styrene, vinyltriethoxysilane, vinyltrimethoxysilane, 1,3-butadiene, 1,2-butadiene, diisobutylene, and triisobutylene, tetrafluoroethylene cyclopentene and cyclooctene; wherein said silyl substituted polycycloolefin(s) and said hydrocarbyl substituted polycycloolefin(s) are represented by the formulae:

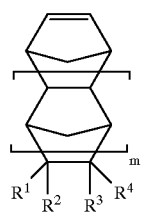 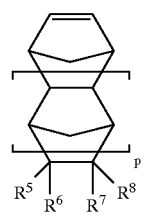

wherein $R^1$ and $R^4$ independently represent hydrogen, linear or branched ($C_1$ to $C_{20}$) alkyl, $R^1$ and $R^4$ when taken together with the two ring carbon atoms to which they are attached form an unsaturated cyclic ring of 4 to 8 carbon atoms or the group:

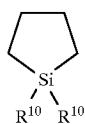

wherein said unsaturated cyclic ring is substituted by at least one of $R^2$ and $R^3$; $R^2$ and $R^3$ independently represent hydrogen, linear or branched ($C_1$ to $C_{20}$) alkyl or the groups:

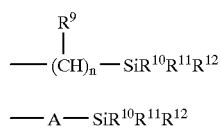

wherein A is a divalent radical selected from the following structures:

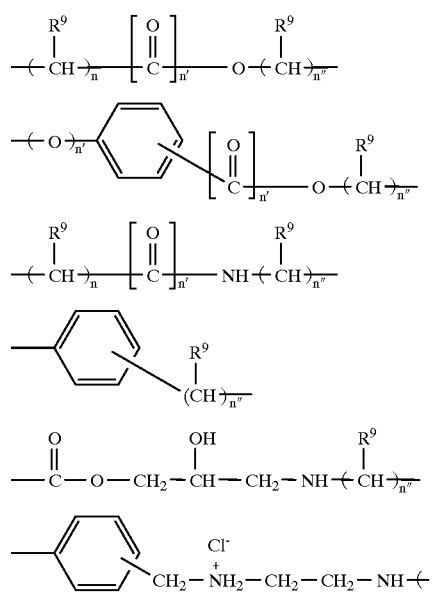

wherein $R^9$ is hydrogen, methyl, or ethyl; $R^{10}$, $R^{11}$, and $R^{12}$ independently represent halogen selected from the group consisting of chlorine, fluorine, bromine and iodine, linear or branched ($C_1$ to $C_{20}$) alkyl, linear or branched ($C_1$ to $C_{20}$) alkoxy, substituted or unsubstituted ($C_6$ to $C_{20}$) aryloxy, linear or branched ($C_1$ to $C_{20}$) alkyl carbonyloxy, ($C_1$ to $C_{20}$) alkyl peroxy, and substituted or unsubstituted ($C_6$ to $C_{20}$) aryloxy; $R^{10}$, $R^{11}$, and $R^{12}$ together with the silicon atom to which they are attached form the group:

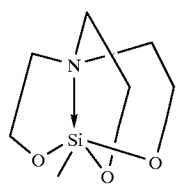

n is a number from 0 to 5; and n' is 0 or 1; and n" is a number from 0 to 10; m and p independently represent a number from 0 to 4; with the proviso that at least one of $R^2$ and $R^3$ is a silyl substituent selected from the group represented by Ia or Ib above, and that when $R^1$ and $R^4$ together form a saturated cyclic group, $R^2$ and $R^3$ cannot both be a silyl substituent at the same time; $R^5$, $R^6$, $R^7$, and $R^8$ independently represent hydrogen, linear and branched ($C_1$ to $C_{20}$) alkyl, hydrocarbyl substituted and unsubstituted ($C_5$ to $C_{12}$) cycloalkyl, ($C_6$ to $C_{40}$) aryl, ($C_7$ to $C_{15}$) aralkyl, ($C_3$ to $C_{20}$) alkynyl, linear and branched ($C_3$ to $C_{20}$) alkenyl, (with the proviso that the alkenyl radical does not contain a terminal double bond) or vinyl; any of $R^5$ and $R^6$ or $R^7$ and $R^8$ can be taken together to form a ($C_1$ to $C_{10}$) alkylidenyl group, $R^5$ and $R^8$ when taken with the two ring carbon atoms to which they are attached can represent saturated and unsaturated cyclic groups containing 4 to 12 carbon atoms or an aromatic ring containing 6 to 17 carbon atoms.

8. The polymer of claim 7 comprising the following repeating unit structure:

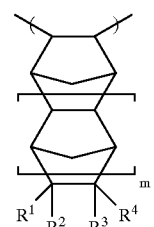

wherein $R^1$ to $R^4$ and m are as previously defined.

9. The polymer of claim 7 comprising the following repeating units:

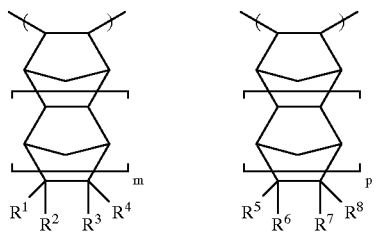

wherein $R^1$ to $R^8$ are as previously defined and m and p independently represent 0,1,2,3, or 4.

10. The polymer of claim 7 comprising the following repeating units:

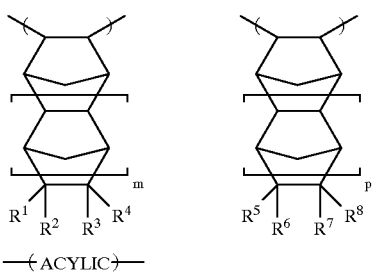

wherein $R^1$ to $R^8$, m, p and the acyclic repeating unit are as previously defined.

11. The polymer of claim 7 comprising the following repeating units:

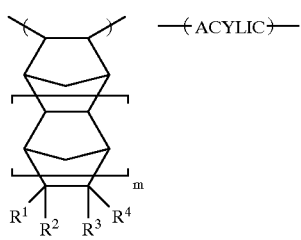

wherein $R^1$ to $R^4$, m and the acyclic repeating unit are as defined above.

12. The polymer of claim 1 or 7 having a $T_g$ ranging from 251 to 400° C.

13. The polymer of claim 8, 9, 10, or 11 wherein at least one of $R^{10}$ to $R^{12}$ is a linear or branched ($C_1$ to $C_{10}$) alkoxy group or halogen.

14. The polymer of claim 13 wherein $R^{10}$ to $R^{12}$ are the same and are selected from the group consisting of methoxy, ethoxy, propoxy, butoxy, pentoxy, and halogen.

15. The polymer of claim 14 wherein $R^{10}$ to $R^{12}$ are each ethoxy or chlorine.

16. The polymer of claim 15 wherein said silyl functional group is triethoxysilyl or trichlorosilyl.

17. The polymer of claim 16 wherein said repeating units containing said silyl functional groups comprise at least 5 mole % of the polymer.

18. A polymer comprising repeat units of the general formula:

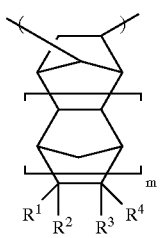

wherein $R^1$ and $R^4$ independently represent hydrogen or linear or branched ($C_1$ to $C_{20}$) alkyl; $R^2$ and $R^3$ independently represent hydrogen, linear or branched ($C_1$ to $C_{20}$) alkyl or the groups:

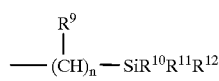     Ia

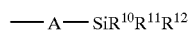     Ib wherein A is a divalent radical selected from the following structures:

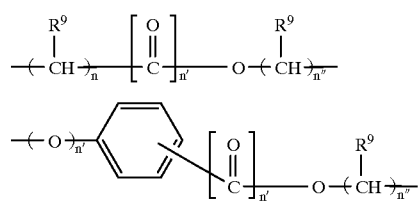

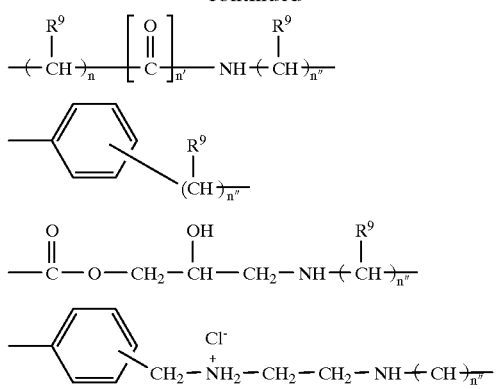

wherein $R^9$ is hydrogen, methyl, or ethyl; $R^{10}$, $R^{11}$, and $R^{12}$ independently represent halogen selected from the group consisting of chlorine, fluorine, bromine and iodine, linear or branched ($C_1$ to $C_{20}$) alkyl, linear or branched ($C_1$ to $C_{20}$) alkoxy, substituted or unsubstituted ($C_6$ to $C_{20}$) aryloxy, linear or branched ($C_1$ to $C_{20}$) alkyl carbonyloxy, ($C_1$ to $C_{20}$) alkyl peroxy, and substituted or unsubstituted ($C_6$ to $C_{20}$) aryloxy; $R^{10}$, $R^{11}$, and $R^{12}$ together with the silicon atom to which they are attached form the group:

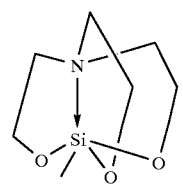

n is a number from 0 to 5, and n' is 0 or 1; and n" is a number from 0 to 10; m and p independently represent a number from 0 to 4; with the proviso that at least one of $R^2$ and $R^3$ is a silyl substituent selected from the group represented by Ia or Ib above, and that when $R^1$ and $R^4$ together form a saturated cyclic group, $R^2$ and $R^3$ cannot both be a silyl substituent at the same time.

19. The polymer of claim 18 further comprising a repeating unit selected from the group of acyclic units, hydrocarbyl substituted polycyclic units, and mixtures thereof wherein said acyclic units are polymerized from the group consisting of ethyl vinyl ether, isobutylene, styrene, vinyltriethoxysilane, vinyltrimethoxysilane, 1,3-butadiene, 1,2-butadiene, diisobutylene, tetrafluoroethylene and triisobutylene, cyclopentene, cyclooctene, and mixtures thereof; and said hydrocarbyl substituted polycyclic unit is represented by the following structure:

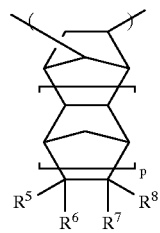

wherein $R^5$ to $R^8$ independently represent hydrogen, linear and branched ($C_1$ to $C_{20}$) alkyl, hydrocarbyl substituted and unsubstituted ($C_5$ to $C_{12}$) cycloalkyl, ($C_6$ to $C_{40}$) aryl, ($C_7$ to $C_{15}$) aralkyl, ($C_3$ to $C_{20}$) alkynyl, linear and branched ($C_3$ to $C_{20}$) alkenyl, (with the proviso that the alkenyl radical does not contain a terminal double bond) or vinyl; any of $R^5$ and $R^6$ or $R^7$ and $R^8$ can be taken together to form a ($C_1$ to $C_{10}$) alkylidenyl group, $R^5$ and $R^8$ when taken with the two ring carbon atoms to which they are attached can represent saturated and unsaturated cyclic groups containing 4 to 12 carbon atoms or an aromatic ring containing 6 to 17 carbon atoms.

20. The polymer of claim 19 wherein at least one of $R^{10}$ to $R^{12}$ is a linear or branched ($C_1$ to $C_{10}$) alkoxy group or halogen.

21. The polymer of claim 20 wherein $R^{10}$ to $R^{12}$ are the same and are selected from the group consisting of methoxy, ethoxy, propoxy, butoxy, pentoxy, and halogen.

22. The polymer of claim 21 wherein $R^{10}$ to $R^{12}$ are each ethoxy or chlorine.

23. The polymer of claim 22 wherein said silyl functional group is triethoxysilyl or trichlorosilyl and said hydrocarbyl substituted polycyclic repeating unit is represented by the following structure:

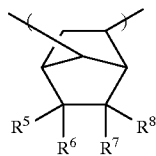

wherein $R^4$ to $R^8$ are as defined above.

24. The polymer of claim 23 wherein $R^5$ to $R^8$ are each hydrogen.

25. The polymer of claim 1, 7, 18, 19, or 23 wherein said polymer is terminated with an olefinic end group represented by the structures:

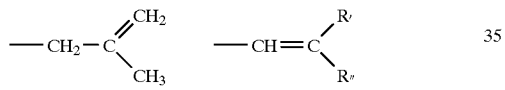

wherein R' and R" independently represent hydrogen, branched or unbranched ($C_1$ to $C_{40}$) alkyl, branched or unbranched ($C_2$ to $C_{40}$) alkenyl, halogen, or the group:

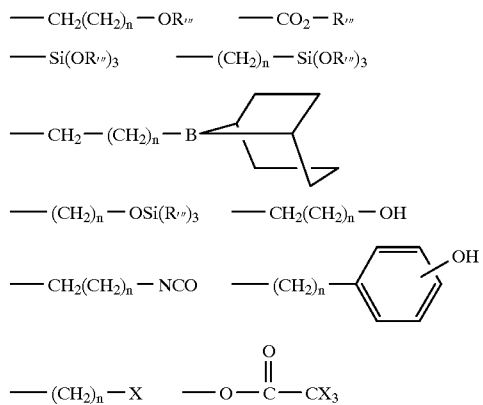

wherein R'" is branched or unbranched ($C_1$ to $C_{10}$), branched or unbranched ($C_3$ to $C_9$) alkenyl, substituted or unsubstituted ($C_6$ to $C_{15}$) aryl wherein said substituents if present are selected from branched or unbranched ($C_1$ to $C_{10}$) alkyl or haloalkyl, and halogen, X is chlorine, fluorine, bromine or iodine, and n is 0 to 20.

26. The polymer of claim 25 wherein R' is hydrogen and R" is hydrogen or a ($C_1$ to $C_{10}$) alkyl group.

27. The polymer of claim 26 wherein R" is selected from the group of methyl, ethyl, propyl, butyl, pentyl, and hexyl.

28. An oligomer comprising 4 to 50 linked repeating units formed from:

(a) one or more silyl substituted polycycloolefin monomer(s); or (b) one or more silyl substituted polycycloolefin monomer(s) and one or more hydrocarbyl substituted polycycloolefin monomer(s); or (c) one or more silyl substituted polycycloolefin monomer(s), one or more hydrocarbyl substituted polycycloolefin monomer(s) and at least one acyclic monomer selected from the group consisting of ethyl vinyl ether, isobutylene, styrene, vinyltriethoxysilane, vinyltrimethoxysilane, 1,3-butadiene, 1,2-butadiene, diisobutylene, triisobutylene, tetrafluoroethylene, cyclopentene, and cyclooctene; or (d) one or more silyl substituted polycycloolefin monomer(s) and at least one acyclic monomer selected from the group consisting of ethyl vinyl ether, isobutylene, styrene, vinyltriethoxysilane, vinyltrimethoxysilane, 1,3-butadiene, 1,2-butadiene, diisobutylene, triisobutylene, tetrafluoroethylene, cyclopentene, and cyclooctene; and (e) an optional compound selected from a compound having a terminal olefinic double bond between adjacent carbon atoms excluding, styrenes, vinyl ethers, and conjugated dienes, and at least one of said adjacent carbon atoms having two hydrogen atoms attached thereto; wherein said silyl substituted polycycloolefin(s) and said hydrocarbyl substituted polycycloolefin(s) are represented by the formulae:

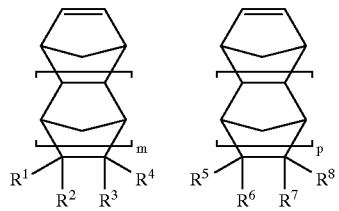

wherein $R^1$ and $R^4$ independently represent hydrogen, linear or branched ($C_1$ to $C_{20}$) alkyl, $R^1$ and $R^4$ when taken together with the two ring carbon atoms to which they are attached form an unsaturated cyclic ring of 4 to 8 carbon atoms or the group:

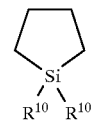

wherein said unsaturated cyclic ring is substituted by at least one of $R^2$ and $R^3$; $R^2$ and $R^3$ independently represent hydrogen, linear or branched ($C_1$ to $C_{20}$) alkyl or the groups:

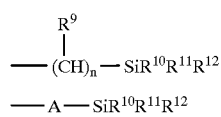

wherein A is a divalent radical selected from the following structures:

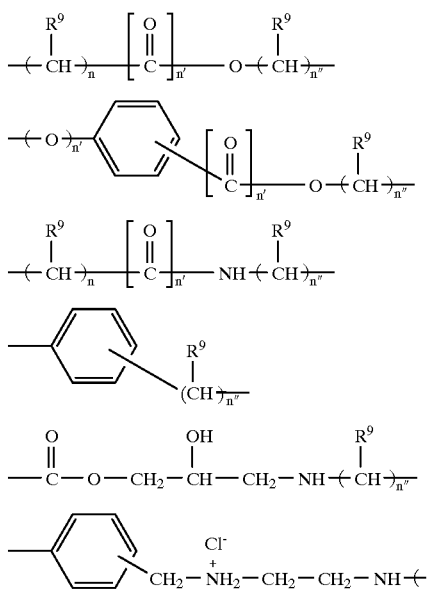

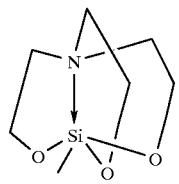

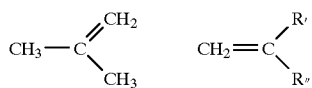

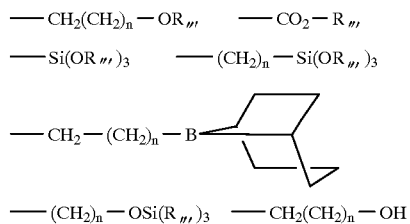

and $R^9$ independently represents hydrogen, methyl, or ethyl; $R^{10}$, $R^{11}$, and $R^{12}$ independently represent halogen, linear or branched ($C_1$ to $C_{20}$) alkyl, linear or branched ($C_1$ to $C_{20}$) alkoxy, linear or branched ($C_1$ to $C_{20}$) alkyl carbonyloxy, ($C_1$ to $C_{20}$) alkyl peroxy, and substituted or unsubstituted ($C_6$ to $C_{20}$) aryloxy; $R^{10}$, $R^{11}$, and $R^{12}$ together with the silicon atom to which they are attached form the group:

n is a number from 0 to 5, and n' is 0 or 1; and n" is a number from 0 to 10.

29. The oligomer of claim 28 wherein said olefinic compound is represented by the structures:

wherein R' and R" independently represent hydrogen, branched or unbranched ($C_1$ to $C_{40}$) alkyl, branched or unbranched ($C_2$ to $C_{40}$) alkenyl, halogen, or the group:

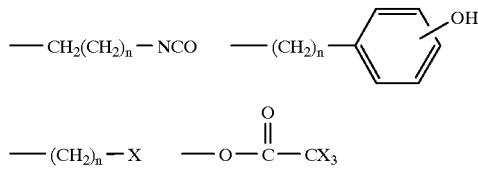

wherein R" is branched or unbranched ($C_1$ to $C_{10}$) alkyl, branched or unbranched ($C_3$ to $C_9$) alkenyl, substituted or unsubstituted ($C_6$ to $C_{15}$) aryl wherein said substituents if present are selected from branched or unbranched ($C_1$ to $C_{10}$) alkyl or haloalkyl, and halogen, X is chlorine, fluorine, bromine or iodine, and n is 0 to 20.

30. The oligomer of claim 28 comprising a repeating unit selected from the group consisting of the following polycyclic repeating unit structures and combinations thereof:

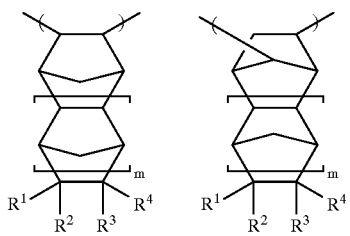

wherein $R^1$ to $R^4$ and m are as previously defined.

31. The oligomer of claim 30 further comprising repeating units selected from the group consisting of acyclic repeating units, the following polycyclic repeating units, and mixtures thereof:

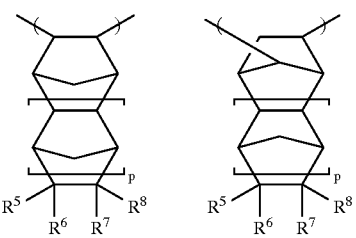

wherein $R^5$ to $R^8$, p, and said acyclic repeating units are as previously defined.

32. An polymer having a $T_g$ of at least 250° C. comprising the following polycyclic repeating units:

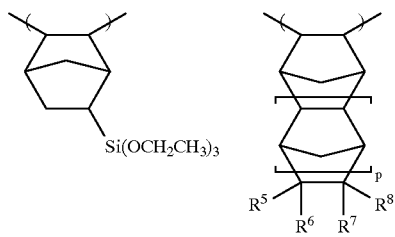

wherein p is 0 to 4, and $R^5$ to $R^8$ independently represent hydrogen, linear and branched ($C_1$ to $C_{20}$) alkyl, hydrocarbyl substituted and unsubstituted ($C_5$ to $C_{12}$) cycloalkyl, ($C_6$ to $C_{40}$) aryl, ($C_7$ to $C_{15}$) aralkyl, ($C_3$ to $C_{20}$) alkynyl, linear and branched ($C_3$ to $C_{20}$) alkenyl, with the proviso that the alkenyl radical does not contain a terminal double bond, or vinyl; any of $R^5$ and $R^6$ or $R^7$ and $R^8$ can be taken together to form a ($C_1$ to $C_{10}$) alkylidenyl group, $R^5$ and $R^8$ when taken with the two ring carbon atoms to which they are attached can represent saturated and unsaturated cyclic groups containing 4 to 12 carbon atoms or an aromatic ring containing 6 to 17 carbon atoms.

33. The polymer of claim 32 wherein p is 0, and $R^5$ to $R^8$ is independently selected from the group consisting of hydrogen, and linear and branched ($C_1$ to $C_{20}$) alkyl.

34. The polymer of claim 32 wherein said polymer is terminated with an olefinic end group represented by the structures:

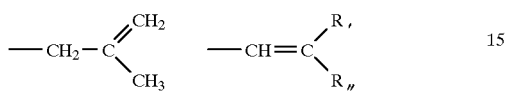

wherein R' and R" independently represent hydrogen, branched or unbranched ($C_1$ to $C_{40}$) alkyl.

35. The polymer of claim 34 wherein R' is hydrogen and R" is hydrogen or a ($C_1$ to $C_{10}$) alkyl group.

36. The polymer of claim 35 wherein R' is selected from the group of methyl, ethyl, propyl, butyl, pentyl, and hexyl.

37. The polymer of claim 34 wherein said polymer comprises 4 to 50 polycyclic repeating units.

38. The polymer or oligomer of claim 1, 2, 7, 28, or 29, wherein said polycyclic repeating units are linked to one another by linkages selected from the group consisting of 2,3-enchainment, 2,5-enchainment, 2,6-enchainment, 2,7-enchainment, and mixtures thereof.

39. A coating composition comprising a solvent and an addition polymer having a $T_g$ of at least 250° C. comprising polycyclic repeating units wherein at least a portion of said repeating units include a silyl functional group represented by the following formulae:

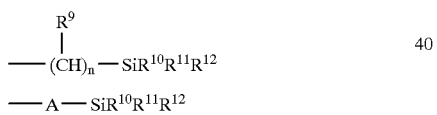

wherein A is a divalent radical selected from the following structures:

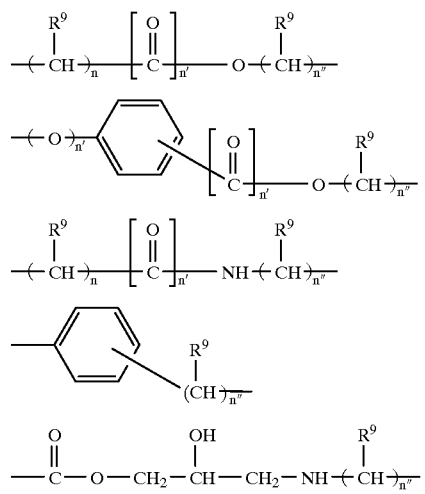

-continued

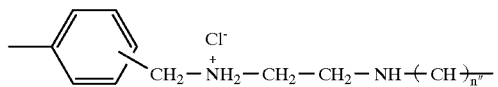

and $R^9$ independently represents hydrogen, methyl, or ethyl; $R^{10}$, $R^{11}$, and $R^{12}$ independently represent halogen, linear or branched ($C_1$ to $C_{20}$) alkyl, linear or branched ($C_1$ to $C_{20}$) alkoxy, linear or branched ($C_1$ to $C_{20}$) alkyl carbonyloxy, ($C_1$ to $C_{20}$) alkyl peroxy, and substituted or unsubstituted ($C_6$ to $C_{20}$) aryloxy; $R^{10}$, $R^{11}$, and $R^{12}$ together with the silicon atom to which they are attached form the group:

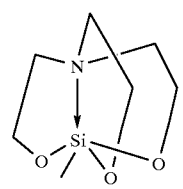

n is a number from 0 to 5; and n' is 0 or 1; and n" is a number from 0 to 10.

40. The coating composition of claim 39 wherein at least one of $R^{10}$ to $R^{12}$ is a linear or branched ($C_1$ to $C_{10}$) alkoxy group or halogen.

41. The coating composition of claim 40 wherein $R^{10}$ to $R^{12}$ are the same and are selected from the group consisting of methoxy, ethoxy, propoxy, butoxy, pentoxy, and halogen.

42. The coating composition of claim 41 comprising the following polycyclic repeating units:

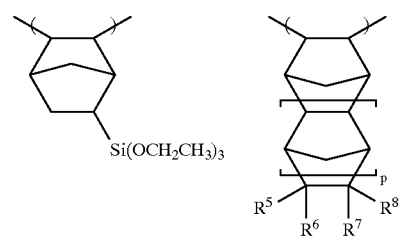

wherein p is 0 to 4, and $R^5$ to $R^8$ independently represent hydrogen, linear and branched ($C_1$ to $C_{20}$) alkyl, hydrocarbyl substituted and unsubstituted ($C_5$ to $C_{12}$) cycloalkyl, ($C_6$ to $C_{40}$) aryl, ($C_7$ to $C_{15}$) aralkyl, ($C_3$ to $C_{20}$) alkynyl, linear and branched ($C_3$ to $C_{20}$) alkenyl, with the proviso that the alkenyl radical does not contain a terminal double bond, or vinyl; any of $R^5$ and $R^6$ or $R^7$ and $R^8$ can be taken together to form a ($C_1$ to $C_{10}$) alkylidenyl group, $R^5$ and $R^8$ when taken with the two ring carbon atoms to which they are attached represents saturated and unsaturated cyclic groups containing 4 to 12 carbon atoms or an aromatic ring containing 6 to 17 carbon atoms.

43. The coating composition of claim 42 wherein p is 0, and $R^5$ to $R^8$ is independently selected from the group consisting of hydrogen, and linear and branched ($C_1$ to $C_{20}$) alkyl.

44. A coating composition comprising a solvent and a polymer, said polymer comprising a repeat unit represented by Formula I in optional combination with a repeat unit selected from Formula II as follows:

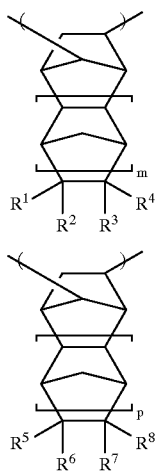

wherein $R^1$ and $R^4$ independently represent hydrogen or linear or branched ($C_1$ to $C_{20}$) alkyl; $R^2$ and $R^3$ independently represent hydrogen, linear or branched ($C_1$ to $C_{20}$) alkyl or the groups:

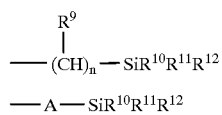

wherein A is a divalent radical selected from the following structures:

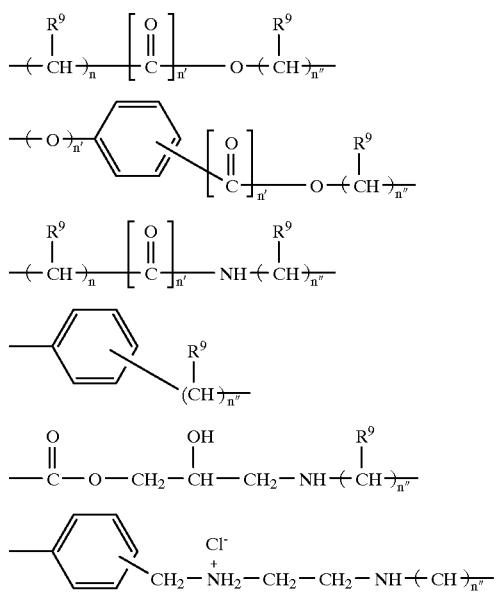

$R^9$ is hydrogen, methyl, or ethyl; $R^{10}$, $R^{11}$, and $R^{12}$ independently represent halogen selected from the group consisting of chlorine, fluorine, bromine and iodine, linear or branched ($C_1$ to $C_{20}$) alkyl, linear or branched ($C_1$ to $C_{20}$) alkoxy, substituted or unsubstituted ($C_6$ to $C_{20}$) aryloxy, linear or branched ($C_1$ to $C_{20}$) alkyl carbonyloxy, ($C_1$ to $C_{20}$) alkyl peroxy, and substituted or unsubstituted ($C_6$ to $C_{20}$) aryloxy; $R^{10}$, $R^{11}$, and $R^{12}$ together with the silicon atom to which they are attached form the group:

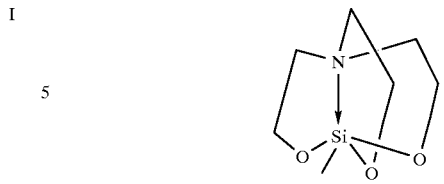

n is a number from 0 to 5; and n' is 0 or 1; and n" is a number from 0 to 10; m and p independently represent a number from 0 to 4; with the proviso that at least one of $R^2$ and $R^3$ is a silyl substituent selected from the group represented by Ia or Ib above, and that when $R^1$ and $R^4$ together form a saturated cyclic group, $R^2$ and $R^3$ cannot both be a silyl substituent at the same time; wherein $R^5$ to $R^8$ independently represent hydrogen, linear and branched ($C_1$ to $C_{20}$) alkyl, hydrocarbyl substituted and unsubstituted ($C_5$ to $C_{12}$) cycloalkyl, ($C_6$ to $C_{40}$) aryl, ($C_7$ to $C_{15}$) aralkyl, ($C_3$ to $C_{20}$) alkynyl, linear and branched ($C_3$ to $C_{20}$) alkenyl, (with the proviso that the alkenyl radical does not contain a terminal double bond) or vinyl; any of $R^5$ and $R^6$ or $R^7$ and $R^8$ can be taken together to form a ($C_1$ to $C_{10}$) alkylidenyl group, $R^5$ and $R^8$ when taken with the two ring carbon atoms to which they are attached can represent saturated and unsaturated cyclic groups containing 4 to 12 carbon atoms or an aromatic ring containing 6 to 17 carbon atoms.

45. The coating composition of claim 40 wherein said polymer is a copolymer comprising the following repeat units:

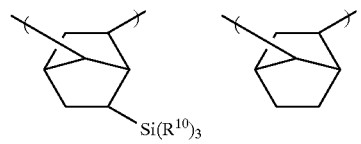

wherein $R^{10}$ is as previously defined.

46. The coating composition of claim 42, 44, or 45 wherein said polymer is terminated with an olefinic end group represented by the structures:

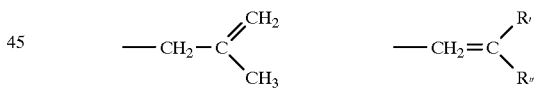

wherein R' and R" independently represent hydrogen, branched or unbranched ($C_1$ to $C_{40}$) alkyl.

47. The coating composition of claim 46 wherein R' is hydrogen and R" is hydrogen or a ($C_1$ to $C_{10}$) alkyl group.

48. The coating composition of claim 47 wherein R" is selected from the group of methyl, ethyl, propyl, butyl, pentyl, and hexyl.

49. The coating composition of claim 46 wherein said addition polymer comprises 4 to 50 polycyclic repeating units.

50. The coating composition of claim 39 or 44 wherein said solvent is selected from the group consisting of decahydronaphthalene, chlorobenzene, mesitylene, and methylene chloride.

51. The coating composition of claim 50 wherein said addition polymer is present in solution from about 5 to 50 wt. % and 10 to 10,000 cp.

52. The coating composition of claim 51 wherein said coating composition further comprises and additive selected from the group consisting of UV stabilizers, antioxidants, impact modifiers, lubricants, heat stabilizers, antihazing agents, organic and inorganic fillers, tetraehthoxygermane, tetraethoxytin, tetraethoxylead, tetraethoxyzirconium, tetraethoxytitanium, tetraethoxyplatinum, ceramics, high dielectric ceramics, metal oxide fillers, aluminum nitride fibers, boron nitride fibers, carbon fibers, silicon carbide whiskers, pigments, dyes, and mixtures thereof.

53. A coating composition comprising the addition polymer of claim 18, 19, 20, 21, or 22 and a solvent.

54. The coating composition of claim 53 wherein said solvent is selected from the group consisting of decahydronaphthalene, chlorobenzene, mesitylene, and methylene chloride.

55. The coating composition of claim 53 wherein said addition polymer is present in solution from about 5 to 50 wt. % and 10 to 10,000 cp.

56. An addition polymer consisting essentially of polycyclic repeating units wherein at least a portion of said repeating units include a silyl functional group and said polymer is optionally terminated with an olefinic end group, said silyl functional group is represented by the following formulae:

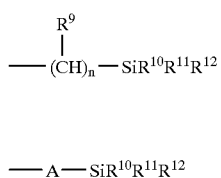

Ia

Ib wherein A is a divalent radical selected from the following structures:

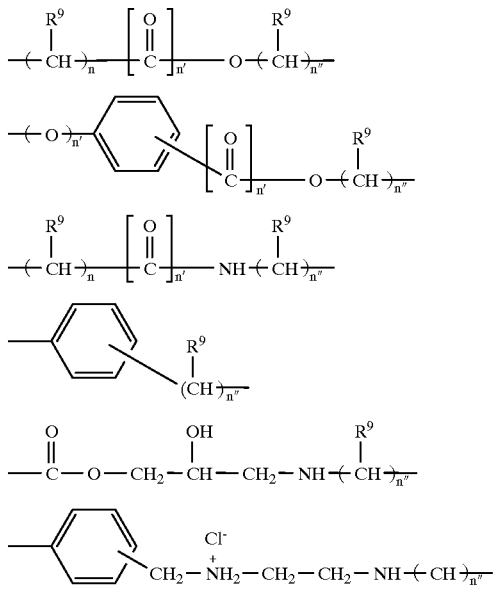

and $R^9$ independently represents hydrogen, methyl, or ethyl; $R^{10}$, $R^{11}$, and $R^{12}$ independently represent halogen, linear or branched ($C_1$ to $C_{20}$) alkyl, linear or branched ($C_1$ to $C_{20}$) alkoxy, linear or branched ($C_1$ to $C_{20}$) alkyl carbonyloxy, ($C_1$ to $C_{20}$) alkyl peroxy, and substituted or unsubstituted ($C_6$ to $C_{20}$) aryloxy; $R^{10}$, $R^{11}$, and $R^{12}$ together with the silicon atom to which they are attached form the group:

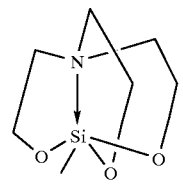

n is a number from 0 to 5; and n' is 0 or 1; and n" is a number from 0 to 10; and said olefinic end group, if present, is represented by the structures:

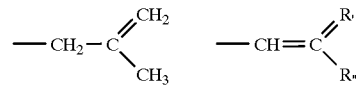

wherein R' and R" independently represent hydrogen, branched or unbranched ($C_1$ to $C_{40}$) alkyl, branched or unbranched ($C_2$ to $C_{40}$) alkenyl, halogen, or the group:

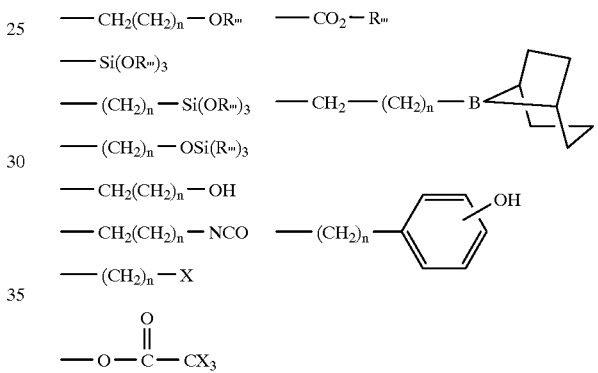

wherein R" is branched or unbranched ($C_1$ to $C_{10}$) alkyl, branched or unbranched ($C_3$ to $C_{90}$) alkenyl, substituted or unsubstituted ($C_6$ to $C_{15}$) aryl wherein said substituents if present are selected from branched or unbranched ($C_1$ to $C_{10}$) alkyl or haloalkyl, and halogen, X is chlorine, fluorine, bromine or iodine, and n is 0 to 20.

57. The addition polymer of claim 56 wherein said polycyclic repeating units are represented by the following formulae:

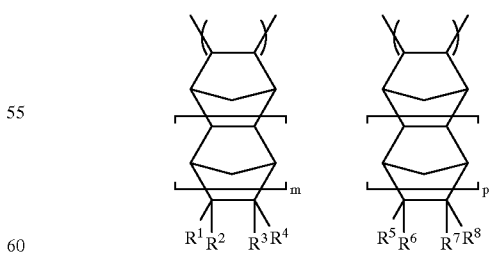

wherein $R^1$ and $R^4$ independently represent hydrogen, linear or branched ($C_1$ to $C_{20}$) alkyl, $R^1$ and $R^4$ when taken together with the two ring carbon atoms to which they are attached form an unsaturated cyclic ring of 4 to 8 carbon atoms or the group:

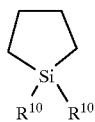

wherein said unsaturated cyclic ring is substituted by at least one of $R^2$ and $R^3$; $R^2$ and $R^3$ independently represent hydrogen, linear or branched ($C_1$ to $C_{20}$) alkyl or the groups Ia and Ib defined above, with the proviso that at least one of $R^2$ and $R^3$ is a silyl substituent selected from the group represented by Ia or Ib above, and that when $R^1$ and $R^4$ together form a saturated cyclic group, $R^2$ and $R^3$ cannot both be a silyl substituent at the same time; $R^5$, $R^6$, $R^7$, and $R^8$ independently represent hydrogen, linear and branched ($C_1$ to $C_{20}$) alkyl, hydrocarbyl substituted and unsubstituted ($C_5$ to $C_{12}$) cycloalkyl, ($C_6$ to $C_{40}$) aryl, ($C_7$ to $C_{15}$) aralkyl, ($C_3$ to $C_{20}$) alkynyl, linear and branched ($C_3$ to $C_{20}$) alkenyl, (with the proviso that the alkenyl radical does not contain a terminal double bond) or vinyl; any of $R^5$ and $R^6$ or $R^7$ and $R^8$ can be taken together to form a ($C_1$ to $C_{10}$) alkylidenyl group, $R^5$ and $R^8$ when taken with the two ring carbon atoms to which they are attached can represent saturated and unsaturated cyclic groups containing 4 to 12 carbon atoms or an aromatic ring containing 6 to 17 carbon atoms.

58. The addition polymer of claim 57 wherein at least one of $R^{10}$ to $R^{12}$ is a linear or branched ($C_1$ to $C_{10}$) alkoxy group or halogen.

59. The addition polymer of claim 58 wherein $R^{10}$ to $R^{12}$ are the same and are selected from the group consisting of methoxy, ethoxy, propoxy, butoxy, pentoxy, and halogen.

60. The addition polymer of claim 59 wherein $R^{10}$ to $R^{12}$ are each ethoxy or chlorine.

61. The addition polymer of claim 60 wherein said silyl functional group is triethoxysilyl or trichlorosilyl.

62. The addition polymer of claim 56 wherein in said terminal olefinic group R' is hydrogen and R" is hydrogen or a ($C_1$ to $C_{10}$) alkyl group.

63. The addition polymer of claim 62 wherein R" is selected from the group of methyl, ethyl, propyl, butyl, pentyl, and hexyl.

64. The addition polymer of claim 57 wherein the polymer is terminated with a olefin selected from the group of ethyl, propyl, butyl, isobutyl, pentyl, and hexyl.

65. A polymer consisting essentially of silyl substituted and hydrocarbyl substituted polycyclic repeat units having the following formulae:

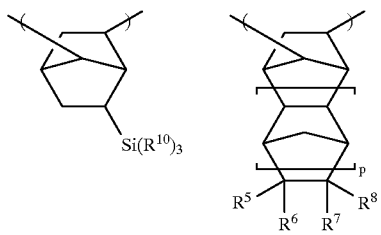

wherein $R^5$ to $R^8$ and p are as previously defined and $R^{10}$ is selected from the group consisting of linear or branched ($C_1$ to $C_5$) alkoxy, and halogen; wherein said addition polymer is optionally terminated with an olefinic moiety selected from the group consisting of ethyl, propyl, i-propyl, butyl, i-butyl, pentyl, and hexyl, wherein said olefinic moiety, if present, is exclusively located at a terminal end of said polymer.

66. The polymer of claim 65 wherein $R^{10}$ is selected from the group consisting of ethoxy and chlorine; p is 0 or 1; and $R^5$ to $R^8$ independently represent hydrogen or linear or branched ($C_1$ to $C_{12}$) alkyl.

67. The polymer of claim 66 having the following repeating units wherein p is 0 and $R^5$ to $R^8$ is independently hydrogen and linear and branched ($C_1$ to $C_{12}$) alkyl.

68. The polymer of claim 66 wherein said polymer consists essentially of the following repeat units:

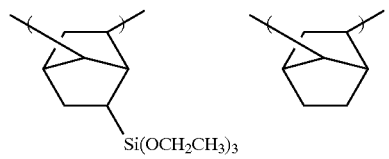

69. The polymer of claims 1, 7, 18, 25, 28, 39, or 56 wherein at least one of $R^{10}$, $R^{11}$, or $R^{12}$ of said silyl group further represents a grafted substituent selected from the group consisting of substituted and unsubstituted ($C_6$ to $C_{10}$) cycloalkyl, substituted and unsubstituted ($C_5$ to $C_{10}$) cycloalkenyl, polystyryl, polyisoprenyl, and polyacryloyl.

70. The polymer of claim 7, 8, 9, 10, 11, 18, 28, 30, or 57 wherein $R^1$ and $R^4$ taken together with the two ring carbon atoms to which they are attached comprise a repeat unit represented the following structure:

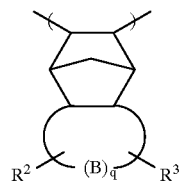

wherein B is a —$CH_2$— group, q is a number from 2 to 6, and $R^2$ and $R^3$ are as defined above.

71. A polymer having a Tg of at least 250° C. comprising polycyclic repeating units wherein a portion of said repeating units include a reactive silyl functional group pending therefrom wherein said silyl functional group contains a silicon-oxygen bond, a silicon-halogen bond, and combinations thereof, with the proviso that said silyl group is connected to said polycyclic repeating unit through a silicon-ring carbon atom bond or through a moiety that contains a silicon-carbon bond.

72. A polymer comprising polycyclic repeating units linked together via 2,7-enchainment wherein a portion of said repeating units include a reactive silyl functional group pending therefrom wherein said silyl functional group contains a silicon-oxygen bond, a silicon-halogen bond, and combinations thereof, with the proviso that said silyl group is connected to said polycyclic repeating unit through a silicon-ring carbon atom bond or through a moiety that contains a silicon-carbon bond.

73. The addition polymer of claim 71 wherein said silyl functional group is represented by the formulae:

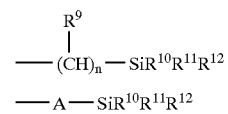

wherein A is a divalent radical selected from the following structures:

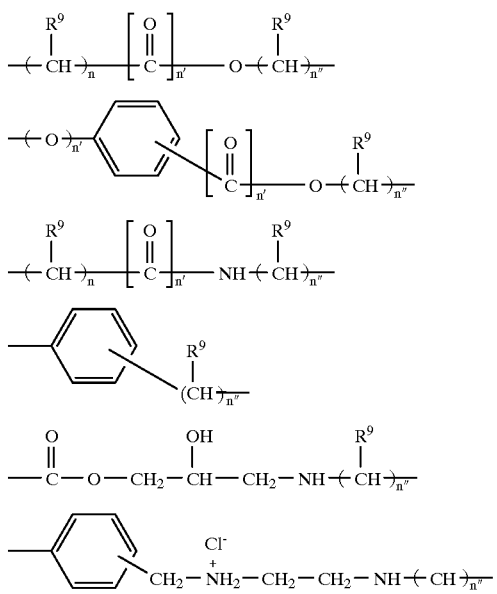

and $R^9$ independently represents hydrogen, methyl, or ethyl; n is a number from 0 to 5; n' is 0 or 1; and n" is a number from 1 to 10; $R^{10}$, $R^{11}$, and $R^{12}$ independently represent halogen, and the groups:

—OR
—OOR
—OC(O)R wherein R represents linear or branched ($C_1$ to $C_{10}$) alkyl, substituted and unsubstituted ($C_6$ to $C_{20}$) aryl, and $R^{10}$ to $R^{12}$ together with the silicon atom to which they are attached represent the group:

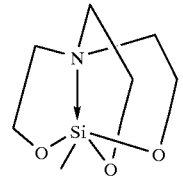

74. The composition of claim 1, 2, 7, 18, 19, 20, 28, 29, 30, 31, 39, 41, 46, or 73 wherein n" is 1 to 10.

* * * * *